(12) United States Patent
Ogawa et al.

(10) Patent No.: US 10,031,384 B2
(45) Date of Patent: Jul. 24, 2018

(54) LIQUID-CRYSTAL DISPLAY ELEMENT

(71) Applicant: DIC CORPORATION, Tokyo (JP)

(72) Inventors: Shinji Ogawa, Kita-adachi-gun (JP); Yoshinori Iwashita, Kita-adachi-gun (JP); Makoto Negishi, Kita-adachi-gun (JP); Hiromitsu Kishi, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/329,437

(22) PCT Filed: Jul. 27, 2015

(86) PCT No.: PCT/JP2015/071211
§ 371 (c)(1),
(2) Date: Jan. 26, 2017

(87) PCT Pub. No.: WO2016/017569
PCT Pub. Date: Feb. 4, 2016

(65) Prior Publication Data
US 2017/0255048 A1    Sep. 7, 2017

(30) Foreign Application Priority Data

Jul. 28, 2014   (JP) ................................ 2014-152875

(51) Int. Cl.
*G02F 1/1343*  (2006.01)
*C09K 19/12*   (2006.01)
(Continued)

(52) U.S. Cl.
CPC ...... *G02F 1/13439* (2013.01); *C09K 19/3003* (2013.01); *C09K 19/3066* (2013.01);
(Continued)

(58) Field of Classification Search
CPC ... G02F 2001/134381; G02F 1/134363; C09K 19/3003
See application file for complete search history.

(56) References Cited

U.S. PATENT DOCUMENTS

| 2013/0183460 A1 | 7/2013 | Klasen-Memmer et al. |
| 2013/0329168 A1 | 12/2013 | Chung et al. |

(Continued)

FOREIGN PATENT DOCUMENTS

| JP | 11-202356 A | 7/1999 |
| JP | 2002-31812 A | 1/2002 |

(Continued)

OTHER PUBLICATIONS

International Search Report dated Oct. 20, 2015, issued in counterpart International Application No. PCT/JP2015/071211 (2 pages).

*Primary Examiner* — Wen-Ying P Chen
(74) *Attorney, Agent, or Firm* — Westerman, Hattori, Daniels & Adrian, LLP

(57) ABSTRACT

An object of the present invention is to provide a liquid crystal display element using a liquid crystal composition having negative dielectric anisotropy, which is capable of realizing excellent display properties by being used in an FFS mode liquid crystal display element without deteriorating various properties, as a liquid crystal display element, such as dielectric anisotropy, viscosity, a nematic phase upper limit temperature, nematic phase stability at low temperature, and $\gamma_1$, and burn-in characteristics of the display element.
Provided is an FFS mode liquid crystal display element using an n-type liquid crystal composition so as to achieve the above object.

2 Claims, 5 Drawing Sheets

(51) Int. Cl.
    *C09K 19/30*          (2006.01)
    *C09K 19/34*          (2006.01)
    *G02F 1/1368*         (2006.01)
    *G02F 1/1362*         (2006.01)
    *G02F 1/1337*         (2006.01)

(52) U.S. Cl.
    CPC ........ *C09K 19/3402* (2013.01); *G02F 1/1337* (2013.01); *G02F 1/1368* (2013.01); *G02F 1/134309* (2013.01); *G02F 1/136286* (2013.01); *C09K 2019/301* (2013.01); *C09K 2019/3004* (2013.01); *C09K 2019/3009* (2013.01); *C09K 2019/3016* (2013.01); *C09K 2019/3422* (2013.01); *G02F 1/134363* (2013.01); *G02F 2001/133738* (2013.01); *G02F 2001/134372* (2013.01); *G02F 2001/134381* (2013.01)

(56) References Cited

U.S. PATENT DOCUMENTS

| | | | |
|---|---|---|---|
| 2014/0016075 A1* | 1/2014 | Iwata | G02F 1/134363 349/141 |
| 2014/0104524 A1* | 4/2014 | Lee | G09G 3/36 349/41 |
| 2015/0070646 A1 | 3/2015 | Kim et al. | |

FOREIGN PATENT DOCUMENTS

| | | |
|---|---|---|
| JP | 2003-233083 A | 8/2003 |
| JP | 2014-81450 A | 5/2014 |
| WO | 2014/069550 A1 | 5/2014 |

\* cited by examiner

Rubbing Direction

LIQUID-CRYSTAL DISPLAY ELEMENT

TECHNICAL FIELD

The present invention relates to an FFS mode liquid crystal display device using a nematic liquid crystal composition having negative dielectric anisotropy, which has high transmittance and a high opening ratio.

BACKGROUND ART

From the fact that display quality is excellent, active matrix type liquid crystal display elements have been put on the market for portable terminals, liquid crystal televisions, projectors, computers and the like. In the active matrix type elements, thin film transistors (TFT), metal-insulator-metals (MIM), or the like are used for each pixel, and it is important that the liquid crystal compound or the liquid crystal composition used in this type has a high voltage holding ratio. In addition, a liquid crystal display element which includes a Vertical Alignment (VA) mode, an In-Plane Switching (IPS) mode, and an Optically Compensated Bend, Optically Compensated Birefringence (OCB) mode in combination is proposed in order to obtain wider viewing angle characteristics, and an Electrically Controlled Birefringence (ECB) mode reflective liquid crystal display element is proposed in order to obtain a brighter display. To comply with such liquid crystal display elements, new liquid crystal compounds or liquid crystal compositions are currently being proposed.

At present, as the liquid crystal display for smartphones, a fringe field switching mode liquid crystal display device (FFS mode liquid crystal display device) having high quality and excellent visual characteristics, which is a type of an IPS mode liquid crystal display element, is widely used (refer to PTLs 1 and 2). The FFS mode is a mode introduced for improving the low opening ratio and transmittance of the IPS mode, and as the liquid crystal composition used, a material using a p-type liquid crystal composition having positive dielectric anisotropy is widely used from the viewpoint of easily lowering a voltage. In addition, since most applications of the FFS mode are for portable terminals, there is a strong demand for more power saving, and liquid crystal element manufacturers are continuing to carry out active development in this regard, such as adoption of arrays using IGZO.

On the other hand, currently, it is also possible to improve the transmittance by changing a liquid crystal material currently using a p-type material to an n-type material having negative dielectric anisotropy (refer to PTL 3). This is because the FFS mode does not produce a perfect parallel electric field unlike the IPS mode, and in the case of using the p-type material, the major axis of the liquid crystal molecules close to the pixel electrode tilt along the fringe electric field, thereby deteriorating the transmittance. On the other hand, in the case of using the n-type liquid crystal composition, since the polarization direction of the n-type composition is the minor axis direction of the molecules, the influence of the fringe electric field simply rotates the liquid crystal molecules along the major axis and the major axis of the molecule is maintained in a parallel arrangement, so that the transmittance does not decrease.

However, although an n-type liquid crystal composition is typical as a liquid crystal composition for VA, the VA mode and the FFS mode are different in all the points of alignment direction, electric field direction, and required optical characteristics. Further, the FFS mode liquid crystal display element has the features of the electrode structure as described below and, in the VA mode, electrodes are provided on both of the two substrates, whereas in the FFS mode, electrodes are provided only in the array substrate. Therefore, nothing is known about problems such as burn-in or drip mark for which it is difficult to predict the effects with the related art. Accordingly, even if the liquid crystal composition used for VA is simply used for this purpose, it is difficult to form a high-performance liquid crystal display element as required today, and therefore, there is a demand to provide an n-type liquid crystal composition optimized for FFS mode.

CITATION LIST

Patent Literature

PTL 1: JP-A-11-202356
PTL 2: JP-A-2003-233083
PTL 3: JP-A-2002-31812

SUMMARY OF INVENTION

Technical Problem

The object of the present invention is to provide a liquid crystal display element using an n-type liquid crystal composition which is able to realize excellent display characteristics by using the composition for an FFS mode liquid crystal display element and which is excellent in various characteristics as a liquid crystal display element, such as dielectric anisotropy ($\Delta \in$), viscosity ($\eta$), nematic phase-isotropic liquid transition temperature ($T_{NI}$), nematic phase stability at low temperatures, and rotational viscosity ($\gamma_1$).

Solution to Problem

The inventors of the present application have been conducted intensive researches in order to solve the problems described above, and as a result of researching a configuration of various liquid crystal compositions which are most suitable for the FFS mode liquid crystal display element, the present inventors found that a liquid crystal composition containing a liquid crystal compound having two specific structures was useful and completed the invention of the present application.

The invention of the present application, provides liquid crystal display elements of the followings (1) to (9).

(1) A liquid crystal display element including:
a first transparent insulating substrate and a second transparent insulating substrate, which are disposed so as to face each other,
a liquid crystal layer containing a liquid crystal composition, which is interposed between the first substrate and the second substrate;
for each pixel on the first substrate, a common electrode containing a transparent conductive material and a plurality of gate bus line and data bus lines disposed in a matrix shape, a thin film transistor provided at an intersection between the gate bus lines and data bus lines, and a pixel electrode containing a transparent conductive material which is driven by the thin film transistor; and
alignment film layers which induce homogeneous alignment between the liquid crystal layer and each of the first and second substrates and whose alignment directions of each alignment film are parallel to each other,
wherein a distance R between the pixel electrode and the common electrode is smaller than a distance G between the first substrate and the second substrate so that the pixel electrode and the common electrode form fringe electric fields therebetween, the common electrode is disposed closer to the first substrate than the pixel electrodes over nearly the entire surface of the first substrate, and the liquid crystal composition has a negative dielectric anisotropy, a nematic phase-isotropic liquid transition temperature of 60° C. or more, and an absolute value of the dielectric anisotropy of 2 or more, and contains at least one compound selected from the compound group represented by General Formula (I) and at least one compound selected from the compound group represented by the following General Formula (II):

[Chem. 1]

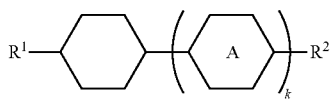

(I)

(in the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. A represents a 1,4-phenylene group or a trans-1,4-cyclohexylene group, and k represents 1 or 2; and, in a case of k is 2, two A's may be the same as or different from each other):

[Chem. 2]

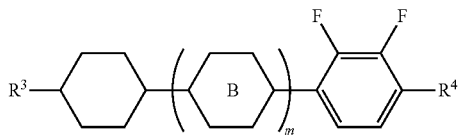

(II)

(in the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^4$ represents an alkyl group having 1 to 8 carbon atoms, an alkenyl group having 4 to 8 carbon atoms, an alkoxy group having 1 to 8 carbon atoms or an alkenyloxy group having 3 to 8 carbon atoms, B represents a 1,4-phenylene group or a trans-1,4-cyclohexylene group, m represents 0, 1, or 2, and, in a case where m is 2, two B's may be the same as or different from each other).

(2) The liquid crystal display element described in (1), which contains, as the compound represented by General Formula (I), at least one compound selected from the compound group represented by the following General Formula (III):

[Chem. 3]

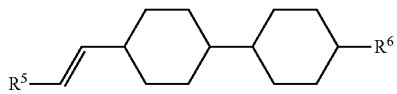

(III)

(in the formula, $R^5$ represents a hydrogen atom or a methyl group, $R^6$ represents an alkyl group having 1 to 5 carbon atoms, an alkenyl group having 2 to 5 carbon atoms, or an alkoxy group having 1 to 4 carbon atoms).

(3) The liquid crystal display element described in (1), which contains one or more compounds represented by the following General Formula (IV):

[Chem. 4]

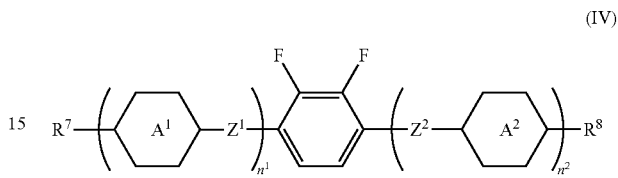

(IV)

(in the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, a methylene group in the alkyl group, the alkenyl group, the alkoxy group, or the alkenyloxy group may be substituted with an oxygen atom as long as the oxygen atoms are not bonded consecutively, and may be substituted with a carbonyl group as long as the carbonyl groups are not bonded consecutively, $A^1$ and $A^2$ each independently represent a 1,4-cyclohexylene group, a 1,4-phenylene group or a tetrahydropyran-2,5-diyl group, provided that, in a case where $A^1$ or/and $A^2$ represent a 1,4-phenylene group, one or more hydrogen atoms in the 1,4-phenylene group may be substituted with a fluorine atom, $Z^1$ and $Z^2$ each independently represent a single bond, —OCH$_2$—, —OCF$_2$—, —CH$_2$O—, or CF$_2$O—, $n^1$ and $n^2$ each independently represent 0, 1, 2, or 3, provided that $n^1+n^2$ is 1 to 3, and in a case where a plurality of $A^1$, $A^2$, $Z^1$ and/or $Z^2$ are present, plural $A^1$s, $A^2$s, $Z^1$s, and/or $Z^2$s each may be the same as or different from each other, with the proviso that a compound in which $n^1$ is 1 or 2, $n^2$ is 0, at least one of $A^1$'s is a 1,4-cyclohexylene group, and all of $Z^1$'s are single bonds is excluded).

(4) The liquid crystal composition described in (3), which contains, as the compound represented by General Formula (IV), at least one compound selected from the compound group represented by the following General Formula (IVa1) and General Formula (IVa2):

[Chem. 5]

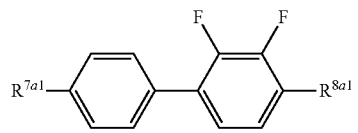

(IVa1)

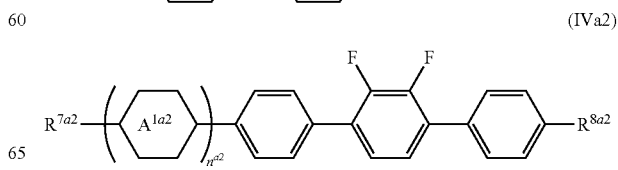

(IVa2)

(in the formula, $R^{7a1}$ and $R^{7a2}$, and $R^{8a1}$ and $R^{8a2}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, a methylene group in the alkyl group, the alkenyl group, the alkoxy group, or the alkenyloxy group may be substituted with an oxygen atom as long as the oxygen atoms are not bonded consecutively, and may be substituted with a carbonyl group as long as the carbonyl groups are not bonded consecutively, $n^{a2}$ represents 0 or 1, $A^{1a2}$ represents a 1,4-cyclohexylene group, a 1,4-phenylene group, or a tetrahydropyran-2,5-diyl group, and one or more hydrogen atoms in the 1,4-phenylene group in General Formula (IVa1) and General Formula (IVa2) may be substituted with a fluorine atom).

(5) The liquid crystal display element described in (1), wherein the pixel electrode is formed into a comb shape or has a slit.

(6) The liquid crystal display element described in (1), wherein a distance R between electrodes is 0.

(7) A liquid crystal display element including a plurality of gate bus lines and data bus lines arranged in a mesh shape, and a thin film transistor provided at each intersection between the gate bus lines and data bus lines;
a first substrate which includes a first alignment layer formed on a layer including the thin film transistor on a surface thereof;
a first electrode which is provided in a neighboring region of the first substrate, and is connected to a second electrode provided apart from the first electrode and to the thin film transistor;
a second substrate which includes a second alignment layer provided so as to face the first substrate on a surface thereof;
a liquid crystal layer which has the first alignment layer and the second alignment layer disposed apart from each other so as to face each other, and contains an n-type liquid crystal composition containing a compound containing a difluorobenzene group filled between both alignment layers; and
a third electrode in a region other than the neighboring region of the first substrate on which the first electrode and the second electrode are provided.

(8) The liquid crystal display element described in (7), wherein the compound containing a difluorobenzene group contains at least one compounds represented by the following General Formula (IV):

[Chem. 6]

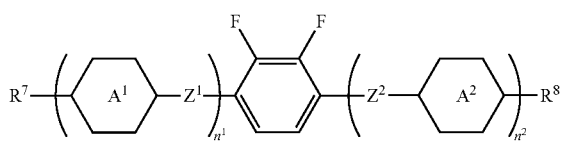

(IV)

(in the formula,
$R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, a methylene group in the alkyl group, the alkenyl group, the alkoxy group, or the alkenyloxy group may be substituted with an oxygen atom as long as the oxygen atoms are not bonded consecutively, and may be substituted with a carbonyl group as long as the carbonyl groups are not bonded consecutively,
$A^1$ and $A^2$ each independently represent a 1,4-cyclohexylene group, a 1,4-phenylene group or a tetrahydropyran-2,5-diyl group provided that, in a case where $A^1$ or/and $A^2$ represent a 1,4-phenylene group, one or more hydrogen atoms in the 1,4-phenylene group may be substituted with a fluorine atom,
$Z^1$ and $Z^2$ each independently represent a single bond, —OCH$_2$—, —OCF$_2$—, —CH$_2$O—, or CF$_2$O—,
$n^1$ and $n^2$ each independently represent 0, 1, 2, or 3, provided that $n^1+n^2$ is 1 to 3, and
in a case where a plurality of $A^1$, $A^2$, $Z^1$ and/or $Z^2$ are present, plural $A^1$s, $A^2$s, $Z^1$s, and/or $Z^2$s each may be the same as or different from each other,
with the proviso that a compound in which $n^1$ is 1 or 2, $n^2$ is 0, at least one of $A^1$'s is a 1,4-cyclohexylene group, and all of $Z^1$'s are single bonds is excluded).

(9) The liquid crystal display element described in (7) or (8), wherein the n-type liquid crystal composition has a nematic phase-isotropic liquid transition temperature of 60° C. or more and an absolute value of the dielectric anisotropy of 2 or more and contains at least one compound selected from the compound group represented by General Formula (I) and at least one compound selected from the compound group represented by the following General Formula (II):

[Chem. 7]

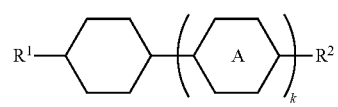

(I)

(in the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, A represents a 1,4-phenylene group or a trans-1,4-cyclohexylene group, k represents 1 or 2; and, in a case of k is 2, two A's may be the same as or different from each other):

[Chem. 8]

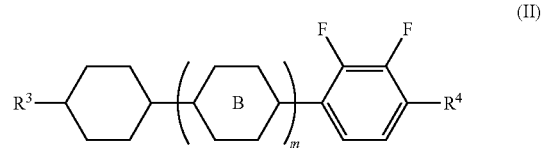

(II)

(in the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^4$ represents an alkyl group having 1 to 8 carbon atoms, an alkenyl group having 4 to 8 carbon atoms, an alkoxy group having 1 to 8 carbon atoms or an alkenyloxy group having 3 to 8 carbon atoms, B represents a 1,4-phenylene group or a trans-1,4-cyclohexylene group, m represents 0, 1, or 2, and, in a case where m is 2, two B's may be the same as or different, from each other).

Advantageous Effects of Invention

The FFS mode liquid crystal display element of the present invention is excellent in high-speed responsiveness, has a feature of less occurrence of display defect, and has excellent display properties. The liquid crystal display element of the present invention is useful for a display element such as a liquid crystal TV, a monitor, and the like.

In the FFS mode liquid crystal display element according to the present invention, in a case of a three-electrode structure, the alignment unevenness can be reduced by the electric field generated from the third electrode, and the transmittance is improved.

DESCRIPTION OF EMBODIMENTS

Figure 1:
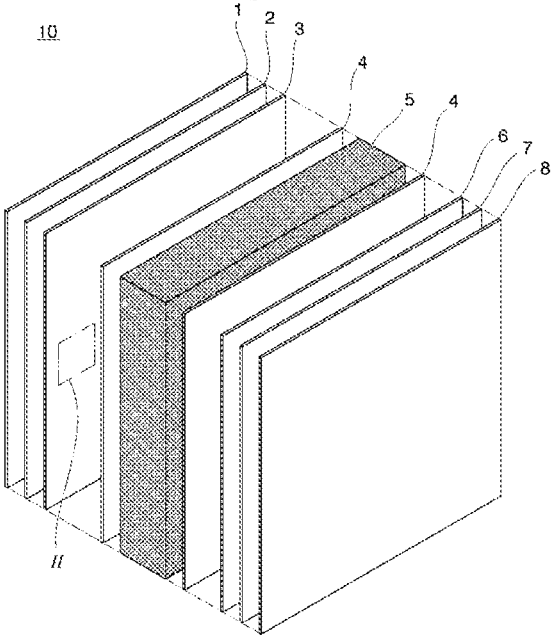
FIG. 1 is a diagram schematically showing an example of a configuration of a liquid crystal display element of the present invention.

As described above, the invention of the present application has found an optimum n-type liquid crystal, composition for an FFS mode liquid crystal display element.

A first embodiment of the liquid crystal display element according to the present invention is an n-type FFS mode liquid crystal display element which is configured to includes a first transparent insulating substrate and a second transparent insulating substrate that are disposed so as to face each other; a liquid crystal layer containing a liquid crystal composition, which is interposed between the first substrate and the second substrate; for each pixel on the first substrate, a first electrode containing a transparent conductive material and a plurality of gate bus lines and data bus lines disposed in a matrix shape on the first substrate; a thin film transistor provided at an intersection between the gate bus lines and data bus lines, and a second electrode containing a transparent conductive material, which is driven by the thin film transistor; and alignment film layers which induce homogeneous alignment between the liquid crystal layer and each of the first and second substrates and whose alignment directions of each alignment film are parallel to each other, wherein a distance R between the first electrodes and the second electrode is smaller than a distance G between the first substrate and the second substrate so that the first electrode and the second electrode form fringe electric fields therebetween, and the second electrode is disposed closer to the first substrate than the first electrodes. In addition, the second electrode is preferably formed on nearly the entire surface of the first substrate. Further, it is preferable that the first electrode is a pixel electrode, and the second electrode is a common electrode. In addition, the liquid crystal layer preferably contains an n-type liquid crystal composition. In addition, the inter-electrode distance R refers to the distance with respect to a component horizontal to the substrate.

Further, in a second embodiment of the liquid crystal display element according to the present invention, it is preferable to include a plurality of gate bus lines and data bus lines arranged in a mesh shape (or a matrix shape), and a thin film transistor provided at each intersection between the gate bus lines and data bus lines; a first substrate which includes on a surface thereof a first alignment layer formed on a layer including the thin film transistor; a first electrode which is provided in a neighboring region of the first substrate, and is connected to a second electrode provided apart from the first electrode and to the thin film transistor; a second substrate which includes on a surface thereof a second alignment layer provided so as to face the first substrate; a liquid crystal layer which has the first alignment layer and the second alignment layer disposed apart from each other so as to face each other, and contains an n-type liquid crystal composition containing a compound containing a difluorobenzene group filled between both alignment layers; and a third electrode in a region other than the neighboring region of the first substrate on which the first electrode and the second electrode are provided.

That is, the liquid crystal display element according to the first embodiment has a configuration in which the first electrode and the second substrate are formed on one substrate; whereas, the liquid crystal display element in the second embodiment has a configured to includes the third electrode in a region other than the neighboring region of the first substrate on which the first electrode and the second electrode are provided. It is considered that when the third electrode is included, in addition to an electric flux line present between the first electrode and the second electrode, the electric flux line is formed between the first electrode and the third electrode and/or between the second electrode and the third electrode, and thus it is possible to reduce the alignment unevenness in liquid crystal molecules by the electric flux lines. Particularly, in the n-type liquid crystal composition, the direction orthogonal to the major axis direction of the liquid crystal molecules is along with an electric flux line, and thus, for example, it is considered that when a component in the thickness direction of the liquid crystal layer (direction connecting the first substrate and the second substrate) is included in the electric flux line vector formed between the first electrode and the third electrode and/or between the second electrode and the third electrode, it is possible to reduce the alignment unevenness of the liquid crystal molecules in the thickness direction.

Here, regarding the region, in which the third electrode is provided, other than the neighboring region of the first substrate (or the second substrate), the third electrode may be provided on both of the first substrate and the second substrate, or the third electrode may be provided in a region other than the neighboring region of the first substrate (or the second substrate) on which the first electrode and the second electrode are provided, and it is preferable that the first electrode, the second electrode, and the third electrode are provided in a region satisfying the condition that a shortest distance ($L^{1-3}$) between the first electrode and the third electrode, or a shortest distance ($L^{2-3}$) between the second electrode and the third electrode is longer than a shortest distance ($L^{1-2}$) between the first electrode and the second electrode. In addition, the region other than the neighboring region of the first substrate specifically refers to a region which is apart from the first substrate approximately 1 µm or more.

In the liquid crystal display element in the second embodiment according to the present invention, the first electrode, the second electrode, and the third electrode are provided; however, a fourth electrode, and a fifth electrode may be further provided. In addition, in the liquid crystal display element according to the present invention, among three or more electrodes including the first electrode, the second electrode, and the third electrode, one or more pixel electrodes and one or more common electrodes may be provided. Accordingly, for example, as long as the first electrode is the pixel electrode, and the second electrode is the common electrode, the third electrode may be any one of the pixel electrode and the common electrode.

In the liquid crystal display element in the second embodiment according to the present invention, the voltage applied between the first electrode and the third electrode or the voltage applied between the second electrode and the third electrode is preferably smaller than the voltage applied between the first electrode and the second electrode. With this, it is possible to reduce the alignment unevenness of the liquid crystal molecules in the direction other than a switching direction.

Hereinafter, first, embodiments of the liquid crystal composition in the present invention will be described
(Liquid Crystal Layer)

A liquid crystal composition in the present invention contains one or two or more types of compounds represented by General Formula (I), as a first component.

[Chem. 9]

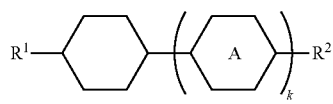
(I)

In the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, A represents a 1,4-phenylene group or a trans-1,4-cyclohexylene group, k represents 1 or 2; and, in a case of k is 2, two A's may be the same as or different from each other.

With respect to the entire content of the composition, as a lower limit of the total content of the compound represented by General Formula (I), 5% by mass is preferable, 10% by mass is further preferable, 15% by mass is still further preferable, 20% by mass is particularly preferable, and 25% by mass is most preferable, and as an upper limit thereof, 65% by mass is preferable, 55% by mass is further preferable, 50% by mass is still further preferable, 47% by mass is particularly preferable, and 45% by mass is most preferable.

Examples of the compound represented by General Formula (I) include compounds represented by compound groups specifically represented by the following General Formula (I-a) to General Formula (I-e).

[Chem. 10]

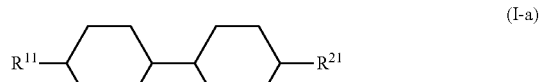
(I-a)

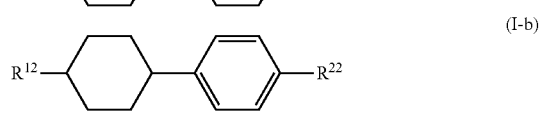
(I-b)

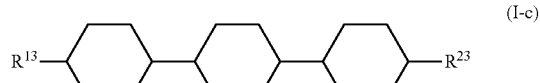
(I-c)

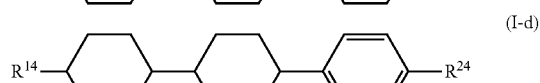
(I-d)

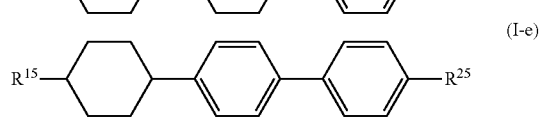
(I-e)

In the formula, $R^{11}$ to $R^{15}$ and $R^{21}$ to $R^{25}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

The number of types of the compounds selected from the compound groups represented by General Formula (I-a) to General Formula (I-e) is preferably in a range of one to ten, is particularly preferably one to eight, is particularly preferably one to five, and is also preferably two or more.

$R^{11}$ to $R^{15}$ and $R^{21}$ to $R^{25}$ each independently preferably represent an alkyl group having 1 to 8 carbon atoms, an alkenyl group having 2 to 8 carbon atoms, or an alkoxy group having 2 to 8 carbon atoms, further preferably represent an alkyl group having 1 to 5 carbon atoms, an alkenyl group having 2 to 5 carbon atoms, an alkoxy group having 2 to 5 carbon atoms, and in a case where it represents an alkenyl group, a structure represented by the following formula (i) to formula (iv) is preferable.

[Chem. 11]

(i)

(ii)

(iii)

-continued

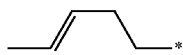
(iv)

In the formula, bonding to the ring structure is performed at the right end.

Or $R^{11}$ and $R^{21}$, $R^{12}$ and $R^{22}$, $R^{13}$ and $R^{23}$, $R^{14}$ and $R^{24}$, $R^{15}$ and $R^{25}$ may be the same or different, but it is preferable that they represent different substituents.

From the above aspects, for example, as the compound represented by General Formula (I), it is preferable to contain at least one compound selected from the compound group represented by the following General Formula (III):

[Chem. 12]

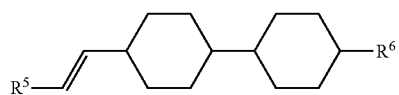
(III)

In the formula, $R^5$ represents a hydrogen atom or a methyl group, $R^6$ represents an alkyl group having 1 to 5 carbon atoms, an alkenyl group having 2 to 5 carbon atoms, or an alkoxy group having 1 to 4 carbon atoms.

The compound represented by General Formula (III) is preferably the compounds specifically described as follows.

[Chem. 13]

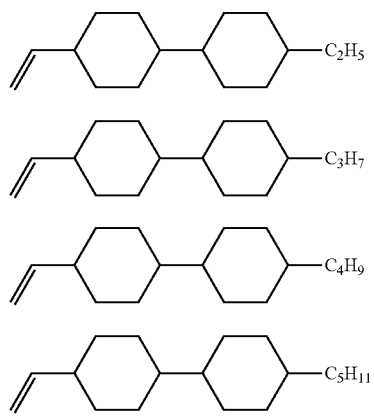

(III-a1)
(III-a2)
(III-a3)
(III-a4)

[Chem. 14]

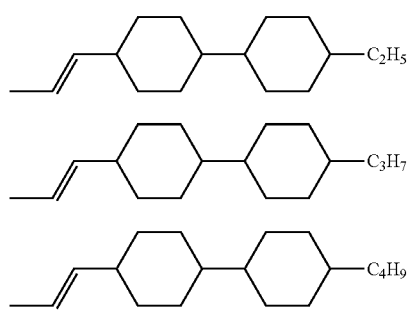

(III-b1)
(III-b2)
(III-b3)

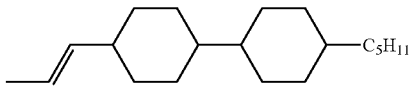
(III-b4)

In a case of containing the compound represented by General Formula (III), as the lower limit of the content of the compound represented by General Formula (III) in the liquid crystal composition, 5% by mass is preferable, 15% by mass is further preferable, 20% by mass is still further preferable, 23% by mass is particularly preferable, and 25% by mass is most preferable, and as the upper limit thereof, 70% by mass is preferable, 60% by mass is further preferable, 55% by mass is still further preferable, 52% by mass is particularly preferable, and 50% by mass is most preferable. More specifically, in a case where emphasis is placed on a response speed, as the lower limit, 20% by mass is preferable, 30% by mass is further preferable, 35% by mass is still further preferable, 38% by mass is particularly preferable, and 35% by mass is most preferable, and as the upper limit, 70% by mass is preferable, 60% by mass is further preferable, 55% by mass is still further preferable, 52% by mass is particularly preferable, and 50% by mass is most preferable. In a case where emphasis is placed on a driving voltage, as the lower limit, 5% by mass is preferable, 15% by mass is further preferable, 20% by mass is still further preferable, 23% by mass is particularly preferable, and 25% by mass is most preferable, and as the upper limit, 60% by mass is preferable, 50% by mass is further preferable, 45% by mass is still further preferable, 42% by mass is particularly preferable, and 40% by mass is most preferable. Regarding the ratio of the compound represented by General Formula (III), with respect to the total content of the compounds represented by General Formula (I) in the liquid crystal composition, as the lower limit of the content of the compound represented by General Formula (III), 60% by mass is preferable, 70% by mass is further preferable, 75% by mass is still further preferable, 78% by mass is particularly preferable, and 80% by mass is most preferable, and as the upper limit thereof, 90% by mass is preferable, 95% by mass is further preferable, 97% by mass is still further preferable, 99% by mass is particularly preferable, and 100% by mass is preferable.

In addition, more specific examples of the compounds represented by General Formula (I-a) to General Formula (I-e) other than the compound represented by General Formula (III) preferably include the following compounds.

[Chem. 15]

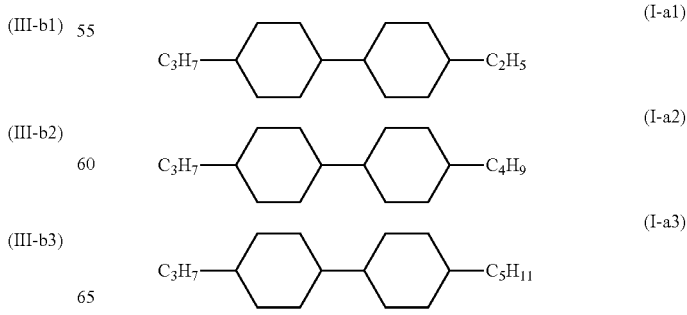

(I-a1)
(I-a2)
(I-a3)

[Chem. 16]
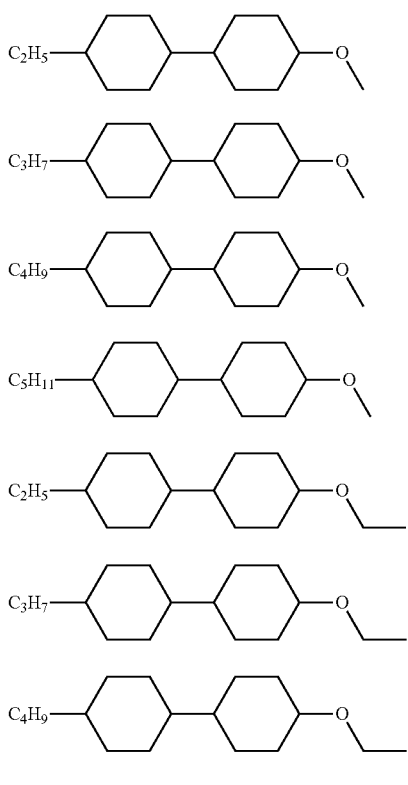
(I-a4), (I-a5), (I-a6), (I-a7), (I-a8), (I-a9), (I-a10), (I-a11)
[Chem. 17]
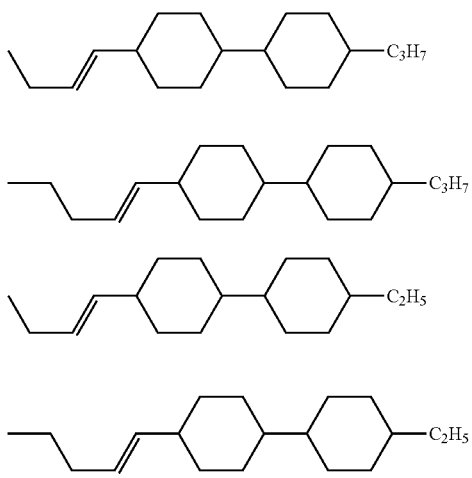
(I-a12), (I-a13), (I-a14), (I-a15)
[Chem. 18]
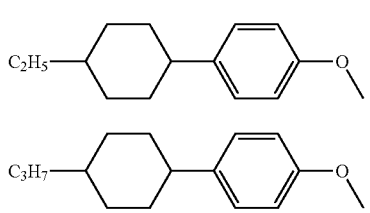
(I-b1), (I-b2)
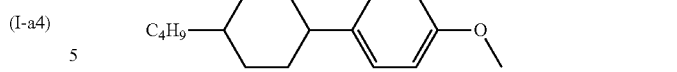 (I-b3)
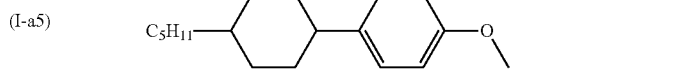 (I-b4)
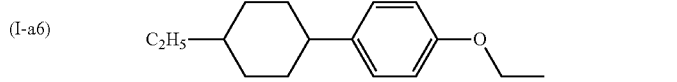 (I-b5)
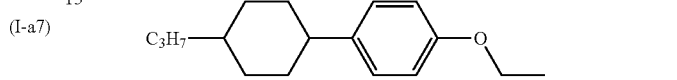 (I-b6)
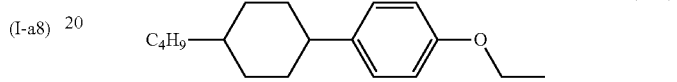 (I-b7)
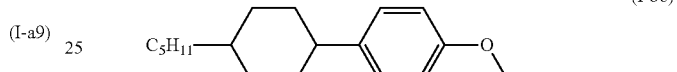 (I-b8)
[Chem. 19]
 (I-c1)
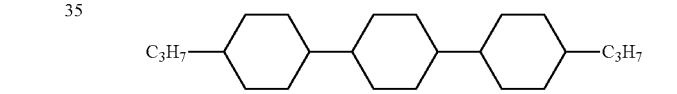 (I-c2)
[Chem. 20]
 (I-d1)
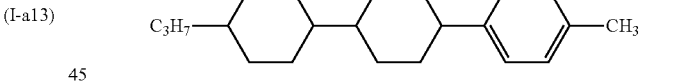 (I-d2)
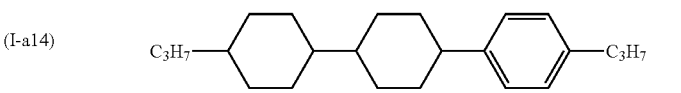 (I-d3)
[Chem. 21]
 (I-e1)
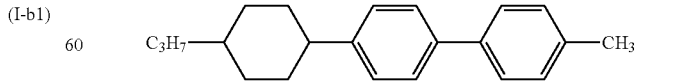 (I-e2)

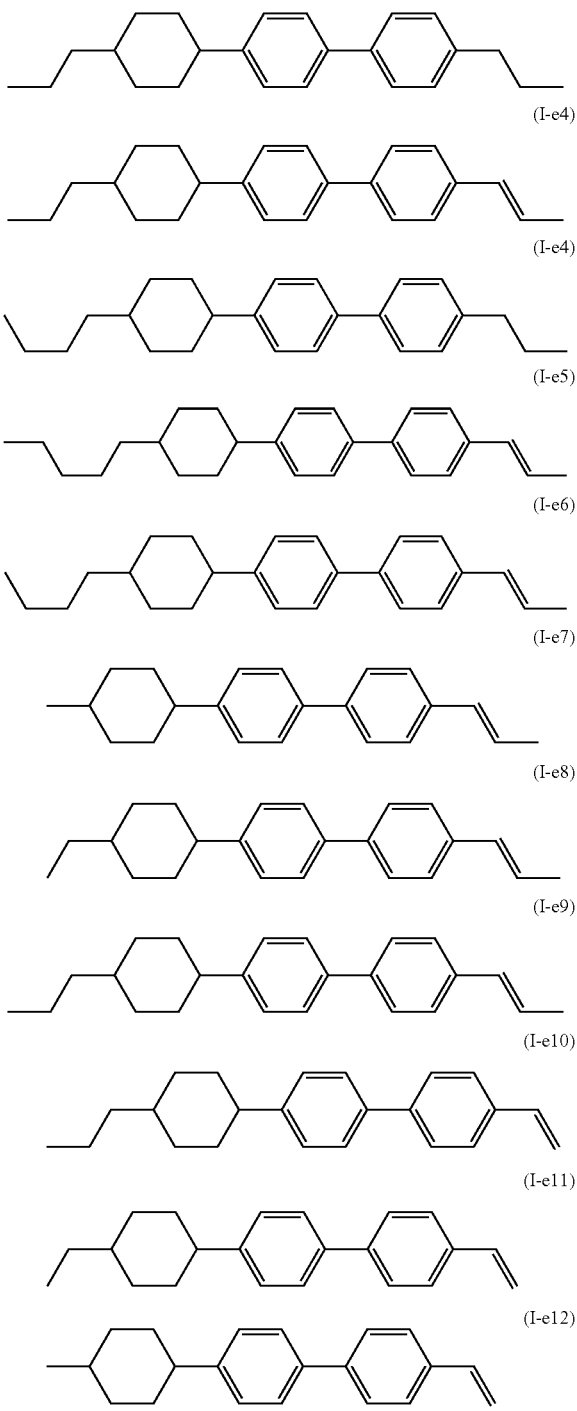

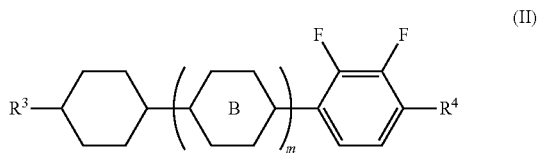

In the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^4$ represents an alkyl group having 1 to 8 carbon atoms, an alkenyl group having 4 to 8 carbon atoms, an alkoxy group having 1 to 8 carbon atoms or an alkenyloxy group having 3 to 8 carbon atoms, B represents a 1,4-phenylene group or a trans-1,4-cyclohexylene group (one or more carbon atoms of the cyclohexane ring may be substituted with an oxygen atom), m represents 0, 1, or 2; and in a case where m is 2, two B's may be the same as or different from each other.

As the lower limit of the content of the compound represented by General Formula (II) in the liquid crystal composition, 10% by mass is preferable, 20% by mass is further preferable, 25% by mass is still further preferable, 28% by mass is particularly preferable, and 30% by mass is most preferable, and as the upper limit thereof, 85% by mass is preferable, 75% by mass is further preferable, 70% by mass is still further preferable, 67% by mass is particularly preferable, and 65% by mass is most preferable.

The compound represented by General Formula (II) is preferably at least one or more types of compounds selected from the compound groups represented by the following General Formula (IIa) to General Formula (IIe), and is further preferably two or more types of compounds selected therefrom.

[Chem. 23]

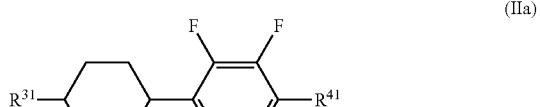

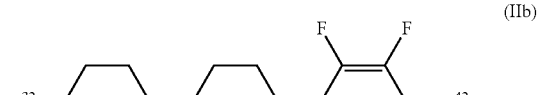

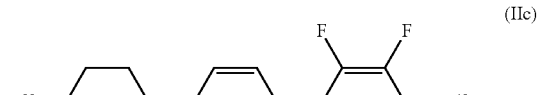

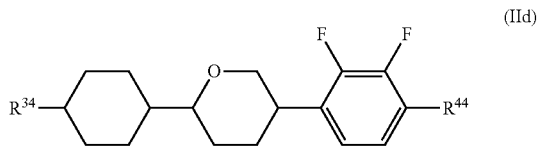

Among them, the compounds represented by formula (III-a2), formula (III-b2), formula (I-a1) to formula (I-a6), formula (I-b2), formula (I-b6), formula (I-d1), formula (I-d2), formula (I-d), formula (I-e2), and formula (I-e9) are preferable.

The liquid crystal composition in the present invention preferably contains, as a second component, one or two or more types of compounds represented by General Formula (II).

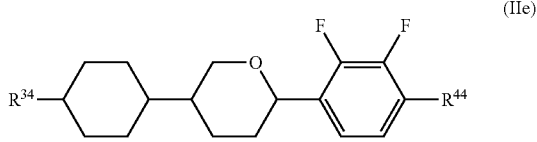

In the formula, $R^{31}$ to $R^{34}$ and $R^{41}$ to $R^{44}$ represent the same meaning as $R^3$ and $R^4$ in General Formula (II).

The compound represented by General Formula (IIa) is preferably compounds represented by formula (IIa-1) to formula (IIa-8) specifically described as follows.

[Chem. 24]

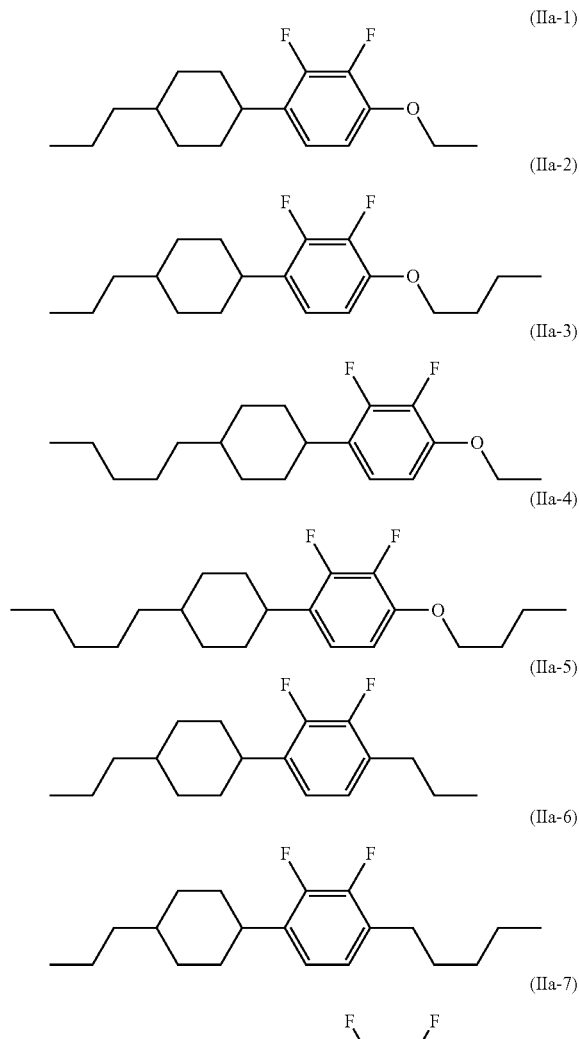

However, the compounds represented by formula (IIa-1) to formula (IIa-4) are further preferable, and the compounds represented by formula (IIa-1) and formula (IIa-3) are still further preferable.

As the lower limit of the compound represented by General Formula (IIa), 2% by mass is preferable, and 3% by mass is further preferable, and as the upper limit, 45% by mass is preferable, 35% by mass is further preferable, 30% by mass is still further preferable, 27% by mass is particularly preferable, and 25% by mass is most preferable.

In a case where four or more types of the compounds represented by General Formula (IIa) are used, the compounds represented by formula (IIa-1) to formula (IIa-4) are preferably used in combination, and the contents of the compounds represented by formula (IIa-1) to formula (IIa-4) are preferably equal to or greater than 50% by mass, are further preferably equal to or greater than 70% by mass, and still further preferably equal to or greater than 80% by mass, with respect to the compounds represented by General Formula (IIa1).

In a case where three types of the compounds represented by General Formula (IIa) are used, the compounds represented by formula (IIa-1), formula (IIa-2), and formula (IIa-3) are preferably used in combination, the contents of the compounds represented by formula (IIa-1), formula, (IIa-2), and formula (IIa-3) are preferably equal to or greater than 50% by mass, are further preferably equal to or greater than 70% by mass, are still further preferably equal to or greater than 80% by mass, are particularly preferably equal to or greater than 85% by mass, and are most preferably equal to or greater than 90% by mass with respect to the compound represented by General Formula (IIa).

In a case where two types of the compounds represented by General Formula (IIa) are used, the compounds represented by formula (IIa-1) and formula (IIa-3) are preferably used in combination, the content of the compounds represented by formula (IIa-1) and formula (IIa-3) are preferably equal to or greater than 50% by mass, are further preferably equal to or greater than 70% by mass, are still further preferably equal to or greater than 80% by mass, are particularly preferably equal to or greater than 85% by mass, and most preferably equal to or greater than 90% by mass, with respect to the compound represented by General Formula (IIa).

The compound represented by General Formula (IIb) is preferably compounds represented by formula (IIb-1) to formula (IIb-7) specifically described as follows.

[Chem. 25]

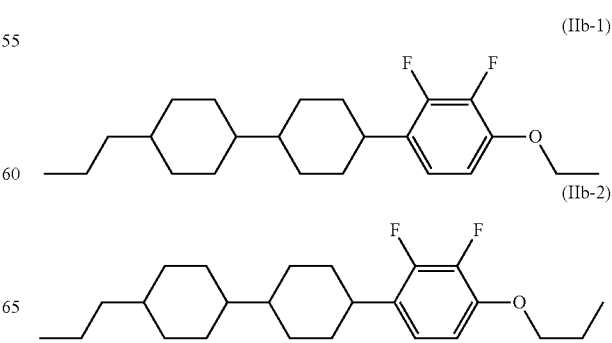

-continued

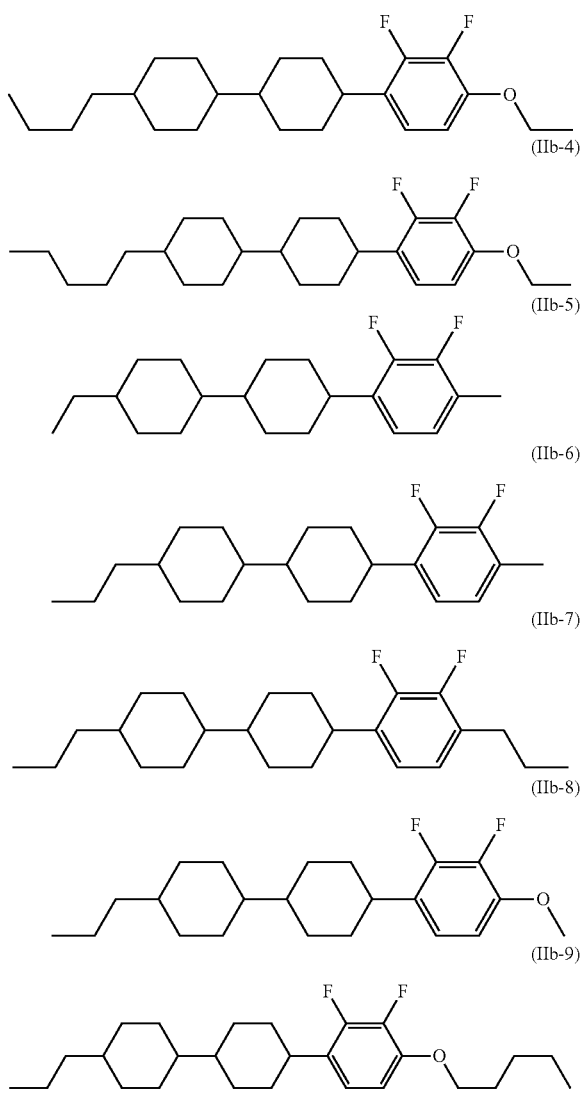

However, the compounds represented by formula (IIb-1) to formula (II-4), formula (IIb-7), formula (IIb-8), and formula (IIb-9) are further preferable, the compounds represented by formula (IIb-1) to formula (IIb-3), formula (IIb-7), formula (IIb-8), and formula (IIb-9) are still further preferable, and the compounds represented by formula (IIb-1), formula (IIb-3), formula (IIb-7), formula (IIb-8), and (IIb-9) are particularly preferable.

In a case where four or more types of the compounds represented by General Formula (IIb) are used, the compounds represented by formula (IIb-1) to formula (IIb-4) are preferably used in combination, and the contents of the compounds represented by formula (IIb-1) to formula (IIb-4) are preferably equal to or greater than 50% by mass, are further preferably equal to or greater than 70% by mass, are still further preferably equal to or greater than 80% by mass, are particularly preferably equal to or greater than 85% by mass, and are most preferably equal to or greater than 90% by mass, with respect to the compounds represented by General Formula (IIb).

In a case where three types of the compounds represented by General Formula (IIb) are used, the compounds represented by formula (IIb-1) to formula (IIb-3) are preferably used in combination, the contents of the compounds represented by formula (IIb-1) to formula (IIb-3) are preferably equal to or greater than 50% by mass, are further preferably equal to or greater than 70% by mass, are still further preferably equal to or greater than 80% by mass, are particularly preferably equal to or greater than 85% by mass, and are most preferably equal to or greater than 90% by mass with respect to the compound represented by General Formula (IIb).

In a case where two types of the compounds represented by General Formula (IIb) are used, the compounds represented by formula (IIb-1) and formula (IIb-3) are preferably used in combination, the contents of the compounds represented by formula (IIb-1) and formula (IIb-3) are preferably equal to or greater than 50% by mass, are further preferably equal to or greater than 70% by mass, are still further preferably equal to or greater than 80% by mass, are particularly preferably equal to or greater than 85% by mass, and most preferably equal to or greater than 90% by mass, with respect to the compound represented by General Formula (IIa2).

The compound represented by General Formula (IIc) is preferably compounds represented by formula (IIc-1) to formula (IIc-4) specifically described as follows.

[Chem. 26]

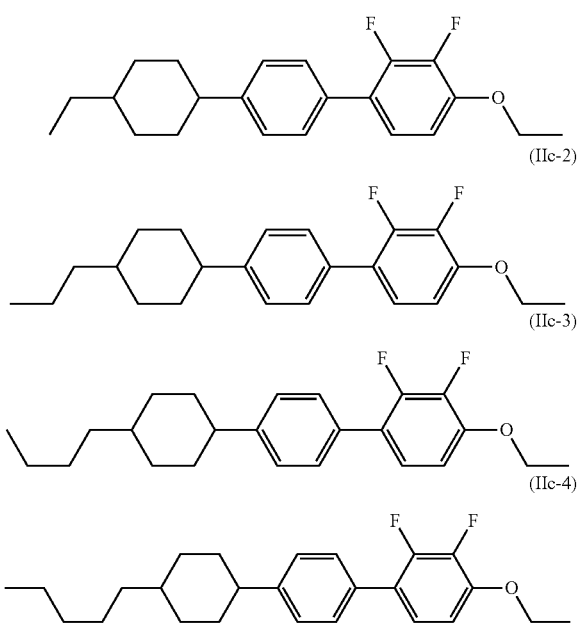

However, the compounds represented by formula (IIc-1) or formula (IIc-2) are preferable.

In a case where two types of the compounds represented by General Formula (IIc) are used, the compounds represented by formula (IIc-1) and formula (IIc-2) are preferably used in combination, the content of the compounds represented by formula (IIc-1) and formula (IIc-2) are preferably equal to or greater than 50% by mass, are further preferably equal to or greater than 70% by mass, are still further preferably equal to or greater than 80% by mass, are particularly preferably equal to or greater than 85% by mass, and most preferably equal to or greater than 90% by mass, with respect to the compound represented by General Formula (IIc).

The compound represented by General Formula (IId) or General Formula (IIe) is preferably compounds represented by formula (IId-1) to (IId-4), and formula (IIe-1) to (IIe-4) specifically described as follows.

[Chem. 27]

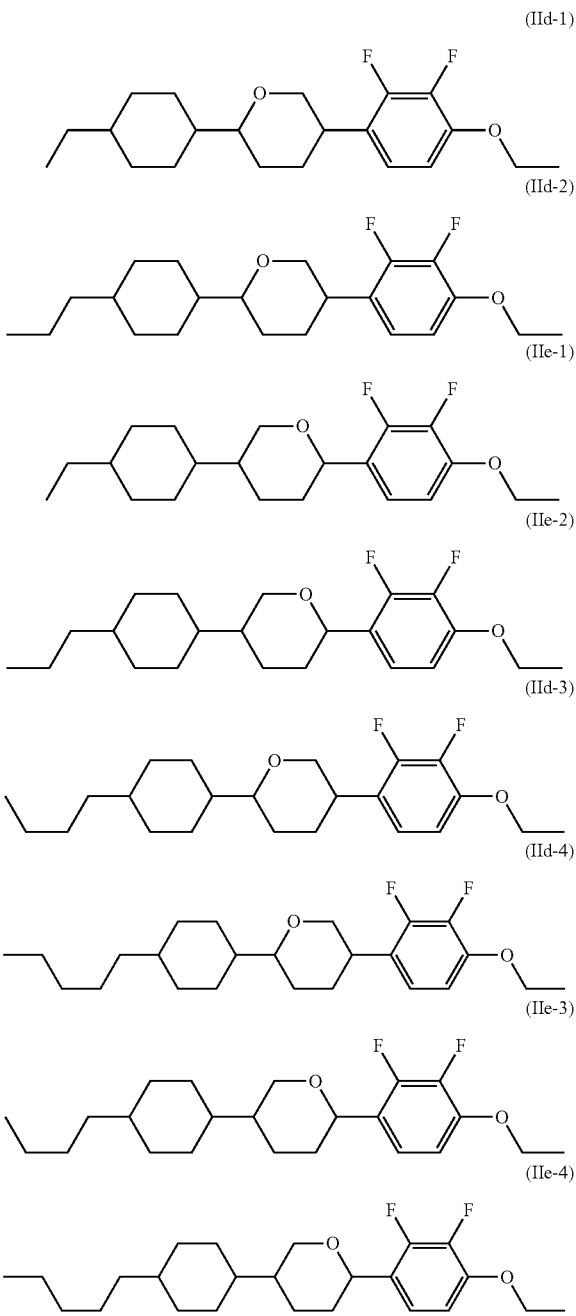

As the lower limit of the content of the compound represented by General Formula (IId) in the liquid crystal composition according to the present invention, 1% by mass is preferable, and 2% by mass is further preferable, and as the upper limit thereof, 15% by mass is preferable, 12% by mass is further preferable, 10% by mass is still further preferable, 8% by mass is particularly preferable, and 7% by mass is most preferable.

As the lower limit of the content of the compound represented by General Formula (IIe) in the liquid crystal composition according to the present invention, 1% by mass is preferable, 2% by mass is further preferable, and as the upper limit thereof, 15% by mass is preferable, 12% by mass is further preferable, 10% by mass is still further preferable, 8% by mass is particularly preferable, and 7% by mass is most preferable.

The composition of the present invention preferably contains the compound represented by General Formula (IV). Here, as the compound represented by General Formula (IV), the compound represented by General Formula (II) is excluded.

[Chem. 28]

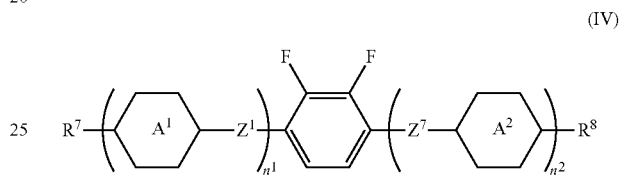

In the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, a methylene group in the alkyl group, the alkenyl group, the alkoxy group, or the alkenyloxy group may be substituted with an oxygen atom as long as the oxygen atoms are not bonded consecutively, and may be substituted with a carbonyl group as long as the carbonyl groups are not bonded consecutively, $A^1$ and $A^2$ each independently represent a 1,4-cyclohexylene group, a 1,4-phenylene group or a tetrahydropyran-2,5-diyl group; provided that, in a case where $A^1$ or/and $A^2$ represent a 1,4-phenylene group, one or more hydrogen atoms in the 1,4-phenylene group may be substituted with a fluorine atom, and one or more carbon atoms ($—CH_2—$) of a cyclohexane ring may be substituted with an oxygen atom, $Z^1$ and $Z^2$ each independently represent a single bond, $—OCH_2—$, $—OCF_2—$, $—CH_2O—$, or $CF_2O—$, $n^1$ and $n^2$ each independently represent 0, 1, 2, or 3, provided that $n^1+n^2$ is 1 to 3, and in a case where a plurality of $A^1$, $A^2$, $Z^1$ and/or $Z^2$ are present, plural $A^1$s, $A^2$s, $Z^1$s, and/or $Z^2$s each may be the same as or different from each other, with the proviso that a compound in which $n^1$ is 1 or 2, $n^2$ is 0, at least one of $A^1$'s is a 1,4-cyclohexylene group, and all of $Z^1$'s are single bonds is excluded.

As the lower limit of the content of the compound represented by General Formula (IV) in the liquid crystal composition, 2% by mass is preferable, 3% by mass is further preferable, 4% by mass is still further preferable, 5% by mass is particularly preferable, and as the upper limit thereof, 45% by mass is preferable, 35% by mass is further preferable, 30% by mass is still further preferable, 27% by mass is particularly preferable, and 25% by mass is most preferable.

In General Formula (IV), when the ring structure to which $R^7$ and $R^8$ are bonded is a cyclohexane or tetrahydropyran, $R^7$ and $R^8$ are preferably an alkyl group or an alkenyl group, and when the aforementioned ring structure is benzene, $R^7$ and $R^8$ are preferably an alkyl group, alkoxy group, or an alkenyl group. When the aforementioned ring structure is cyclohexane or tetrahydropyran, $R^7$ and $R^8$ preferably represent an alkyl group having 1 to 8 carbon atoms, and an alkenyl group having 2 to 8 carbon atoms, further preferably represent an alkyl group having 1 to 8 carbon atoms, further preferably represent an alkyl group having 3 to 5 carbon atoms, still further preferably represent an alkyl group having 3 or 5 carbon atoms, and are preferably linear. In addition, in General Formula (IV), when the ring structure to which $R^7$ and $R^8$ are bonded is benzene, $R^7$ and $R^8$ preferably represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, an alkyl group having 1 to 8 carbon atoms, or an alkoxy group having 1 to 8 carbon atoms, further preferably represent an alkyl group having 3 to 5 carbon atoms or an alkoxy group having 2 to 4 carbon atoms, further preferably represent an alkyl group having 3 or 5 carbon atoms or an alkoxy group having 2 or 4 carbon atoms, still further preferably represent an alkoxy group having 2 or 4 carbon atoms, and are preferably linear.

In a case where emphasis is placed on the improvement of the response speed of the display element, an alkenyl group is preferable, in a case where emphasis is placed on the reliability such as voltage holding ratio, an alkyl group is preferable. As the alkenyl group, structures represented by formula (i) to formula (iv) described below are preferable.

[Chem. 29]

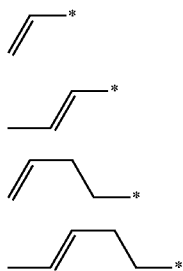

In the formula, bonding to the ring structure is performed at the right end.

$A^1$ and $A^2$ each independently are preferably a 1,4-cyclohexylene group, a 1,4-phenylene group, or a tetrahydropyran-2,5-diyl group.

In a case where emphasis is placed on a decrease in viscosity, $Z^1$ and $Z^2$ each preferably independently represent a single bond, a case where emphasis is placed on increasing the absolute value of $\Delta\epsilon$, —OCH$_2$—, —OCF$_2$—, —CH$_2$O—, or —CF$_2$O— is preferable, and the oxygen atoms are preferably disposed so as to connect to the 2,3-difluorobenzene-1,4-diyl group.

$n^1+n^2$ is preferably equal to or less than 2, in a case where emphasis is placed on the decrease in the viscosity, $n^1+n^2$ is preferably 1, and in a case where emphasis is placed on $T_{NI}$, or in a case where emphasis is placed on an increase in $\Delta n$, $n^1+n^2$ is preferably 2.

The compound represented by General Formula (IV) is preferably selected from the compound groups represented by the following General Formulae (IVa1) to (IVa4).

[Chem. 30]

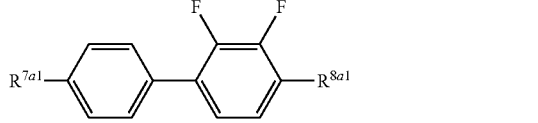

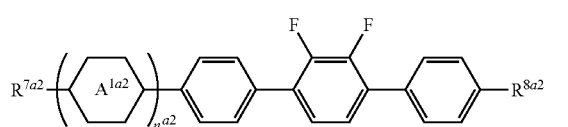

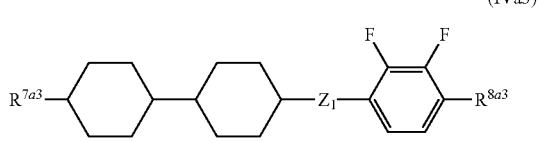

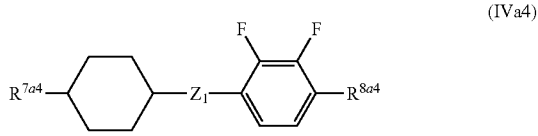

In the formula, $R^{7a1}$, $R^{7a2}$, $R^{7a3}$, and $R^{7a4}$, and $R^{8a1}$, $R^{8a2}$, $R^{8a3}$, and $R^{8a4}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, a methylene group in the alkyl group, the alkenyl group, the alkoxy group, or the alkenyloxy group may be substituted with an oxygen atom as long as the oxygen atoms are not bonded consecutively, and may be substituted with a carbonyl group as long as the carbonyl groups are not bonded consecutively, $Z^1$ each independently represents —OCH$_2$—, —OCF$_2$—, —CH$_2$O—, or CF$_2$O—, $n^{a2}$ represents 0 or 1, $A^{1a2}$ represents a 1,4-cyclohexylene group, a 1,4-phenylene group or a tetrahydropyran-2,5-diyl group, and one or more hydrogen atoms in the 1,4-phenylene groups represented by General Formula (IVa1) and General Formula (IVa2) may be substituted with a fluorine atom.

The compound represented by General Formula (IVa1) is preferably compounds represented by formula (IVa1-1) to formula (IVa1-9) specifically described as follows.

[Chem. 31]

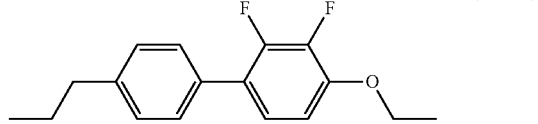

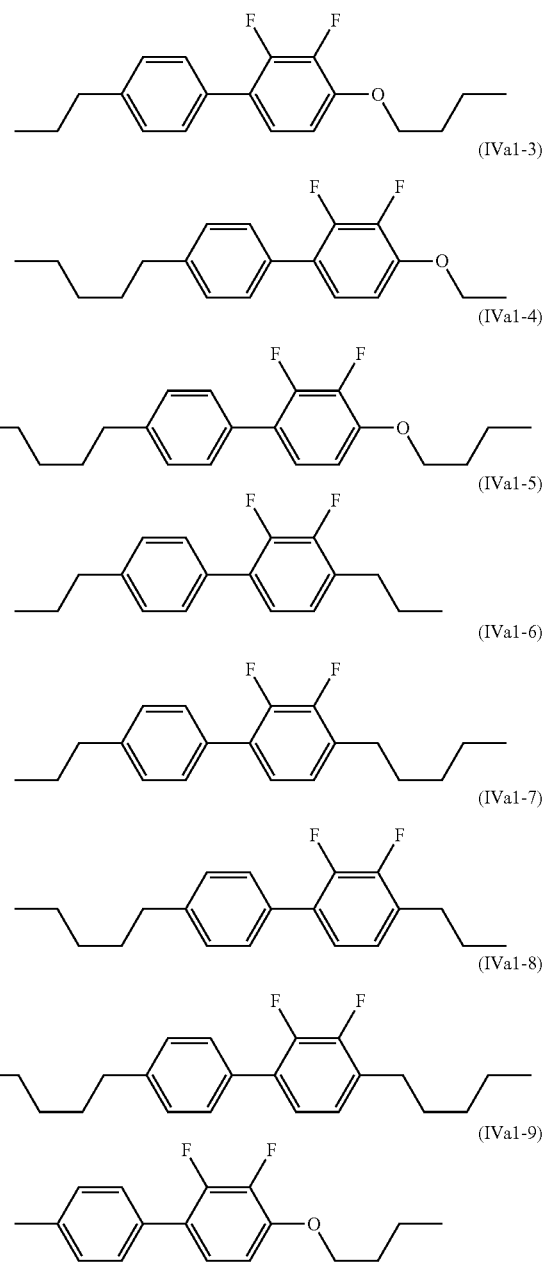

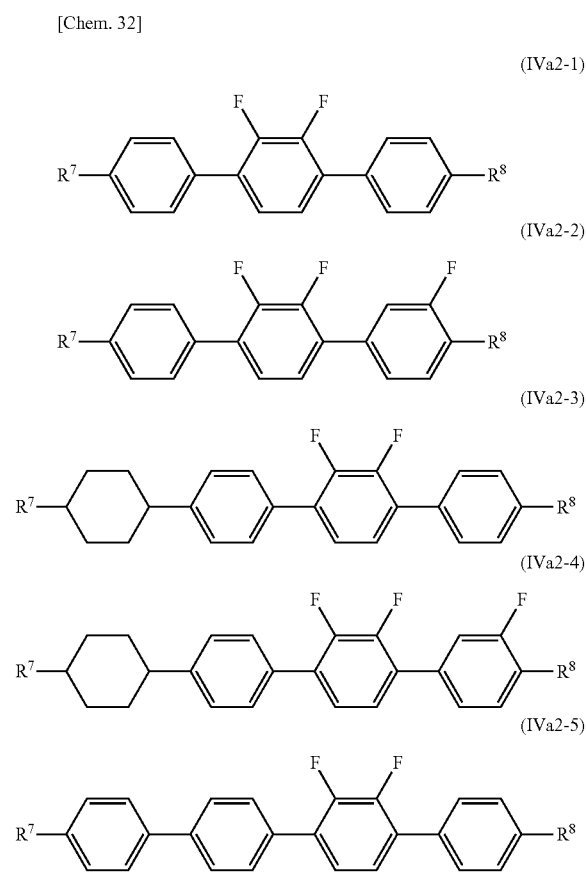

85% by mass, and are most preferably equal to or greater than 90% by mass, with respect to the compounds represented by General Formula (IVa1).

In a case where three types of the compounds represented by General Formula (IVa1) are used, the compounds represented by formula (IVa1-1) to formula (IVa1-3) are preferably used in combination, the contents of the compounds represented by formula (IVa1-1) to formula (IVa1-3) are preferably equal to or greater than 50% by mass, are further preferably equal to or greater than 70% by mass, are still further preferably equal to or greater than 80% by mass, are particularly preferably equal to or greater than 85% by mass, and are most preferably equal to or greater than 90% by mass with respect to the compound represented by General Formula (IVa1).

In a case where two types of the compounds represented by General Formula (IVa1) are used, the compounds represented by formula (IVa1-1) and formula (IVa1-3) are preferably used in combination, the contents of the compounds represented by formula (IVa1-1) and formula (IVa1-3) are preferably equal to or greater than 50% by mass, are further preferably equal to or greater than 70% by mass, are still further preferably equal to or greater than 80% by mass, are particularly preferably equal to or greater than 85% by mass, and most preferably equal to or greater than 90% by mass, with respect to the compound represented by General Formula General Formula (IVa1).

The compound represented by General Formula (IVa2) is preferably compounds represented by General Formula (IVa2-1) to General Formula (IVa2-9) specifically described as follows.

[Chem. 32]

However, the compounds represented by formula (IVa1-1) to formula (IVa1-4), and formula (IVa1-9) are further preferable, the compounds represented by formula (IVa1-1) and formula (IVa1-3) are still further preferable, and the compound represented by formula (IVa1-1) is particularly preferable.

In a case where four or more types of the compounds represented by General Formula (IVa1) are used, the compounds represented by formula (IVa1-1) to formula (IVa1-4) are preferably used in combination, and the contents of the compound represented by formula (IVa1-1) to formula (IVa1-4) are preferably equal to or greater than 50% by mass, are further preferably equal to or greater than 70% by mass, are still further preferably equal to or greater than 80% by mass, are particularly preferably equal to or greater than -continued

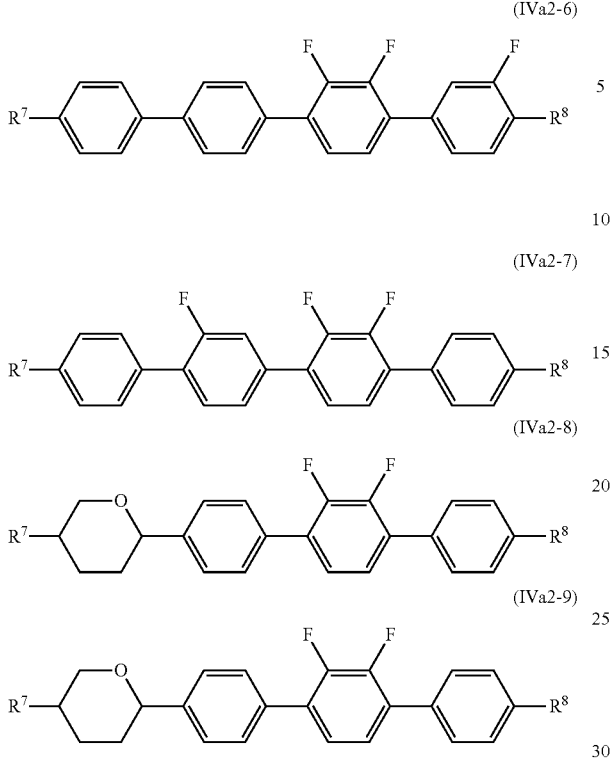

In the formula, $R^7$ represents the same meaning as $R^7$ in General Formula (IV), and $R^8$ represents the same meaning as $R^8$ in General Formula (IV).

In a case of using the compound represented by General Formula (IVa2), the compound represented by formula (IVa2-1) is preferably used, and the content of the compound represented by formula (IVa2-1) is preferably equal to or greater than 50% by mass, is further preferably equal to or greater than 70% by mass, is still further preferably equal to or greater than 80% by mass, is particularly preferably equal to or greater than 85% by mass, and is most preferably equal to or greater than 90% by mass, with respect to the compound represented by General Formula (IVa2).

$R^7$ and $R^8$ in General Formula (IVa2) each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and $R^7$ and $R^8$ preferably represent an alkyl group having 1 to 8 carbon atoms or an alkenyl group having 2 to 8 carbon atoms, further preferably represent an alkyl group having 2 to 5 carbon atoms or an alkenyl group having 2 to 5 carbon atoms, still further preferably represent an alkyl group having 2 to 5 carbon atoms, and are preferably linear, in a case where $R^7$ and $R^8$ are an alkyl group, it is preferable that $R^7$ and $R^8$ have different number of the carbon atoms from each other.

More specifically, a compound in which $R^7$ represents a propyl group, and $R^8$ represents an ethyl group, or a compound in which $R^7$ represents a butyl group, and $R^8$ represents an ethyl group is preferable.

As the compound represented by General Formula (IVa3), compounds represented by General Formula (IVa3-1) to General Formula (IVa3-8):

[Chem. 33]

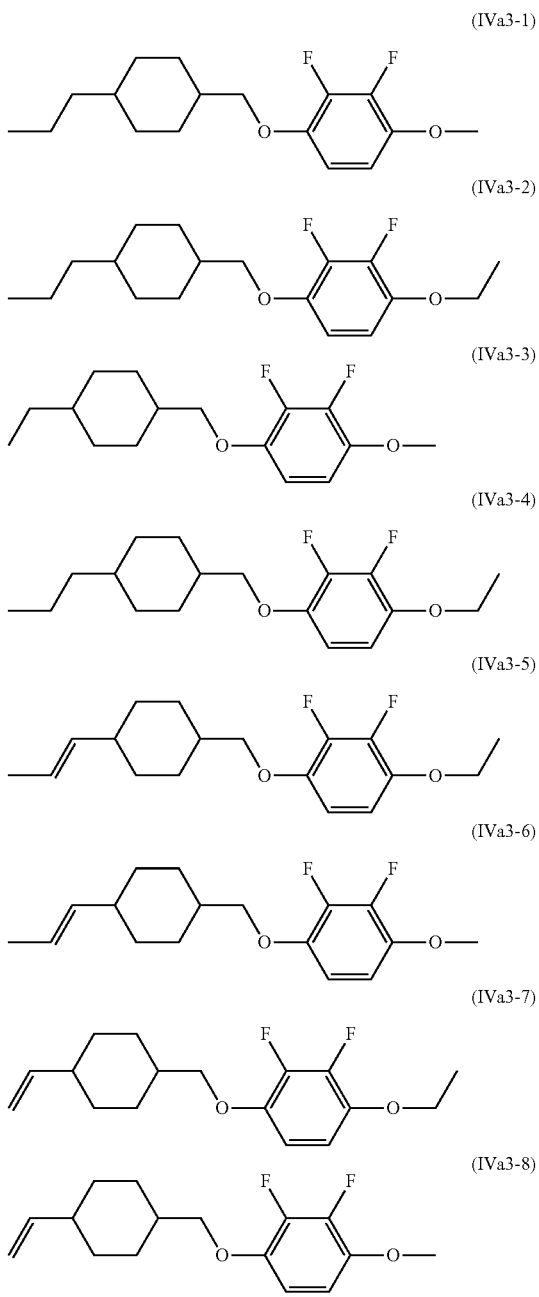

are preferable.

As the lower limit the content of the compound represented by General Formula (IVa3) in the liquid crystal composition according to the present invention, 1% by mass is preferable, and 2% by mass is further preferable, and as the upper limit thereof, 15% by mass is preferable, 12% by mass is further preferable, 10% by mass is still further preferable, 8% by mass is particularly preferable, and 7% by mass is most preferable.

The compound represented by General Formula (IVa4) is preferably compounds represented by General Formula (IVa4-1) to General Formula (IVa4-12) specifically described as follows.

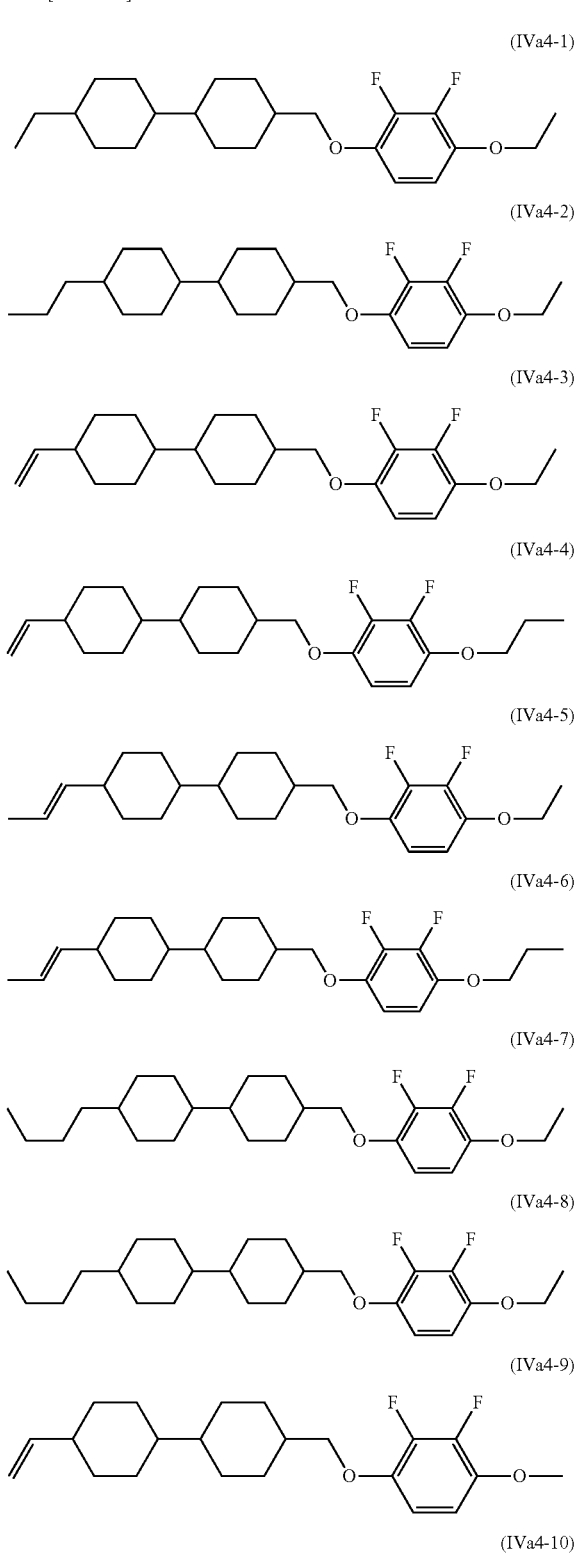

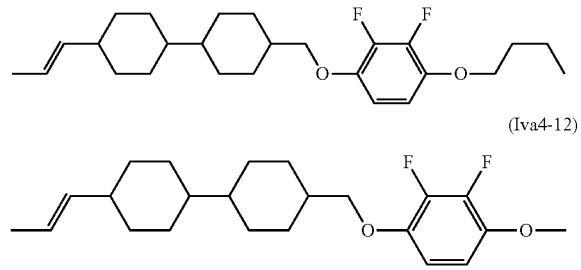

As the lower limit the content of the compound represented by General Formula (Iva4) in the liquid crystal composition according to the present invention, 1% by mass is preferable, and 2% by mass is further preferable, and as the upper limit thereof, 15% by mass is preferable, 12% by mass is further preferable, 10% by mass is still further preferable, 8% by mass is particularly preferable, and 7% by mass is most preferable.

The liquid crystal composition according to the present invention preferably contains the compound represented by the following General Formula (V).

[Chem. 35]

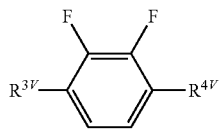

(V)

In the above-described General Formula (V), $R^{3V}$ and $R^{4V}$ each independently are preferably an alkyl group having 1 to 10 carbon atoms, an alkoxy group having 1 to 10 carbon atoms, an alkenyl group having 2 to 8 carbon atoms, or a alkenyloxy group having 2 to 8 carbon atoms, are further preferably an alkyl group having 1 to 8 carbon atoms, an alkoxy group having 1 to 9 carbon atoms, an alkenyl group having 2 to 6 carbon atoms, or an alkenyloxy group having 2 to 6 carbon atoms, and are still further preferably an alkoxy group having 2 to 7 carbon atoms. In a case where emphasis is placed on the improvement of the response speed of the display element, an alkenyl group is preferable, in a case where emphasis is placed on the reliability such as voltage holding ratio, an alkyl group is preferable.

In addition, in the above-described General Formula (V), the total number of carbon atoms of $R^{3V}$ and $R^{4V}$ is preferably in a range of 4 to 12.

As the compound represented by General Formula (V), the following compounds are preferable.

[Chem. 36]

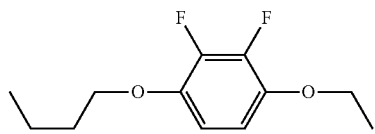

(V-1)

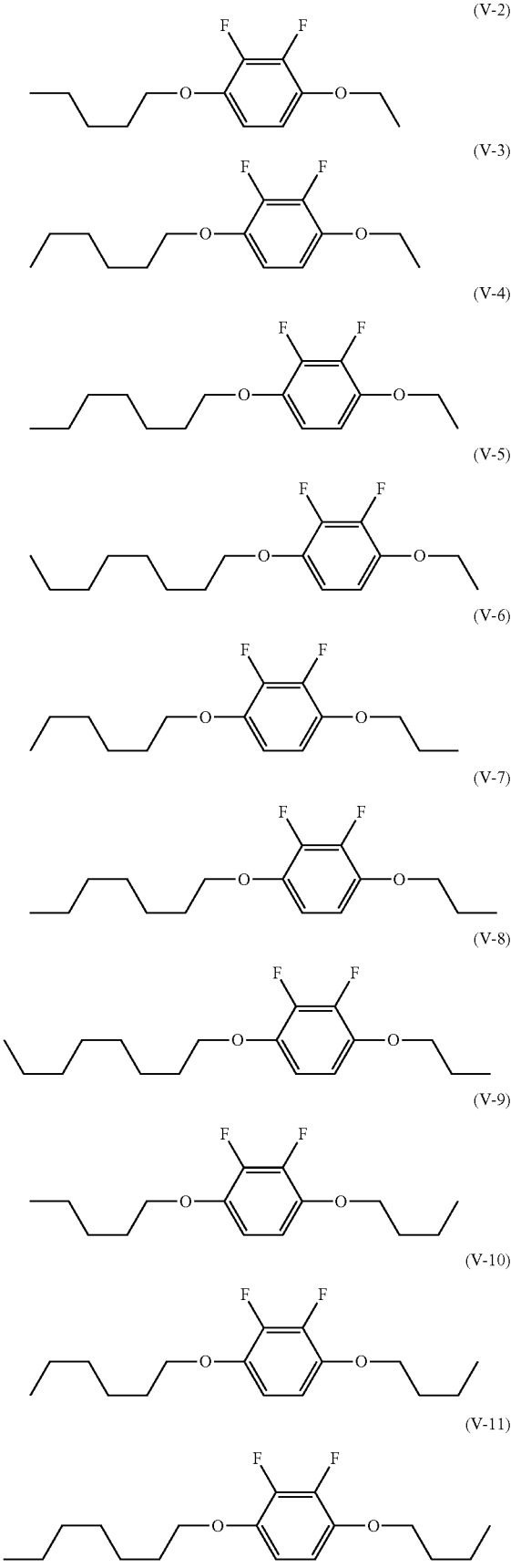

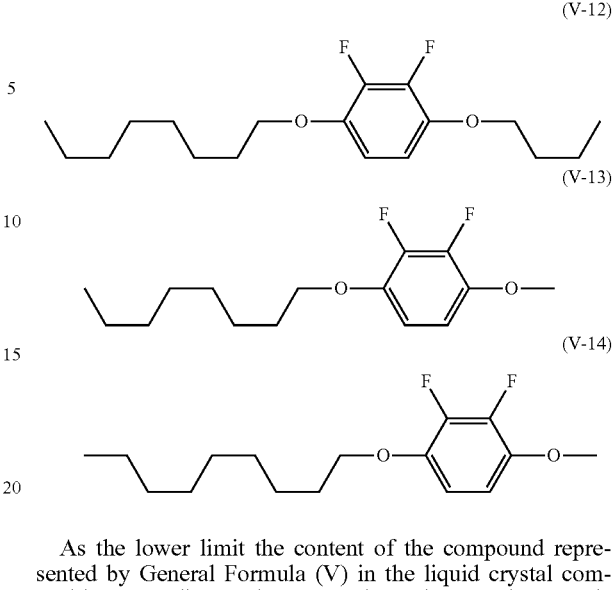

As the lower limit the content of the compound represented by General Formula (V) in the liquid crystal composition according to the present invention, 1% by mass is preferable, and 2% by mass is further preferable, and as the upper limit thereof, 15% by mass is preferable, 12% by mass is further preferable, 10% by mass is still further preferable, 8% by mass is particularly preferable, and 7% by mass is most preferable.

The 1,4-cyclohexyl group in the present application is preferably a trans-1,4-cyclohexyl group.

The liquid crystal composition in the present invention is an essential component of the compounds represented by General Formula (I) and General Formula (II), and it is possible to contain the compound represented by General Formula (IV) (here, the compound represented by General Formula (II) is excluded). The total content of the compounds represented by formula (I), formula (II), and General Formula (IV) which are contained in the liquid crystal composition is preferably 80 to 100% by mass, is further preferably 85 to 100% by mass, is still further preferably 90 to 100% by mass, is particularly preferably 95 to 100% by mass, and is most preferably 97 to 100% by mass.

As the lower limit of the total content of the compounds represented by General Formula (I) and General Formula (II), which are contained in the liquid crystal composition of the present application, 55% by mass is preferable, 65% by mass is fur ther preferable, 70% by mass is still further preferable, 73% by mass is particularly preferable, and 75% by mass is most preferable, and as the upper limit thereof, 85% by mass is preferable, 90% by mass is further preferable, 92% by mass is still further preferable, 94% by mass is particularly preferable, and 95% by mass is most preferable.

It is preferable that the liquid crystal composition of the invention of the present application does not contain a compound having a structure in which the oxygen atoms are bonded to each other, such as a peracid (—CO—OO—) structure, in the molecule.

In a case where emphasis is placed on the reliability and long-term stability of the liquid crystal composition, the content of the compound having a carbonyl group is preferably equal to or less than 5% by mass, is further preferably equal to or less than 3% by mass, is still further preferably equal to or less than 1% by mass, and is most preferably not substantially contained with respect to the total mass of the composition.

The content of the compound in which all the ring structures in the molecule are 6-membered rings is preferably large, and the content of the compound in which all the ring structures in the molecule are 6-membered rings is preferably equal to or greater than 80% by mass, is further preferably equal to or greater than 90% by mass, and is still further preferably equal to or greater than 95% by mass with respect to the total mass of the composition. It is most preferable that the liquid crystal composition is formed of only the compound in which substantially all the ring structures in the molecule are 6-membered rings.

In order to suppress deterioration of the liquid crystal composition due to oxidation, the content of the compound having a cyclohexenylene group as a ring structure is preferably small, and the content of the compound having the cyclohexenylene group is preferably equal to or less than 10% by mass, is further preferably equal to or less than 5% by mass, with respect to the total mass of the composition, and still further preferably, the compound is not substantially contained.

In order to suppress deterioration of the liquid crystal composition due to oxidation, the content of the compound having —CH=CH— as a linking group is preferably small, and the content of the compound is preferably equal to or less than 10% by mass, is further preferably equal to or less than 5% by mass, with respect to the total mass of the composition, and still further preferably, the compound is not substantially contained.

In a case where emphasis is placed on improvement of viscosity and improvement of $T_{NI}$, the content of the compound having a 2-methylbenzene-1,4-diyl group in which a hydrogen atom may be substituted with a halogen in the molecules is preferably small, and the content of the compound having the 2-methylbenzene-1,4-diyl group in the molecule is preferably equal to or less than 10% by mass, is further preferably equal to or less than 5% by mass, with respect to the total mass of the composition, and, still further preferably, the compound is not substantially contained.

In a case where the compound contained in the composition of the present invention has an alkenyl group as a side chain, when the alkenyl group is bonded to cyclohexane, the number of carbon atoms of the alkenyl group is preferably 2 to 5, and when the alkenyl group is bonded to benzene, the number of carbon atoms of the alkenyl group is preferably 4 to 5, and it is preferable that the unsaturated bond of the alkenyl group and benzene are not directly bonded. In addition, in a case where emphasis is placed on the stability of the liquid crystal composition, the content of the compound having an alkenyl group as a side chain, and a 2,3-difluorobenzene-1,4-diyl group is preferably having small, and the content of the compound is preferably equal to or less than 10% by mass, is further preferably equal to or less than 5% by mass, with respect to the total mass of the composition, and, still further preferably, the compound is not substantially contained.

The value of the dielectric anisotropy $\Delta\in$ of the liquid crystal composition of the present invention is a negative value, and the absolute value of the dielectric anisotropy is 2 or more. The value of the dielectric anisotropy $\Delta\in$ is preferably −2.0 to −6.0 at 25° C., more preferably −2.5 to −5.0, and even more preferably −2.5 to −4.0 and in more detail, preferably −2.5 to −3.4 in a case where emphasis is placed on the response speed, and preferably −3.4 to −4.0 in a case where emphasis is placed on the driving voltage.

The value of the refractive index anisotropy Δn of the liquid crystal composition in the present invention is preferably 0.08 to 0.13 at 25° C. and 0.09 to 0.12 is more preferable. More specifically, preferably 0.10 to 0.12 in a case of corresponding to a thin cell gap, and preferably 0.08 to 0.10 in a case of corresponding to a thick cell gap.

In addition, the liquid crystal composition according to the present invention may contain a compound having positive dielectric anisotropy as another component, and for example, the liquid crystal composition may contain at least one type selected from the group consisting of the compounds represented by the following formulae (c1), (c2), and (c3).

[Chem. 37]

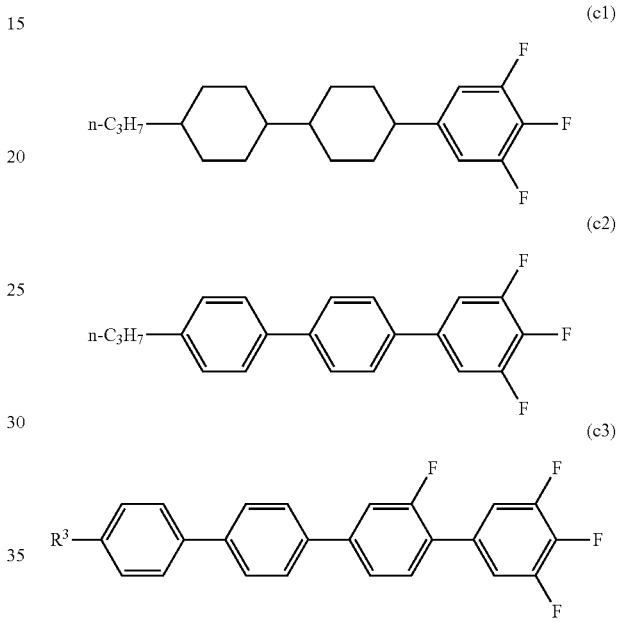

In the above-described formula (c3), $R^3$ is the same as being in General Formula (II), and thus the description is omitted here.

In a case of containing the compounds represented by formulae (c1), (c2), and (c3), each of the respective contents is preferably 1 to 20% by mass, is further preferably 2 to 10% by mass, and is still further preferably 3 to 7% by mass with respect to the liquid crystal composition.

The rotational viscosity ($\gamma_1$) of the liquid crystal composition in the present invention is preferably equal to or lower than 150, is further preferably equal to or lower than 130, and is particularly preferably equal to or lower than 120.

In the liquid crystal composition in the present invention, Z which is a function of the rotational viscosity and the refractive index anisotropy preferably represents a particular value.

$$Z = \frac{\gamma 1}{\Delta n^2} \quad \text{[Expression 1]}$$

In the formula, $\gamma_1$ represents the rotational viscosity, and Δn represents the refractive index anisotropy.

Z is preferably equal to or less than 13,000, is further preferably equal to or less than 12,000, and is particularly preferably equal to or less than 11,000.

The nematic phase-isotropic liquid transition temperature ($T_{NI}$) of the liquid crystal composition in the present invention is 60° C. or more, is preferably 75° C. or more, is further preferably 80° C. or more, and is still further preferably 90° C. or more.

The liquid crystal composition of the present invention is required to have the specific resistance of equal to or greater than $10^{12}(\Omega \cdot m)$, and the specific resistance is preferably $10^{13}(\Omega \cdot m)$, and is further preferably equal to or greater than $10^{14}(\Omega \cdot m)$.

In addition to the above-described compounds, the liquid crystal composition of the present invention may contain ordinary nematic liquid crystal, smectic liquid crystal, cholesteric liquid crystal, an antioxidant, an ultraviolet absorber and the like, if necessary, and, in a case where the chemical stability of the liquid crystal composition is required, it is preferable not to have a chlorine atom in the molecule. In a case where the liquid crystal composition is required to have stability against light such as ultraviolet rays, it is desirable not to have a condensed ring or the like having a large conjugation length and having an absorption peak in the ultraviolet region, represented by a naphthalene ring or the like, in the molecule.

As preferred composition example of the liquid crystal composition used in the liquid crystal display element according to the present invention, for example, the following aspects can be exemplified in addition to the Examples described below. For example, in a case where emphasis is placed on the response speed, in a first aspect of the liquid crystal composition according to the present invention, it is preferable to contain a compound represented by General Formula (III) in a range of 1 to 55% by mass, a compound represented by General Formula (I-d) in a range of 0 to 15% by mass, a compound represented by General Formula (I-e) in a range of 0 to 10% by mass, a compound represented by General Formula (IIa) in a range of 0 to 30% by mass, a compound represented by General Formula (IIb) in a range of 0 to 30% by mass, a compound represented by General Formula (IIc) in a range of 0 to 25% by mass, a compound represented by General Formula (IIe) or (IId) in a range of 0 to 15% by mass, a compound represented by General Formula (IVa1) in a range of 0 to 20% by mass, a compound represented by General Formula (IVa2) in a range of 0 to 20% by mass, a compound represented by General Formula (IVa3) in a range of 0 to 20% by mass, and a compound represented by General Formula (IVa4) in a range of 0 to 20% by mass, and it is preferable that the compounds represented by these formulae account for 80 to 100 by mass of the liquid crystal composition.

(Liquid Crystal Display Element)

The above-described the liquid crystal composition of the present invention is applied to an FFS mode liquid crystal display element. Hereinafter, an example of the FFS mode liquid crystal display element according to the present invention will be described with reference to FIGS. 1 to 9.

Figure 3:
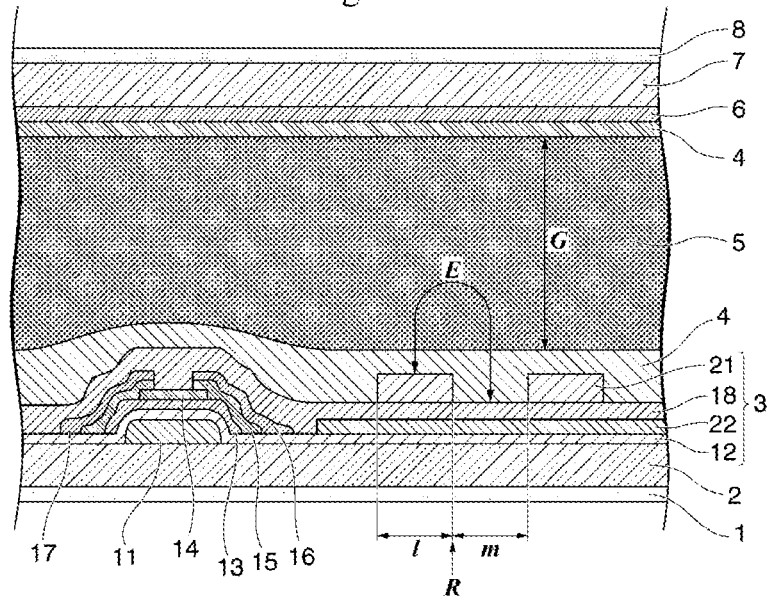
FIG. 3 is a cross-sectional view of the liquid crystal display element shown in FIG. 1 in the direction along the line III-III in FIG. 2.

FIG. 1 is a diagram schematically showing a configuration of the liquid crystal display element of the present invention. For the sake of convenience, FIG. 1 illustrates the constituent elements which are separately disposed from each other. As illustrated in FIG. 1, the liquid crystal display element 10 according to the present invention is configured such that an FFS mode liquid crystal display element includes a liquid crystal composition (or liquid crystal layer 5) which is interposed between a first transparent insulating substrate 2 and a second transparent insulating substrate 7 disposed so as to face each other, and has a feature of using the liquid crystal composition of the present invention as the liquid crystal composition. The first transparent insulating substrate 2 includes an electrode layer 3 which is formed on the surface on the liquid crystal layer 5 side. In addition, the liquid crystal display element 10 also has a liquid crystal layer 5 and a pair of alignment films 4 for inducing homogeneous alignment by directly coming into contact with the liquid crystal composition forming the liquid crystal layer 5, between the liquid crystal layer 5 and each of the first transparent insulating substrate 2 and the second transparent insulating substrate 8, and the liquid crystal molecules in the liquid crystal composition are aligned to be substantially parallel with respect to the substrates 2 and when no voltage is applied. As shown in FIG. 1 and FIG. 3, the second substrate 2 and the first substrate 8 may be interposed between a pair of polarizing plates 1 and 8. Furthermore, in FIG. 1, a color filter 6 is provided between the second substrate 7 and the alignment film 4.

That is, the liquid crystal display element 10 according to the present invention is formed by sequentially laminating the first polarizing place 1 (if necessary), the first substrate 2, the first electrode layer 3 including a thin film transistor, an alignment film 4, the liquid crystal layer 5 including a liquid crystal composition, the alignment film 4, the color filter 6, the second substrate 7 and the second polarizing plate 8 (if necessary). As the first substrate 2 and the second substrate 7, it is possible to use a transparent material having flexibility such as glass or plastic, and one substrate may be an opaque material such as silicon. The two substrates 2 and 7 are bonded together by a sealing material and a sealant such as an epoxy type thermosetting composition or the like disposed in the peripheral region and, in order to maintain the distance between the substrates, for example, a granular spacer such as glass particles, plastic particles, alumina particles or the like or a spacer column made of a resin formed by a photolithography method may be disposed therebetween.

Figure 2:
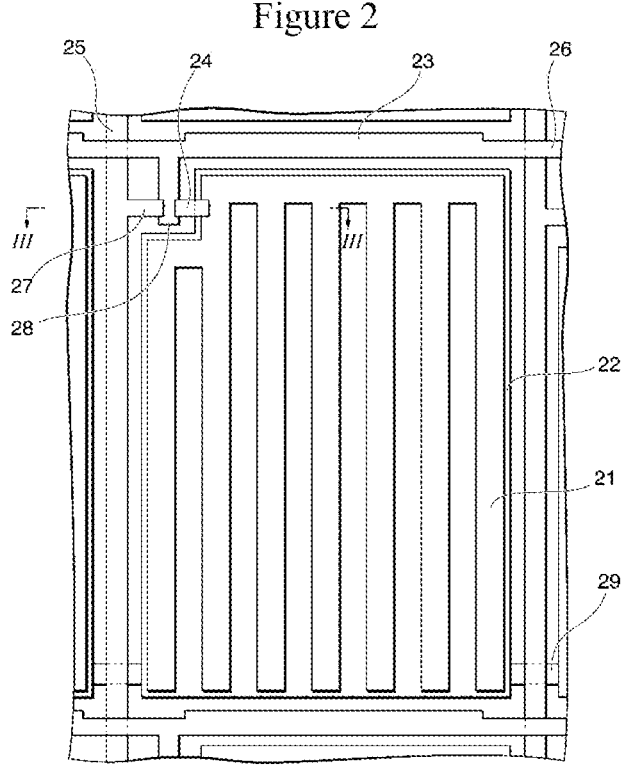
FIG. 2 is a planar diagram in which a region surrounded by a line II of an electrode layer 3 formed on a substrate 2 in FIG. 1 is enlarged.

FIG. 2 is an enlarged plan view of a region surrounded by the II line of the electrode layer 3 formed on the substrate 2 in FIG. 1. FIG. 3 is a cross-sectional view of the liquid crystal display element shown in FIG. 1 taken along the line III-III in FIG. 2. As shown in FIG. 2, the electrode layer 3 including the thin film transistor formed on the surface of the first substrate 2 includes a plurality of gate bus lines 26 for supplying scanning signals and a plurality of data bus lines 25 for supplying display signals, which are disposed in a matrix shape to cross each other. Note that, in FIG. 2, only a pair of gate bus lines 26 and a pair of data bus lines 25 are shown.

A region surrounded by the plurality of gate bus lines 26 and the plurality of data bus lines 25 forms a unit pixel of the liquid crystal display device, and the pixel electrode 21 and the common electrode 22 are formed in the unit pixel. Thin film transistors including a source electrode 27, a drain electrode 24, and a gate electrode 28 are provided in the vicinity of the intersections where the gate bus lines 26 and the data bus lines 25 intersect each other. This thin film transistor is connected to the pixel electrode 21 as a switch element for supplying a display signal to the pixel electrode 21. In addition, a common line 29 is provided in parallel with the gate bus lines 26. This common line 29 is connected to the common electrode 22 in order to supply a common signal to the common electrode 22.

As shown in FIG. 3, a preferable aspect of the structure of the thin film transistor has, for example, a gate electrode 11 formed on the surface of the substrate 2, a gate insulating layer 12 provided so as to cover the gate electrode 11 and to cover substantially the entire surface of the substrate 2, a semiconductor layer 13 formed on the surface of the gate insulating layer 12 so as to face the gate electrode 11, a protective film 14 provided so as to cover a part of the surface of the semiconductor layer 17, a drain electrode 16 provided so as to cover one side end portion of the protective layer 14 and the semiconductor layer 13 and to come into contact with the gate insulating layer 12 formed on the substrate 2 surface, a source electrode 17 provided so as to cover the other side end portion of the protective film 14 and the semiconductor layer 13 and to come into contact with the gate insulating layer 12 formed on the substrate 2 surface, and an insulating protective layer 18 provided so as to cover the drain electrode 16 and the source electrode 17. An anodic oxide coating (not shown) may be formed on the surface of the gate electrode 11 for a reason such as eliminating a step difference with the gate electrode.

For the semiconductor layer 13, it is possible to use amorphous silicon, polycrystalline polysilicon or the like and when a transparent semiconductor film such as ZnO, IGZO (In—Ga—Zn—O), ITO or the like is used, it is possible to suppress adverse effects on the light carrier caused by light absorption, which is preferable from the viewpoint of increasing the opening ratio of the element.

Furthermore, for the purpose of reducing the width and the height of the Schottky barrier, an ohmic contact layer 15 may be provided between the semiconductor layer 13 and the drain electrode 16 or the source electrode 17. For the ohmic contact layer, it is possible to use a material obtained by adding an impurity such as phosphorus such as n-type amorphous silicon or n-type polycrystalline silicon at a high concentration.

The gate bus lines 26, the data bus lines 25 and the common line 29 are preferably metal films, more preferably Al, Cu, Au, Ag, Cr, Ta, Ti, Mo, W, Ni or an alloy thereof, and a wiring of Al or an alloy thereof is particularly preferably used. In addition, the insulating protective layer 18 is a layer having an insulating function, and is formed of silicon nitride, silicon dioxide, a silicon oxynitride film, or the like.

In the embodiment shown in FIGS. 2 and 3, the common electrode 22 is a flat, plate-shaped electrode formed on the gate insulating layer 12, while the pixel electrode 21 is a comb shaped electrode formed on the insulating protective layer 18 covering the common electrode 22. That is, the common electrode 22 is disposed at a position closer to the first substrate 2 than the pixel electrode 21, and these electrodes are disposed to overlap with the insulating protective layer 18 interposed therebetween. The pixel electrode 21 and the common electrode 22 are formed of a transparent conductive material such as indium tin oxide (ITO), indium zinc oxide (IZO), indium zinc tin oxide (IZTO), or the like. Since the pixel electrode 21 and the common electrode 22 are formed of a transparent conductive material, the area to be opened in the unit pixel area is increased, and the opening ratio and the transmittance are increased.

In order to form a fringe electric field between the electrodes, the pixel electrode 21 and the common electrode 22 are formed such that an inter-electrode distance R between the pixel electrode 21 and the common electrode 22 is smaller than the distance G between the first substrate 2 and the second substrate 7. Note that, the inter-electrode distance R represents the distance between the electrodes in the horizontal direction along the substrate. FIG. 3 shows an example in which, since the flat, plate-shaped common electrode 22 and the comb-shaped pixel electrode 21 are overlapped with each other, the inter-electrode distance R=0, and since the inter-electrode distance R is smaller than the distance (that is, cell gap) G between the first substrate 2 and the second substrate 7, the electric field E of the fringe is formed. Accordingly, in the FFS type liquid crystal display element, it is possible to use a horizontal electric field formed in a direction perpendicular with respect to a line forming the comb shape of the pixel electrode 21 and a parabolic electric field. The electrode width 1 of the comb-shaped portion of the pixel electrode 21 and the width m of the gap of the comb-shaped portion of the pixel electrode 21 are preferably formed at a width such that all the liquid crystal molecules in the liquid crystal layer 5 are able to be driven by the generated electric field.

From the viewpoint of preventing the leakage of light, it is preferable that the color filter 6 form a black matrix (not shown) in a portion corresponding to the thin film transistor and a storage capacitor 23.

Figure 4:
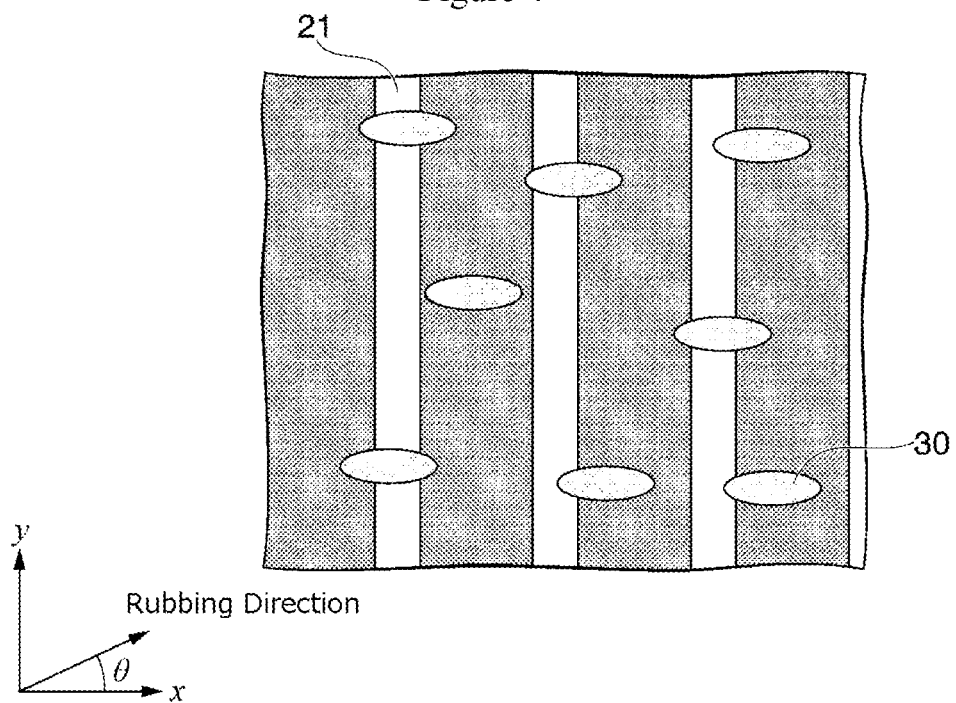
FIG. 4 is a schematic diagram illustrating an alignment direction of the liquid crystal induced by an alignment film 4.

On the electrode layer 3 and the color filter 6, a pair of alignment films 4 directly coming into contact with the liquid crystal composition forming the liquid crystal layer 5 to induce homogeneous alignment are provided. The alignment film 4 is, for example, a polyimide film subjected to a rubbing treatment, and the alignment directions of each alignment film are in parallel. Note that, the rubbing direction of the alignment film 4 (alignment direction of the liquid crystal composition) in the present embodiment will be described using FIG. 4. FIG. 4 is a diagram schematically showing the alignment direction of the liquid crystal induced by the alignment film 4. In the present invention, a liquid crystal composition having negative dielectric anisotropy is used. Accordingly, when the direction perpendicular to the line forming the comb shape of the pixel electrode 21 (the direction in which the horizontal electric field is formed) is the x axis, the angle θ formed by the x axis and the major axis direction of the liquid crystal molecule 30 is preferably aligned to be approximately 0 to 45°. In the example shown in FIG. 3, an example is shown in which the angle θ between the x axis and the major axis direction of the liquid crystal molecule 30 is approximately 0°. The reason why the alignment direction of the liquid crystal is induced is to increase the maximum transmittance of the liquid crystal display device.

In addition, the polarizing plate 1 and the polarizing plate 8 are able to be adjusted such that the viewing angle and contrast are favorable by adjusting the polarizing axes of the respective polarizing plates, and it is preferable to have transmission axes orthogonal to each other such that these transmission axes are operated in a normally black mode. In particular, it is preferable that any one of the polarizing plate 1 and the polarizing plate 8 be disposed so as to have a transmission axis parallel to the alignment direction of the liquid crystal molecules 30. In addition, it is preferable to adjust the product of the refractive index anisotropy Δn of the liquid crystal and the cell thickness d so that the contrast is maximized. Furthermore, it is also possible to use a retardation film for widening the viewing angle.

In the FFS type liquid crystal display device 10 formed as described above, by supplying an image signal (voltage) to the pixel electrode 21 via the thin film TFT, a fringe electric field is formed between the pixel electrode 21 and the common electrode 22 and the liquid crystal is driven by this electric field. That is, in a state in which no voltage is applied, the liquid crystal molecules 30 are disposed such that the major axis direction thereof is parallel to the alignment direction of the alignment film 4. When a voltage is applied, an equipotential line of a parabolic electric field is formed between the pixel electrode 21 and the common electrode 22 up to the upper portion of the pixel electrode 21 and the common electrode 22, and the liquid crystal molecules 30 in the liquid crystal layer 5 rotate in the liquid crystal layer 5 along the formed electric field. In the present invention, since the liquid crystal molecules 30 having negative dielectric anisotropy are used, the major axis direction of the liquid crystal molecules 30 rotates so as to be orthogonal to the generated electric field direction. The liquid crystal molecules 30 positioned near the pixel electrode 21 are susceptible to the influence of the fringe electric field, but the liquid crystal molecules 30 having the negative dielectric anisotropy have a polarization direction on the minor axis of the molecule, the major axis direction does not rotate in the direction orthogonal with respect to the alignment film 4 and the major axis direction of all of the liquid crystal molecules 30 in the liquid crystal layer 5 is able to be maintained in a parallel direction with respect to the alignment film 4. Accordingly, in comparison with an FFS type liquid crystal display element using the liquid crystal molecules 30 having positive dielectric anisotropy, it is possible to obtain excellent transmittance characteristics.

Figure 5:
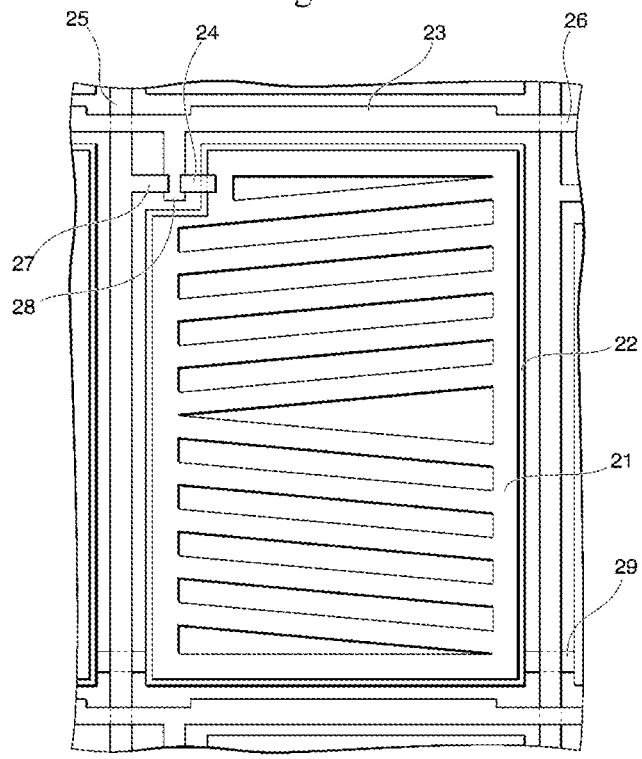
FIG. 5 is a planar diagram illustrating another example of a region surrounded by a line II of an electrode layer 3 formed on a substrate 2 in FIG. 1, which is enlarged.

The FFS type liquid crystal display element described with reference to FIG. 1 to FIG. 4 is merely an example and various other embodiments are possible as long as these embodiments do not depart from the technical idea of the present invention. For example, FIG. 5 is another example of a plan view in which a region surrounded by the II line of the electrode layer 3 formed on the substrate 2 in FIG. 1 is enlarged. As shown in FIG. 5, the pixel electrode 21 may be formed to have a slit. In addition, the slit pattern may be formed so as to have an inclination angle with respect to the gate bus lines 26 or the data bus lines 25.

Figure 6:
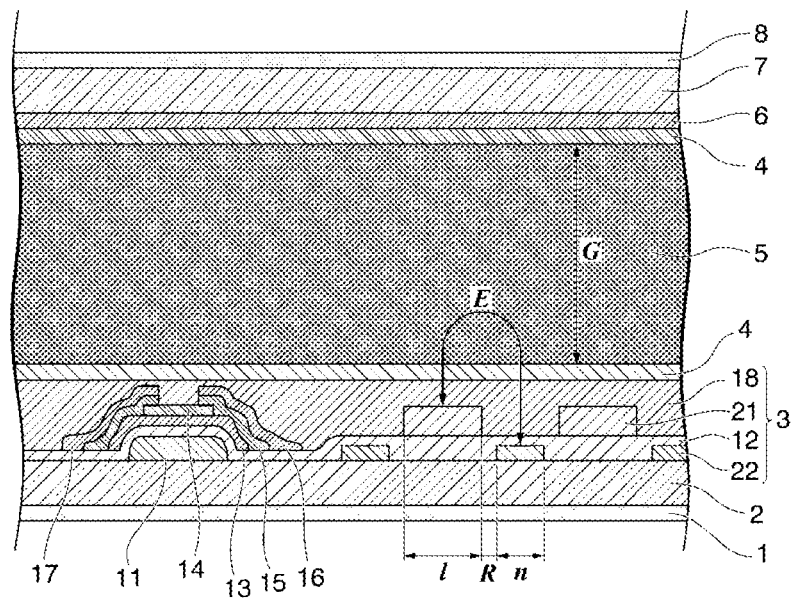
FIG. 6 is a cross-sectional view of another example of the liquid crystal display element shown in FIG. 1 taken along the line III-III in FIG. 2 is cut away.

In addition, FIG. 6 is another example of a cross-sectional view of the liquid crystal display element shown in FIG. 1 taken along the line III-III in FIG. 2. In the example shown in FIG. 6, a common electrode 22 having a comb shape or a slit is used, and the inter-electrode distance between the pixel electrode 21 and the common electrode 22 is R=α. Furthermore, an example is given in FIG. 3 in which the common electrode 22 is formed on the gate insulating film 12; however, as shown in FIG. 6, the common electrode 22 may be formed on the first substrate 2 and the pixel electrode 21 may be provided via the gate insulating film 12. The electrode width l of the pixel electrode 21, the electrode width n of the common electrode 22, and the inter-electrode distance R are preferably appropriately adjusted to a width such that all the liquid crystal molecules in the liquid crystal layer 5 can be driven by the generated electric field.

Figure 7:
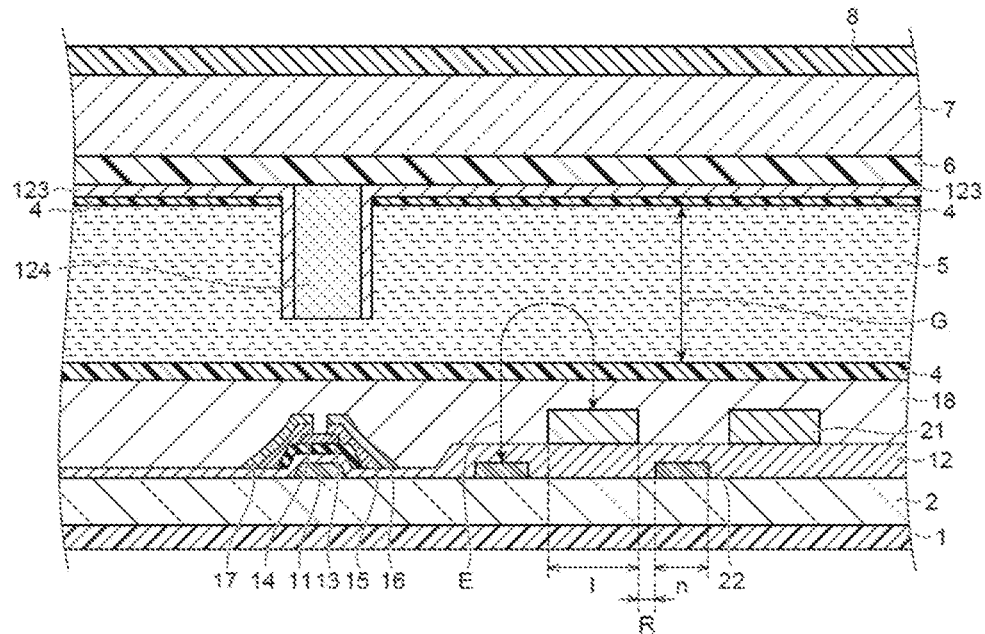
FIG. 7 is a cross-sectional view of another example of the liquid crystal display element shown in FIG. 1 taken along the line III-III in FIG. 2 is cut away.

FIG. 7 is a cross-sectional view of another example of the liquid crystal display element shown in FIG. 1 taken along the line III-III in FIG. 2. As compared with the configuration of FIG. 6, FIG. 7 has a different configuration in that a projection 124 and the third electrode 123 are provided on the second substrate 7 side. The projection 124 may be a spacer and is formed of an organic material or an inorganic material. In addition, in FIG. 7, the projection 124 is provided on the second substrate 7 side, but may be provided on the first substrate 2 so as to protrude in the direction of the second substrate 7. Further, the end of the projection 124 is present in the liquid crystal layer 5, but the end of the projection 124 may be in contact with the alignment film 4 and the insulating film 18. In addition, here, the third electrode 123 is preferably a common electrode. Further, in FIG. 7, the projection 124 is formed above the TFT so as to correspond to a black matrix position, but the projection 124 may be not formed just above the TFT.

As illustrated in FIG. 7, it is considered that when the common electrode is formed on the second substrate side as the third electrode 123, an electric flux line is formed in the thickness direction, and thus alignment unevenness of the thickness direction in the liquid crystal layer 5 can be reduced.

In the example as illustrated in FIG. 7, the common electrode 22 having a comb shape or having a slit is used, and the inter-electrode distance between the pixel electrode 21 and the common electrode 22 is R=α. Furthermore, an example is given in FIG. 3 in which the common electrode 22 is formed on the gate insulating film 12; however, as shown in FIG. 6, the common electrode 22 may be formed on the first substrate 2 and the pixel electrode 21 may be provided via the gate insulating film 12. The electrode width l of the pixel electrode 21, the electrode width n of the common electrode 22, and the inter-electrode distance R are preferably appropriately adjusted to a width such that all the liquid crystal molecules in the liquid crystal layer 5 can be driven by the generated electric field.

Figure 8:
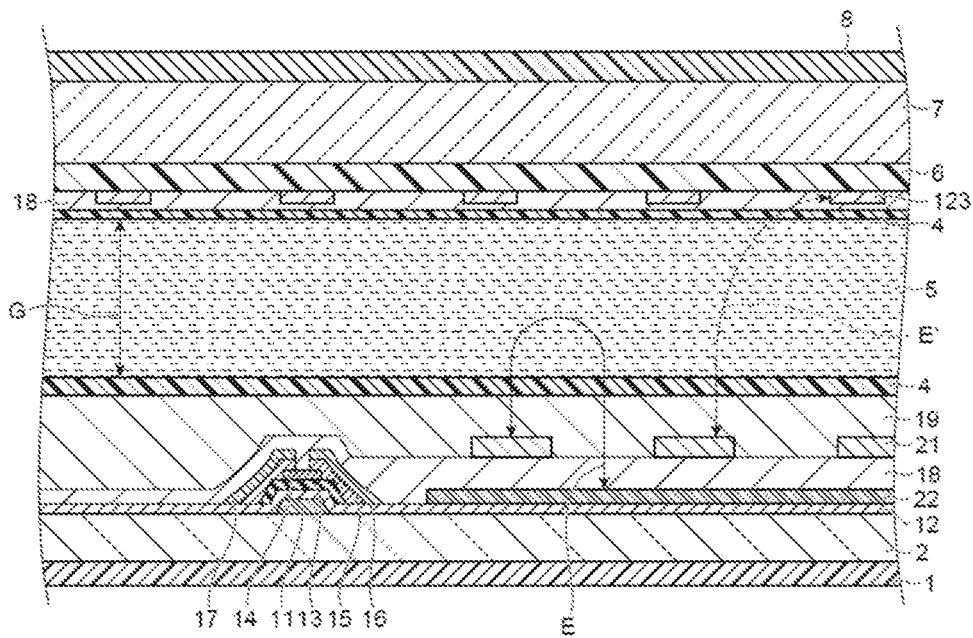
FIG. 8 is a cross-sectional view of another example of the liquid crystal display element shown in FIG. 1 taken along the line III-III in FIG. 2 is cut away.

FIG. 8 is a cross-sectional view of another example of the liquid crystal display element shown in FIG. 1 taken along the line III-III in FIG. 2. As compared with the configuration of FIG. 3, FIG. 8 has a different configuration in that the third electrode 123 is provided on the second substrate 7 side. The aforementioned third electrode 123 has a structure including a comb shape as illustrated in FIG. 2 or a notch portion as illustrated in FIG. 5. In addition, here, the third electrode 123 is preferably a common electrode. It is considered that when the common electrode is formed on the second substrate side as the third electrode 123, an electric flux line E' is formed in the thickness direction, and thus alignment unevenness of the thickness direction in the liquid crystal layer 5 can be reduced.

Figure 9:
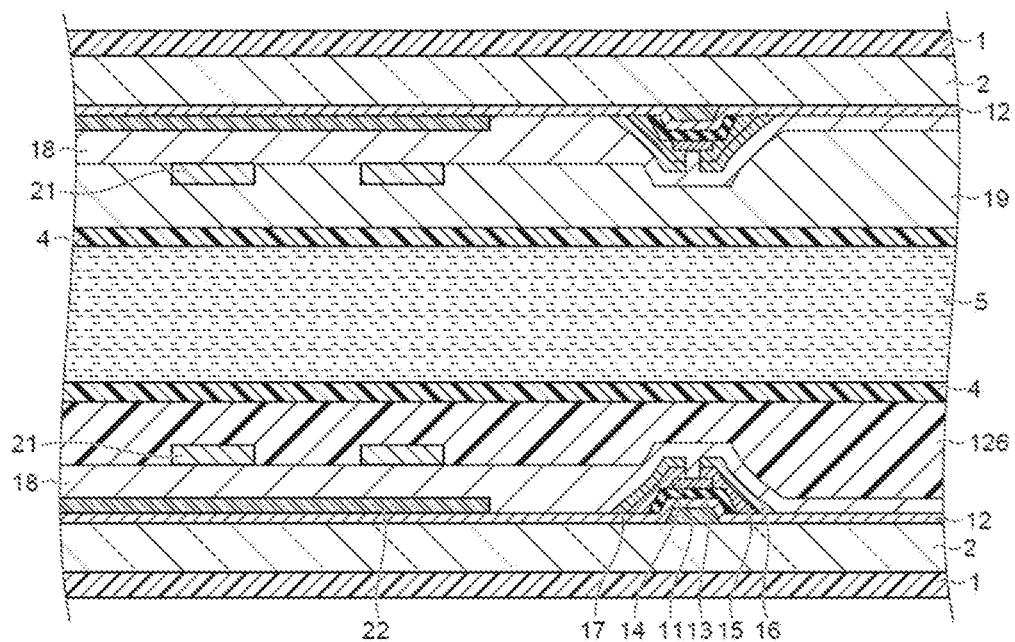
FIG. 9 is a cross-sectional view of another example of the liquid crystal display element shown in FIG. 1 taken along the line III-III in FIG. 2 is cut away.

FIG. 9 is a cross-sectional view of another example of the liquid crystal display element shown in FIG. 1 taken along the line III-III in FIG. 2. As compared with the configuration of FIG. 3, FIG. 8 has a different configuration in that an electrode substrate including the TFT similar to the first substrate is bonded to the substrate side facing the first substrate 2, a protective layer 126 including a color filter and a protective layer 19 are additionally provided. In other words, FIG. 9 illustrate a structure in which a pair of laminates each including a polarizing layer 1, a first substrate 2, an electrode layer 3, a protective layer 19, and an alignment film 4 sequentially laminated, as the configuration illustrated in FIG. 3, are bonded such that the TFTs overlap and the protective layer 19 on one side is a resin containing a color filter.

In this configuration, there are four electrodes. That is, a upper and a lower electrodes are present as the common electrode 22, and a upper and a lower electrodes are present as the pixel electrode 21. The liquid crystal of the liquid crystal layer can be efficiently utilized as compared with an element in which electrodes are formed only on one side.

Since the FFS mode liquid crystal display element according to the present invention uses a specific liquid crystal composition, it is possible to achieve both a high-speed response and suppression of display failure at the same time.

In addition, in the FFS mode liquid crystal display element, when injecting the liquid crystal layer 5 between the first substrate 2 and the second substrate 7, for example, a vacuum injection method, a one drop fill (ODF) method, or the like is performed; however, in the present embodiment, in the ODF method, it is possible to suppress the occurrence of drip marks when the liquid crystal composition is dropped onto the substrate. Note that, a drip mark is defined as a phenomenon in which a white mark appears where the liquid crystal composition is dropped when black is displayed.

Although the occurrence of drip marks is greatly affected by the liquid crystal material to be injected, it is not possible to avoid the influence thereof even through the configuration of the display element. In the FFS mode liquid crystal display element, for the thin film transistor formed in the display element, the pixel electrode 21 having a comb shape or a slit, and the like, since there is no member separating the liquid crystal composition except for the thin alignment film 4, or the thin alignment film 4 and the thin insulating protective layer 18, and the like, there is a high possibility that it is not possible to completely block the ionic substance, and it is not possible to avoid the generation of drip marks due to the interaction between the metal material forming the electrode and the liquid crystal composition; however, by using a combination of the liquid crystal composition of the present invention in an FFS type liquid crystal display element, the occurrence of drip marks is able to be effectively suppressed.

In addition, in the manufacturing steps of the liquid crystal display element using the ODF method, it is necessary to drop an optimum amount of injected liquid crystal according to the size of the liquid crystal display element; however, for example, since the liquid crystal composition of the present invention hardly causes sudden pressure changes or has small influence by impacts in the dripping apparatus when dripping the liquid crystal, it is possible to continue stably dripping the liquid crystal over a long period, it is also possible to keep the yield of the liquid crystal display element high. In particular, for small liquid crystal display elements frequently used in smartphones which have recently come into wide use, control of the deviations from an optimum value within a certain range is itself difficult due to the optimum amount of injected liquid crystal being small; however, by using the liquid crystal composition of the present invention, it is possible to realize a stable discharging amount of the liquid crystal material even in small liquid crystal display elements.

EXAMPLES

Hereinafter, the present invention will be described in more detail with examples, and the present invention is not limited to the examples. In addition, in the compositions of the following examples and comparative examples means "% by mass".

In the examples, the measured characteristics are as follows.

$T_{NI}$: nematic phase-isotropic liquid phase transition temperature (° C.)

Δn: refractive index anisotropy at 25° C.

Δ∈: dielectric anisotropy at 25° C.

η: viscosity (mPa·s) at 20° C.

$γ_1$: rotational viscosity (mPa·s) at 25° C.

VHR: voltage holding ratio (%) at 60° C. under the conditions of a frequency of 60 Hz and an applied voltage of 1 V.

Burn-In:

After displaying a predetermined fixed pattern in the display area for 1,000 hours, by visually inspecting the residual image level of the fixed pattern at the time when full screen was uniformly displayed, the evaluation of the burn-in on a liquid crystal display element was performed on a scale of four stages described below.

A: Residual image was not observed

B: Residual image was very slightly observed, however it was an acceptable level C: Residual image was observed, and it was an unacceptable level D: Residual image was observed, and it was a very severe level Drip Marks:

By visually observing drip marks appeared in white when the entire screen was displayed in black, the evaluation of the drip marks on a liquid crystal display device was performed on a scale of four stages described below.

A: Residual image was not observed

B: Residual image was very slightly observed, however it was an acceptable level C: Residual image was observed, and it was an unacceptable level D: Residual image was observed, and it was a very severe level Process Adaptability:

In ODF process, dropping the liquid crystal by 50 pL at one time was performed 100,000 times using a constant volume measuring pump, and the change in amount of liquid crystal dropped by each 100 times of the following "0 to 100 times, 101 to 200 times, 201 to 300 times, . . . , 99,901 to 100,000 times" was evaluated on a scale of four stages described below.

A: Change was extremely small (liquid crystal display element could be stably prepared)

B: Change was slightly observed, but it was an acceptable level

C: Change was observed, and it was an unacceptable level (yield was deteriorated by generation of spots)

D: Change was observed, and it was a very severe level (liquid crystal leakage or vacuum bubbles were generated)

Solubility at Low Temperatures:

After preparing a liquid crystal composition, 1 g of the liquid crystal composition was weighed and placed in a sample bottle of 2 mL, the temperature change having one cycle of "−20° C. (maintained for 1 hour)→heating (0.1° C./min)→0° C. (maintained for 1 hour)→heating (0.1° C./min)→20° C. (maintained for 1 hour)→cooling (−0.1° C./min)→0° C. (maintained for 1 hour)→cooling (−0.1° C./min)→−20° C." was continuously given thereto in a temperature controlled test chamber, the generation of precipitates from the liquid crystal composition was visually observed, and the solubility evaluation at low temperatures was performed on a scale of four stages described below.

A: Precipitates were not observed for equal to or longer than 600 hours.

B: precipitates were not observed for equal to or longer than 300 hours.

C: Precipitates were observed within 150 hours.

D: precipitates were observed within 75 hours

In the examples, the following abbreviations are used for describing the compounds.

(Alignment Unevenness)

As a method other than the observation with a polarizing microscope, alignment unevenness can be measured by whether or not the transmittance contrast ratio in the electrooptical characteristic measurement is improved.

(Side Chain)

-n —$CH_nH_{2n+1}$ linear alkyl group having n carbon atoms

-On —$OC_nH_{2n+1}$ linear alkoxy group having n carbon atoms

—V —$CH=CH_2$ vinyl group

-Vn —$CH=C—C_nH_{2n+1}$ 1-alkene having (n+1) carbon atoms

The same is for the left side.

(Linking Group)

—$CF_2O$— —$CF_2$—O—

—$OCF_2$— —O—$CF_2$—

-1O— —$CH_2$—O—

—O1- —O—$CH_2$—

—COO— —COO—

(Ring Structure)

[Chem. 38]

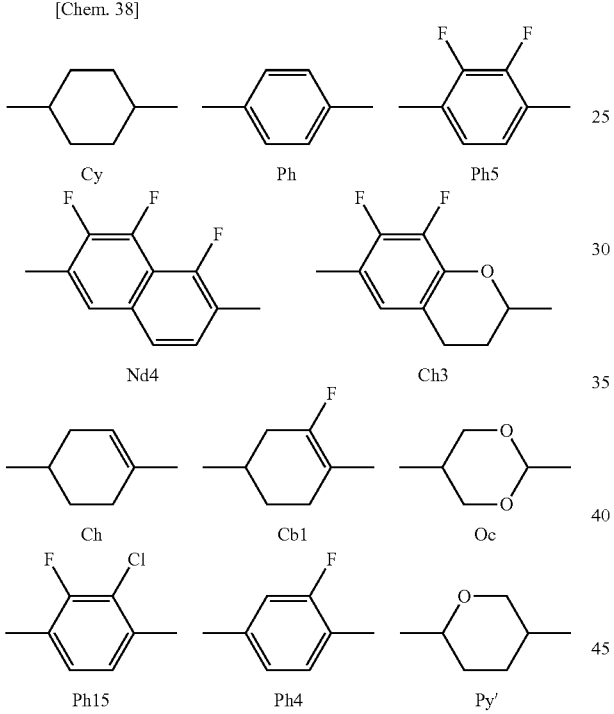

Example 1

Liquid Crystal Composition 1

The liquid crystal composition (liquid crystal composition 1) having the compositional ratio described below was prepared, and the physical properties thereof were measured. The results are shown in the following Table.

Using the liquid crystal composition 1, an FFS mode liquid crystal display element was produced having a cell thickness of 3.0 μm, which is common for TVs, and having electrode layers on the first substrate and the second substrate. The injection of the liquid crystal composition was carried out by a dripping method, and evaluations of burn-in, drip marks, process adaptability, and solubility at low temperature were carried out.

The references on the left side of the content are abbreviations of the compounds described above.

[Chem. 39]

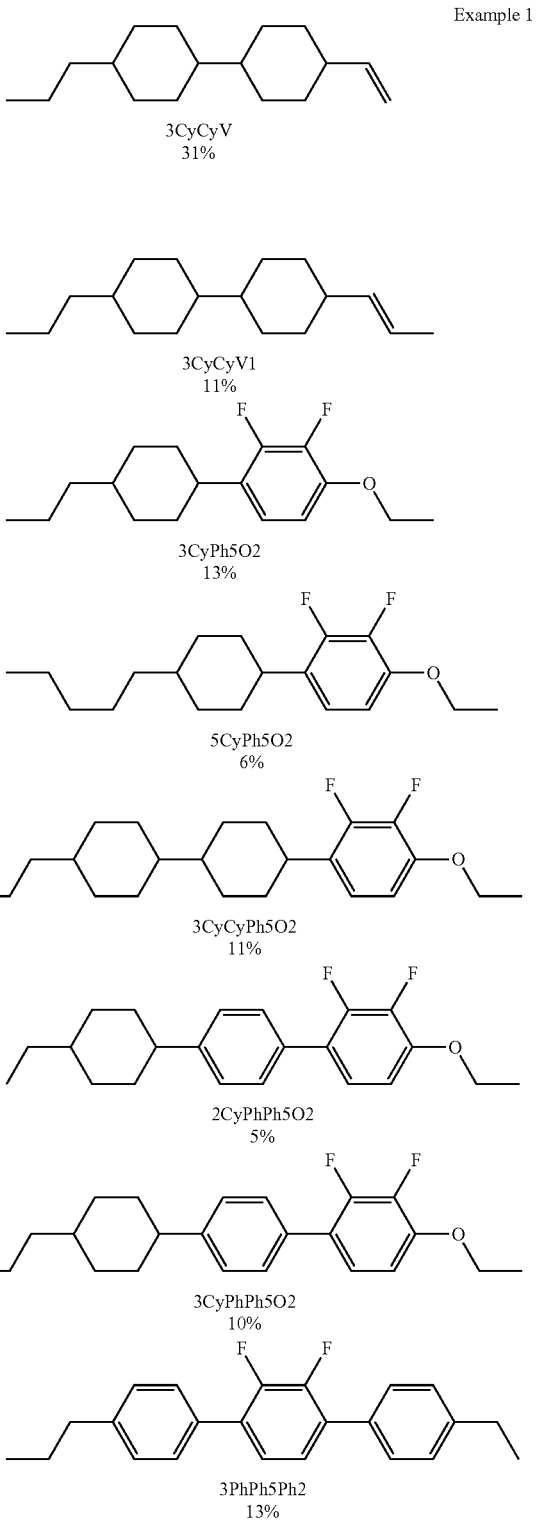

TABLE 1

| | |
|---|---|
| $T_{NI}/°C$ | 75.6 |
| $\Delta n$ | 0.109 |
| $n_o$ | 1.483 |
| $\Delta\varepsilon$ | -3.07 |
| $\varepsilon_\perp$ | 6.62 |
| $\eta/mPa \cdot s$ | 15.2 |
| $\gamma_1/mPa \cdot s$ | 98 |
| $\gamma_1/\Delta n^2 \times 10^{-3}$ | 8.2 |
| $\gamma_1/\Delta n^2/|\Delta\varepsilon|$ | 2.69 |
| Initial voltage holding ratio % | 99.6 |
| Voltage holding ratio % after 1 hour at 150° C. | 99.0 |
| Burn in evaluation | A |
| Drip mark evaluation | A |
| Process adaptability evaluation | A |
| Solubility at low temperature evaluation | A |

It can be seen that the liquid crystal composition 1 has a $T_{NI}$ of 75.6° C., which is practical in terms of a liquid crystal composition for a TV, has a large $\Delta\varepsilon$ absolute value, a low $\eta$, and an optimum $\Delta n$. An FFS mode liquid crystal display element was produced using the liquid crystal composition 1 and evaluated for burn-in, drip marks, process adaptability, and solubility at low temperature using the method described above, and the evaluation results were extremely excellent.

Example 2

Liquid Crystal Composition 2

A liquid crystal composition (liquid crystal composition 2) having the following composition having the following composition designed to have an equivalent $T_{NI}$, an equivalent $\Delta n$ value, and an equivalent $\Delta\varepsilon$ value to those of liquid crystal composition 1 was prepared, and the physical property values thereof were measured. The results are shown in the following table.

Using the liquid crystal composition 2, an FFS mode liquid crystal display element was produced in the same manner as in Example 1, and the results of evaluations of burn-in, drip mark, process adaptability, and solubility at low temperature are shown in the same table.

TABLE 2

| Example 2 | |
|---|---|
| 3CyCyV | 32% |
| 3CyCyV1 | 12% |
| 3CyCyPh1 | 4% |
| 3CyPh5O2 | 7% |
| 3PhPh5O2 | 10% |
| 3CyCyPh5O2 | 10% |
| 4CyCyPh5O2 | 2% |
| 2CyPhPh5O2 | 5% |
| 3CyPhPh5O2 | 8% |
| 3PhPh5Ph2 | 5% |
| 4PhPh5Ph2 | 5% |
| $T_{NI}/°C$ | 76.6 |
| $\Delta n$ | 0.110 |
| $n_o$ | 1.485 |
| $\Delta\varepsilon$ | -3.03 |
| $\varepsilon_\perp$ | 6.36 |
| $\eta/mPa \cdot s$ | 13.6 |
| $\gamma_1/mPa \cdot s$ | 90 |
| $\gamma_1/\Delta n^2 \times 10^{-3}$ | 7.4 |
| $\gamma_1/\Delta n^2/|\Delta\varepsilon|$ | 2.45 |

TABLE 2-continued

| Example 2 | |
|---|---|
| Initial voltage holding ratio % | 99.5 |
| Voltage holding ratio % after 1 hour at 150° C. | 99.0 |
| Burn in evaluation | A |
| Drip mark evaluation | A |
| Process adaptability evaluation | A |
| Solubility at low temperature evaluation | A |

It is understood that the liquid crystal composition 2 has a practical liquid crystal phase temperature range in terms of a liquid crystal composition for TVs, has a large absolute value of dielectric anisotropy, and has a low viscosity and an optimum $\Delta n$. An FFS mode liquid crystal display element was produced using the liquid crystal composition 2 in the same manner as in Example 1 and, when the burn-in, drip mark, process adaptability, and solubility at low temperature were evaluated using the method described above, the evaluation results were excellent.

Example 3

Liquid Crystal Composition 3

A liquid crystal composition (liquid crystal composition 3) having the following composition designed to have an equivalent $T_{NI}$, an equivalent $\Delta n$ value, and an equivalent $\Delta\varepsilon$ value to those of the liquid crystal compositions 1 and 2 was prepared, and the physical property values thereof were measured. The results are shown in the following table.

Using the liquid crystal composition 3, an FFS mode liquid crystal display element was produced in the same manner as in Example 1, and the results of evaluations of burn-in, drip mark, process adaptability, and solubility at low temperature are shown in the same table.

TABLE 3

| Example 3 | |
|---|---|
| 3CyCyV | 35% |
| 3CyCyV1 | 12% |
| 3CyCyPh1 | 2% |
| 3CyPhPh2 | 6% |
| 3CyPh5O2 | 4% |
| 3PhPh5O2 | 10% |
| 5PhPh5O2 | 4% |
| 3CyCyPh5O2 | 3% |
| 2CyPhPh5O2 | 12% |
| 3CyPhPh5O2 | 12% |
| $T_{NI}/°C$ | 76.1 |
| $\Delta n$ | 0.110 |
| $n_o$ | 1.486 |
| $\Delta\varepsilon$ | -3.09 |
| $\varepsilon_\perp$ | 6.45 |
| $\eta/mPa \cdot s$ | 12.2 |
| $\gamma_1/mPa \cdot s$ | 81 |
| $\gamma_1/\Delta n^2 \times 10^{-3}$ | 6.7 |
| $\gamma_1/\Delta n^2/|\Delta\varepsilon|$ | 2.17 |
| Initial voltage holding ratio % | 99.6 |
| Voltage holding ratio % after 1 hour at 150° C. | 99.2 |
| Burn in evaluation | A |
| Drip mark evaluation | A |
| Process adaptability evaluation | A |

TABLE 3-continued

| Example 3 | |
|---|---|
| Solubility at low temperature evaluation | A |

It is understood that the liquid crystal composition 3 has a practical $T_{NI}$ in terms of a liquid crystal composition for TVs, has a large $\Delta\in$ absolute value, and has low η and an optimum Δn. An FFS mode liquid crystal display element was produced using the liquid crystal composition 3 in the same manner as in Example 1 and, when the burn-in, drip mark, process adaptability, and solubility at low temperature were evaluated using the method described above, the evaluation results were excellent.

Comparative Examples 1 to 3

Using the liquid crystal compositions 1 to 3, vertically aligned liquid crystal display elements (VA mode liquid crystal display elements) having a cell thickness of 3.5 μm, which is commonly used for TVs, were produced.

The transmissivity, the contrast ratio, and the response speed were compared for the FFS mode liquid crystal display elements produced in Examples 1 to 3 and the VA mode liquid crystal display elements produced in Comparative Examples 1 to 3, respectively. The results are shown below. The transmittances of the liquid crystal display elements of Examples 1 to 3 and Comparative Examples 1 to 3 are the values when the transmittance of the element before injection of the liquid crystal composition in each mode is taken as 100%.

TABLE 4

| | Example 1 | Comparative Example 1 | Example 2 | Comparative Example 2 | Example 3 | Comparative Example 3 |
|---|---|---|---|---|---|---|
| Display mode | n-FFS | VA | n-FFS | VA | n-FFS | VA |
| Used liquid crystal composition | Liquid crystal composition 1 | Liquid crystal composition 1 | Liquid crystal composition 2 | Liquid crystal composition 2 | Liquid crystal composition 3 | Liquid crystal composition 3 |
| Maximum transmittance | 89% | 87% | 90% | 86% | 90% | 87% |
| Contrast ratio | 289 | 280 | 293 | 277 | 302 | 288 |
| Response speed/ms | 4.7 | 8.3 | 4.4 | 7.6 | 3.7 | 6.6 |

The FFS mode display elements (Examples 1 to 3) produced using the liquid crystal compositions 1 to 3 exhibited excellent characteristics in all of the maximum transmittance, the contrast ratio, and the response speed compared with VA mode liquid crystal display elements (Comparative Examples 1 to 3) prepared using the same liquid crystal compositions respectively.

In an FFS mode liquid crystal display element in which liquid crystal molecules are aligned in parallel to the substrate and a fringe electric field is generated, basic liquid crystal characteristics are required which are different from VA mode liquid crystal display elements where the liquid crystal molecules are aligned to be orthogonal to the substrate and an electric field is generated vertically. By the liquid crystal compositions 1 to 3 containing the compounds of General Formula (I) and General Formula (II) which are essential components of the present invention, an improvement in the transmittance which is a key feature of the FFS mode is achieved without impairing the basic characteristics as a liquid crystal display element. On the other hand, due to these differences in the FFS mode, effects such as burn-in and drip marks are hard to predict using conventional knowledge. The liquid crystal display element of the present invention also exhibits good characteristics in these points.

Example 4

Liquid Crystal Composition 4

A liquid crystal composition (liquid crystal composition 4) having the following composition designed to have an equivalent $T_{NI}$, an equivalent Δn value, and an equivalent $\Delta\in$ value to those of the compositions 1 to 3 was prepared, and the physical property values thereof were measured. The results are shown in the following table.

TABLE 5

| Example 4 | |
|---|---|
| 3CyCy2 | 25% |
| 3CyCy4 | 8% |
| 3CyCy5 | 5% |
| 3CyPh5O2 | 10% |
| 5CyPh5O2 | 9% |
| 3CyCyPh5O2 | 11% |
| 2CyPhPh5O2 | 10% |
| 3CyPhPh5O2 | 11% |
| 3PhPh5Ph2 | 5% |
| 4PhPh5Ph2 | 6% |
| $T_{NI}$/° C. | 75.9 |
| Δn | 0.104 |
| $n_o$ | 1.483 |
| Δε | −3.06 |
| $\varepsilon_\perp$ | 6.56 |
| η/mPa · s | 19.9 |

TABLE 5-continued

| Example 4 | |
|---|---|
| $\gamma_1$/mPa · s | 137 |
| γ1/Δn² × 10⁻³ | 12.7 |
| $\gamma_1/\Delta n^2/|\Delta\varepsilon|$ | 4.14 |

It is understood that the liquid crystal composition 4 has a practical $T_{NI}$ in terms of a liquid crystal composition for TVs, has a large $\Delta\in$ absolute value, and has low η and an optimum Δn. When an FFS mode liquid crystal display element was produced using the liquid crystal composition 4, excellent display characteristics equivalent to those in Examples 1 to 3 were exhibited.

Example 5

Liquid Crystal Composition 5

A liquid crystal composition (liquid crystal composition 5) having the following composition designed to have an equivalent $T_{NI}$, an equivalent Δn value, and an equivalent Δ∈ value to those of the liquid crystal compositions 1 to 4 was prepared, and the physical property values thereof were measured. The results are shown in the following table.

TABLE 6

| Example 5 | |
| --- | --- |
| 3CyCy2 | 25% |
| 3CyCy4 | 10% |
| 3CyCy5 | 5% |
| 3CyPh5O2 | 8% |
| 3PhPh5O2 | 9% |
| 3CyCyPh5O2 | 12% |
| 4CyCyPh5O2 | 2% |
| 2CyPhPh5O2 | 9% |
| 3CyPhPh5O2 | 9% |
| 3PhPh5Ph2 | 5% |
| 4PhPh5Ph2 | 6% |
| $T_{NI}/°$ C. | 75.8 |
| Δn | 0.108 |
| $n_o$ | 1.485 |
| Δε | −3.17 |
| $ε_⊥$ | 6.53 |
| η/mPa · s | 18.5 |
| $γ_1$/mPa · s | 131 |
| $γ1/Δn^2 × 10^{-3}$ | 11.2 |
| $γ_1/Δn^2/|Δε|$ | 3.54 |

It is understood that the liquid crystal composition 5 has a practical $T_{NI}$ in terms of a liquid crystal composition for TVs, has a large Δ∈ absolute value, and has low viscosity η and an optimum Δn. When an FFS mode liquid crystal display element was produced using the liquid crystal composition 5, excellent display characteristics equivalent to those in Examples 1 to 3 were exhibited.

Example 6

Liquid Crystal Composition 6

A liquid crystal composition (liquid crystal composition 6) having the following composition designed to have an equivalent $T_{NI}$, an equivalent Δn value, and an equivalent Δ∈ value to those of the liquid crystal compositions 1 to 5 was prepared, and the physical property values thereof were measured. The results are shown in the following table.

TABLE 7

| Example 6 | |
| --- | --- |
| 3CyCy2 | 25% |
| 3CyCy4 | 10% |
| 3CyCy5 | 6% |
| 3CyCyPh1 | 10% |
| 3CyPh5O2 | 5% |
| 3PhPh5O2 | 10% |
| 5PhPh5O2 | 4% |
| 3CyCyPh5O2 | 6% |
| 2CyPhPh5O2 | 12% |
| 3CyPhPh5O2 | 12% |
| $T_{NI}/°$ C. | 78.1 |
| Δn | 0.101 |
| $n_o$ | 1.484 |
| Δε | −3.00 |
| $ε_⊥$ | 6.22 |
| η/mPa · s | 15.9 |
| $γ_1$/mPa · s | 111 |
| $γ1/Δn^2 × 10^{-3}$ | 10.9 |
| $γ_1/Δn^2/|Δε|$ | 3.63 |

It is understood that the liquid crystal composition 6 has a practical $T_{NI}$ in terms of a liquid crystal composition for TVs, has a large Δ∈ absolute value, and has low viscosity η and an optimum Δn. When an FFS mode liquid crystal display element was produced using the liquid crystal composition 6, excellent display characteristics equivalent to those in Examples 1 to 3 were exhibited.

Example 7

Liquid Crystal Composition 7

A liquid crystal composition (liquid crystal composition 7) having the following composition designed to have an equivalent Δn value to, and a higher $T_{NI}$ and Δ∈ value than those of the liquid crystal compositions 1 to 6 was prepared, and the physical property values thereof were measured. The results are shown in the following table. Using the liquid crystal composition 7, an FFS mode liquid crystal display element was produced in the same manner as in Example 1, and the results of evaluations of burn-in, drip mark, process adaptability, and solubility at low temperature are shown in the same table.

TABLE 8

| Example 7 | |
| --- | --- |
| 3CyCyV | 24% |
| 3CyCyV1 | 10% |
| 3CyPh5O2 | 12% |
| 5CyPh5O2 | 8% |
| 3CyCyPh5O2 | 10% |
| 3CyCyPh5O3 | 8% |
| 4CyCyPh5O2 | 10% |
| 2CyPhPh5O2 | 5% |
| 3CyPhPh5O2 | 5% |
| 3PhPh5Ph2 | 8% |
| $T_{NI}/°$ C. | 86.0 |
| Δn | 0.103 |
| $n_o$ | 1.481 |
| Δε | −3.95 |
| $ε_⊥$ | 7.76 |
| η/mPa · s | 21.8 |
| $γ_1$/mPa · s | 134 |
| $γ1/Δn^2 × 10^{-3}$ | 12.6 |
| $γ_1/Δn^2/|Δε|$ | 3.20 |
| Initial voltage holding ratio % | 99.9 |
| Voltage holding ratio % after 1 hour at 150° C. | 99.4 |
| Burn in evaluation | A |
| Drip mark evaluation | A |
| Process adaptability evaluation | A |
| Solubility at low temperature evaluation | A |

It is understood that the liquid crystal composition 7 has a practical $T_{NI}$ in terms of a liquid crystal composition for TVs, has a large Δ∈ absolute value, and has low viscosity η and an optimum Δn. An FFS mode liquid crystal display element was produced using the liquid crystal composition 7 in the same manner as in Example 1 and, when the burn-in, drip mark, process adaptability, and solubility at low temperature were evaluated using the method described above, the evaluation results were excellent.

Example 8

Liquid Crystal Composition 8

A liquid crystal composition (liquid crystal composition 8) having the following composition designed to have an equivalent $T_{NI}$, an equivalent Δn value, and an equivalent Δ∈ value to those of the liquid crystal composition 7 was prepared, and the physical property values thereof were measured. The results are shown in the following table. Using the liquid crystal composition 8, an FFS mode liquid crystal display element was produced in the same manner as in Example 1, and the results of evaluations of burn-in, drip mark, process adaptability, and solubility at low temperature are shown in the same table.

TABLE 9

| Example 8 | |
|---|---|
| 3CyCyV | 20% |
| 3CyCyV1 | 10% |
| 3CyCyPh1 | 7% |
| 3CyPh5O2 | 12% |
| 5CyPh5O2 | 6% |
| 3PhPh5O2 | 5% |
| 3CyCyPh5O2 | 12% |
| 3CyCyPh5O3 | 6% |
| 4CyCyPh5O2 | 10% |
| 2CyPhPh5O2 | 6% |
| 3PhPh5Ph2 | 6% |
| $T_{NI}/°$ C. | 85.6 |
| $\Delta n$ | 0.103 |
| $n_o$ | 1.482 |
| $\Delta \varepsilon$ | −4.05 |
| $\varepsilon_\perp$ | 7.74 |
| $\eta$/mPa · s | 21.2 |
| $\gamma_1$/mPa · s | 128 |
| $\gamma_1/\Delta n^2 \times 10^{-3}$ | 12.1 |
| $\gamma_1/\Delta n^2/|\Delta \varepsilon|$ | 2.98 |
| Initial voltage holding ratio % | 99.9 |
| Voltage holding ratio % after 1 hour at 150° C. | 99.5 |
| Burn in evaluation | A |
| Drip mark evaluation | A |
| Process adaptability evaluation | A |
| Solubility at low temperature evaluation | A |

It is understood that the liquid crystal composition 8 has a practical $T_{NI}$ in terms of a liquid crystal composition for TVs, has a large $\Delta \in$ absolute value, and has low viscosity $\eta$ and an optimum $\Delta n$. An FFS mode liquid crystal display element was produced using the liquid crystal composition 8 in the same manner as in Example 1 and, when the burn-in, drip mark, process adaptability, and solubility at low temperature were evaluated using the method described above, the evaluation results were excellent.

Example 9

Liquid Crystal Composition 9

A liquid crystal composition (liquid crystal composition 9) having the following composition designed to have an equivalent $T_{NI}$, an equivalent $\Delta n$ value, and an equivalent $\Delta \in$ value to those of the liquid crystal compositions 7 and 8 was prepared, and the physical property values thereof were measured. The results are shown in the following table. Using the liquid crystal composition 9, an FFS mode liquid crystal display element was produced in the same manner as in Example 1, and the results of evaluations of burn-in, drip mark, process adaptability, and solubility at low temperature are shown in the same table.

TABLE 10

| Example 9 | |
|---|---|
| 3CyCyV | 23% |
| 3CyCyV1 | 10% |
| 3CyCyPh1 | 10% |
| 3CyPh5O2 | 10% |
| 5CyPh5O2 | 4% |
| 3PhPh5O2 | 8% |
| 3CyCyPh5O2 | 12% |
| 4CyCyPh5O2 | 7% |
| 2CyPhPh5O2 | 8% |
| 3CyPhPh5O2 | 8% |
| $T_{NI}/°$ C. | 86.2 |
| $\Delta n$ | 0.103 |
| $n_o$ | 1.483 |
| $\Delta \varepsilon$ | −3.96 |
| $\varepsilon_\perp$ | 7.56 |
| $\eta$/mPa · s | 18.7 |
| $\gamma_1$/mPa · s | 112 |
| $\gamma_1/\Delta n^2 \times 10^{-3}$ | 10.6 |
| $\gamma_1/\Delta n^2/|\Delta \varepsilon|$ | 2.67 |
| Initial voltage holding ratio % | 99.8 |
| Voltage holding ratio % after 1 hour at 150° C. | 99.3 |
| Burn in evaluation | A |
| Drip mark evaluation | A |
| Process adaptability evaluation | A |
| Solubility at low temperature evaluation | A |

It is understood that the liquid crystal composition 9 has a practical $T_{NI}$ in terms of a liquid crystal composition for TVs, has a large $\Delta \in$ absolute value, and has low viscosity $\eta$ and an optimum $\Delta n$. An FFS mode liquid crystal display element was produced using the liquid crystal composition 9 in the same manner as in Example 1 and, when the burn-in, drip mark, process adaptability, and solubility at low temperature were evaluated using the method described above, the evaluation results were excellent.

Comparative Examples 4 to 6

Using the liquid crystal compositions 7 to 9, VA mode liquid crystal display elements were produced in the same manner as in Comparative Examples 1 to 3.

The transmissivity, the contrast ratio, and the response speed were compared for the FFS mode liquid crystal display elements produced in Examples 7 to 9 and the VA mode liquid crystal display elements produced in Comparative Examples 4 to 6, respectively. The results are shown below.

TABLE 11

| | Example 7 | Comparative Example 4 | Example 8 | Comparative Example 5 | Example 9 | Comparative Example 6 |
|---|---|---|---|---|---|---|
| Display mode | n-FFS | VA | n-FFS | VA | n-FFS | VA |
| Used liquid crystal composition | Liquid crystal composition 7 | | Liquid crystal composition 8 | | Liquid crystal composition 9 | |
| Maximum transmittance % | 88% | 85% | 88% | 86% | 89% | 87% |

TABLE 11-continued

|  | Example 7 | Comparative Example 4 | Example 8 | Comparative Example 5 | Example 9 | Comparative Example 6 |
|---|---|---|---|---|---|---|
| Contrast ratio | 278 | 268 | 285 | 265 | 294 | 260 |
| Response speed/ms | 7.4 | 13.0 | 7.1 | 12.7 | 6.5 | 10.8 |

The FFS mode display elements (Examples 7 to 9) produced using the liquid crystal compositions 7 to 9 exhibited excellent characteristics in all of the maximum transmittance, the contrast ratio, and the response speed compared with VA mode liquid crystal display elements (Comparative Examples 4 to 6) prepared using the same liquid crystal compositions respectively.

Example 10

Liquid Crystal Composition 10

A liquid crystal composition (liquid crystal composition 10) having the following composition designed to have an equivalent $T_{NI}$, equivalent $\Delta n$ value, and an equivalent $\Delta\in$ value to those of the liquid crystal compositions 7 to 9 was prepared, and the physical property values thereof were measured. The results are shown in the following table.

TABLE 12

| Example 10 | |
|---|---|
| 3CyCy2 | 22% |
| 3CyCy4 | 4% |
| 3CyCyPh1 | 4% |
| 3CyPh5O2 | 12% |
| 5CyPh5O2 | 10% |
| 3CyCyPh5O2 | 10% |
| 3CyCyPh5O3 | 6% |
| 4CyCyPh5O2 | 9% |
| 2CyPhPh5O2 | 8% |
| 3CyPhPh5O2 | 8% |
| 3PhPh5Ph2 | 4% |
| 4PhPh5Ph2 | 3% |
| $T_{NI}/°$ C. | 85.7 |
| $\Delta n$ | 0.103 |
| $n_o$ | 1.482 |
| $\Delta\varepsilon$ | −4.08 |
| $\varepsilon_\perp$ | 7.92 |
| $\eta$/mPa · s | 26.6 |
| $\gamma_1$/mPa · s | 172 |
| $\gamma_1/\Delta n^2 \times 10^{-3}$ | 16.2 |
| $\gamma_1/\Delta n^2/|\Delta\varepsilon|$ | 3.97 |

It is understood that the liquid crystal composition 10 has a practical $T_{NI}$ in terms of a liquid crystal composition for TVs, has a large $\Delta\in$ absolute value, and has low viscosity $\eta$ and an optimum $\Delta n$. An FFS mode liquid crystal display element was produced using the liquid crystal composition 10 and, when the burn-in, drip mark, process adaptability, and solubility at low temperature were evaluated using the method described above, the evaluation results were excellent.

Example 11

Liquid Crystal Composition 11

A liquid crystal composition having the following composition designed to have an equivalent $T_{NI}$, an equivalent $\Delta n$ value, and an equivalent $\Delta\in$ value to those of the liquid crystal compositions 7 to 10 was prepared, and the physical property values thereof were measured. The results are shown in the following table.

TABLE 13

| Example 11 | |
|---|---|
| 3CyCy2 | 24% |
| 3CyCy4 | 8% |
| 3CyPh5O2 | 9% |
| 3PhPh5O2 | 8% |
| 3CyCyPh5O2 | 12% |
| 3CyCyPh5O3 | 10% |
| 4CyCyPh5O2 | 10% |
| 2CyPhPh5O2 | 6% |
| 3CyPhPh5O2 | 6% |
| 3PhPh5Ph2 | 4% |
| 4PhPh5Ph2 | 3% |
| $T_{NI}/°$ C. | 86.0 |
| $\Delta n$ | 0.103 |
| $n_o$ | 1.483 |
| $\Delta\varepsilon$ | −4.03 |
| $\varepsilon_\perp$ | 7.67 |
| $\eta$/mPa · s | 24.3 |
| $\gamma_1$/mPa · s | 164 |
| $\gamma_1/\Delta n^2 \times 10^{-3}$ | 15.5 |
| $\gamma_1/\Delta n^2/|\Delta\varepsilon|$ | 3.84 |

It is understood that the liquid crystal composition 11 has a practical $T_{NI}$ in terms of a liquid crystal composition for TVs, has a large $\Delta\in$ absolute value, and has low viscosity $\eta$ and an optimum $\Delta n$. An FFS mode liquid crystal display element was produced using the liquid crystal composition 11 and evaluated for burn-in, drip marks, process adaptability, and solubility at low temperature using the method described above, and the evaluation results were excellent.

Example 12

Liquid Crystal Composition 12

A liquid crystal composition (liquid crystal composition 12) having the following composition designed to have an equivalent $T_{NI}$, an equivalent $\Delta n$ value, and an equivalent $\Delta\in$ value to those of the liquid crystal compositions 7 to 11 was prepared, and the physical property values thereof were measured. The results are shown in the following table.

TABLE 14

| Example 12 | |
|---|---|
| 3CyCy2 | 24% |
| 3CyCy4 | 5% |
| 3CyCyPh1 | 9% |
| 3CyPh5O2 | 10% |
| 5CyPh5O2 | 3% |
| 3PhPh5O2 | 8% |
| 3CyCyPh5O2 | 10% |
| 4CyCyPh5O2 | 9% |
| 2CyPhPh5O2 | 11% |
| 3CyPhPh5O2 | 11% |
| $T_{NI}/°$ C. | 86.0 |
| $\Delta n$ | 0.103 |
| $n_o$ | 1.484 |

TABLE 14-continued

| Example 12 | |
|---|---|
| Δε | −4.03 |
| ε⊥ | 7.69 |
| η/mPa · s | 22.5 |
| $\gamma_1$/mPa · s | 145 |
| $\gamma_1$/Δn² × 10⁻³ | 13.7 |
| $\gamma_1$/Δn²/|Δε| | 3.39 |

It is understood that the liquid crystal composition 12 has a practical $T_{NI}$ in terms of a liquid crystal composition for TVs, has a large Δ∈ absolute value, and has low viscosity η and an optimum Δn. An FFS mode liquid crystal display element was produced using the liquid crystal composition 12 and evaluated for burn-in, drip marks, process adaptability, and solubility at low temperature using the method described above, and the evaluation results were excellent.

Example 13

Liquid Crystal Composition 13

A liquid crystal composition (liquid crystal composition 13) having the following composition designed to have an equivalent $T_{NI}$, an equivalent Δn value, and an equivalent Δ∈ value to those of the liquid crystal compositions 7 to 12 was prepared, and the physical property values thereof were measured. The results are shown in the following table.

TABLE 15

| Example 13 | |
|---|---|
| 3CyCyV | 20% |
| 3CyCyV1 | 10% |
| 3CyCyPh1 | 7% |
| 3CyPhPh2 | 3% |
| 3CyPh5O2 | 13% |
| 5CyPh5O2 | 12% |
| 3CyCyPh5O2 | 10% |
| 4CyCyPh5O2 | 5% |
| 2CyPhPh5O2 | 10% |
| 3CyPhPh5O2 | 10% |
| $T_{NI}$/° C. | 85.8 |
| Δn | 0.103 |
| $n_o$ | 1.482 |
| Δε | −4.02 |
| ε⊥ | 7.82 |
| η/mPa · s | 20.9 |
| $\gamma_1$/mPa · s | 123 |
| $\gamma_1$/Δn² × 10⁻³ | 11.6 |
| $\gamma_1$/Δn²/|Δε| | 2.88 |

It is understood that the liquid crystal composition 13 has a practical $T_{NI}$ in terms of a liquid crystal composition for TVs, has a large Δ∈ absolute value, and has low viscosity η and an optimum Δn. An FFS mode liquid crystal display element was produced using the liquid crystal composition 13 in the same manner as Example 1 and evaluated for burn-in, drip marks, process adaptability, and solubility at low temperature using the method described above, and the evaluation results were excellent.

Example 14

Liquid Crystal Composition 14

A liquid crystal composition (liquid crystal composition 14) having the following composition designed to have an equivalent $T_{NI}$, an equivalent Δn value, and an equivalent Δ∈ value to those of the liquid crystal compositions 7 to 13 was prepared, and the physical property values thereof were measured. The results are shown in the following table.

TABLE 16

| Example 14 | |
|---|---|
| 3CyCy2 | 22% |
| 3CyCy4 | 3% |
| 3CyCyPh1 | 7% |
| 3CyCyPh2 | 4% |
| 3CyPh5O2 | 13% |
| 5CyPh5O2 | 12% |
| 3CyCyPh5O2 | 9% |
| 4CyCyPh5O2 | 6% |
| 2CyPhPh5O2 | 12% |
| 3CyPhPh5O2 | 12% |
| $T_{NI}$/° C. | 85.0 |
| Δn | 0.103 |
| $n_o$ | 1.483 |
| Δε | −4.04 |
| ε⊥ | 7.88 |
| η/mPa · s | 24.3 |
| $\gamma_1$/mPa · s | 152 |
| $\gamma_1$/Δn² × 10⁻³ | 14.3 |
| $\gamma_1$/Δn²/|Δε| | 3.55 |

It is understood that the liquid crystal composition 14 has a practical $T_{NI}$ in terms of a liquid crystal composition for TVs, has a large Δ∈ absolute value, and has low viscosity η and an optimum Δn. An FFS mode liquid crystal display element was produced using the liquid crystal composition 14 in the same manner as Example 1 and evaluated for burn-in, drip marks, process adaptability, and solubility at low temperature using the method described above, and the evaluation results were excellent.

Example 15

Liquid Crystal Composition 15

A liquid crystal composition (liquid crystal composition 15) having the following composition was prepared and the physical property values thereof were measured. The results are shown in the following table. Using the liquid crystal composition 15, an FFS mode liquid crystal display element was produced in the same manner as in Example 1, and the results of evaluations of burn-in, drip mark, process adaptability, and solubility at low temperature are shown in the same table.

[Chem. 40]

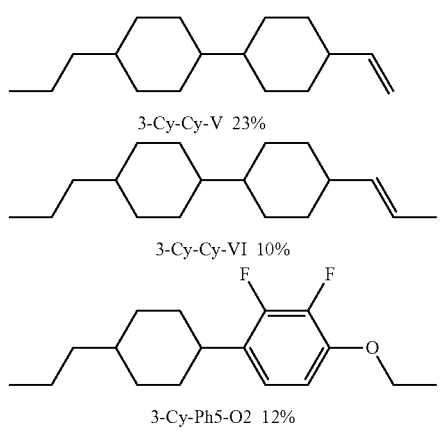

3-Cy-Cy-V 23%

3-Cy-Cy-VI 10%

3-Cy-Ph5-O2 12%

-continued

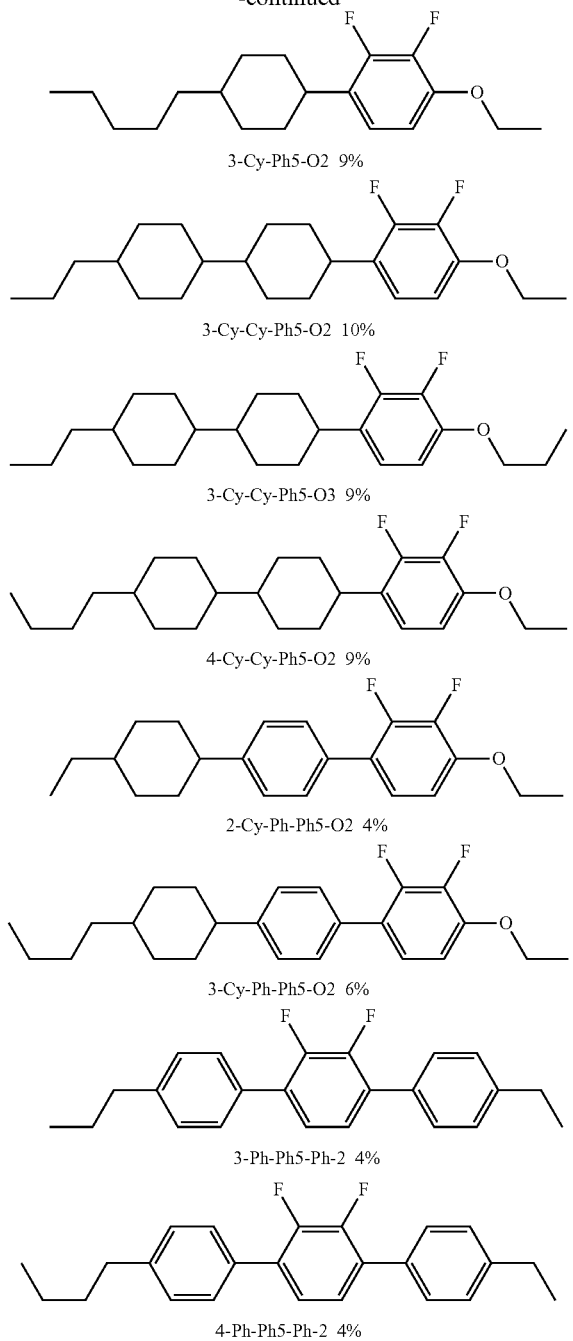

3-Cy-Ph5-O2 9%

3-Cy-Cy-Ph5-O2 10%

3-Cy-Cy-Ph5-O3 9%

4-Cy-Cy-Ph5-O2 9%

2-Cy-Ph-Ph5-O2 4%

3-Cy-Ph-Ph5-O2 6%

3-Ph-Ph5-Ph-2 4%

4-Ph-Ph5-Ph-2 4%

TABLE 17

| | |
|---|---|
| $T_{NI}/°$ C. | 85.3 |
| Δn | 0.103 |
| Δε | −4.04 |
| η/mPa · s | 22.4 |
| γ1/mPa · s | 137 |
| γ1/Δn² × 10⁻³ | 12.9 |
| γ1/Δn²/|Δε| | 3.20 |
| Initial voltage holding ratio % | 99.9 |
| Voltage holding ratio % after 1 hour at 150° C. | 99.5 |
| Burn in evaluation | A |
| Drip mark evaluation | A |

TABLE 17-continued

| | |
|---|---|
| Process adaptability evaluation | A |
| Solubility at low temperature evaluation | A |

It is understood that the liquid crystal composition 15 has a practical $T_{NI}$ of 85.3° C. in terms of a liquid crystal composition for TVs, has a large Δ∈ absolute value, and has low viscosity η and an optimum Δn. An FFS mode liquid crystal display element was produced using the liquid crystal composition 1 and evaluated for burn-in, drip marks, process adaptability, and solubility at low temperature using the method described above, and the evaluation results were extremely excellent.

Example 16

Liquid Crystal Composition 16

A liquid crystal composition (liquid crystal composition 16) having the following composition designed to have an equivalent $T_{NI}$, an equivalent Δn value, and an equivalent Δ∈ value to those of the liquid crystal composition 15 was prepared, and the physical property values thereof were measured. The results are shown in the following table. An FFS mode liquid crystal display element was produced using the liquid crystal composition 16 in the same manner as in Example 1, and the results of evaluations of burn-in, drip marks, process adaptability and solubility at low temperature are shown in the same table.

TABLE 18

| | |
|---|---|
| 3CyCyV | 22% |
| 3CyCyV1 | 10% |
| 3CyCyPh1 | 5% |
| 3CyPh5O2 | 12% |
| 5CyPh5O2 | 5% |
| 3CyCyPh5O2 | 11% |
| 3CyCyPh5O3 | 7% |
| 4CyCyPh5O2 | 11% |
| 2CyPhPh5O2 | 2% |
| 3CyPhPh5O2 | 4% |
| 3PhPh5O2 | 5% |
| 3PhPh5Ph2 | 6% |
| $T_{NI}/°$ C. | 86.0 |
| Δn | 0.102 |
| Δε | −4.00 |
| η/mPa · s | 20.6 |
| γ1/mPa · s | 125 |
| γ1/Δn² × 10⁻³ | 12.0 |
| γ1/Δn²/|Δε| | 3.00 |
| Initial voltage holding ratio % | 99.8 |
| Voltage holding ratio % after 1 hour at 150° C. | 99.4 |
| Burn in evaluation | A |
| Drip mark evaluation | A |
| Process adaptability evaluation | A |
| Solubility at low temperature evaluation | A |

It is understood that the liquid crystal composition 16 has a practical liquid crystal phase temperature range in terms of a liquid crystal composition for TVs, has a large absolute value of dielectric anisotropy, and has a low viscosity and an optimum Δn. An FFS mode liquid crystal display element was produced using the liquid crystal composition 16 in the same manner as Example 1 and evaluated for burn-in, drip marks, process adaptability, and solubility at low temperature using the method described above, and the evaluation results were excellent.

Example 17

Liquid Crystal Composition 17

A liquid crystal composition (liquid crystal composition 17) having the following composition designed to have an equivalent $T_{NI}$, an equivalent $\Delta n$ value, and an equivalent $\Delta \in$ value to those of the liquid crystal compositions 15 and 16 was prepared, and the physical property values thereof were measured. The results are shown in the following table. An FFS mode liquid crystal display element was produced using the liquid crystal composition 17 in the same manner as in Example 1, and the results of evaluations of burn-in, drip mark, process adaptability, and solubility at low temperature are shown in the same table.

TABLE 19

| | |
|---|---|
| 3CyCyV | 24% |
| 3CyCyV1 | 10% |
| 3CyCyPh1 | 9% |
| 3CyPh5O2 | 10% |
| 5CyPh5O2 | 4% |
| 3CyCyPh5O2 | 11% |
| 4CyCyPh5O2 | 8% |
| 2CyPhPh5O2 | 7% |
| 3CyPhPh5O2 | 9% |
| 3PhPh5O2 | 8% |
| $T_{NI}/° C.$ | 85.5 |
| $\Delta n$ | 0.102 |
| $\Delta \varepsilon$ | −3.95 |
| $\eta/mPa \cdot s$ | 18.3 |
| $\gamma_1/mPa \cdot s$ | 110 |
| $\gamma_1/\Delta n^2 \times 10^{-3}$ | 10.6 |
| $\gamma_1/\Delta n^2/|\Delta \varepsilon|$ | 2.68 |
| Initial voltage holding ratio % | 99.8 |
| Voltage holding ratio % after 1 hour at 150° C. | 99.4 |
| Burn in evaluation | A |
| Drip mark evaluation | A |
| Process adaptability evaluation | A |
| Solubility at low temperature evaluation | A |

It is understood that the liquid crystal composition 17 has a practical $T_{NI}$ in terms of a liquid crystal composition for TVs, has a large $\Delta \in$ absolute value, and has low viscosity $\eta$ and an optimum $\Delta n$. An FFS mode liquid crystal display element was produced using the liquid crystal composition 17 in the same manner as Example 1 and evaluated for burn-in, drip marks, process adaptability, and solubility at low temperature using the method described above, and the evaluation results were excellent.

Comparative Examples 7 to 9

VA mode liquid crystal display elements were produced using liquid crystal compositions 15 to 17 in the same manner as in Comparative Examples 1 to 3.

The transmissivity, the contrast ratio, and the response speed were compared for the FFS mode liquid crystal display elements produced in Examples 15 to 17 and the VA mode liquid crystal display elements prepared in Comparative Examples 7 to 9, respectively. The results are shown below.

TABLE 20

| | Example 15 | Comparative Example 7 | Example 16 | Comparative Example 8 | Example 17 | Comparative Example 9 |
|---|---|---|---|---|---|---|
| Display mode | n-FFS | VA | n-FFS | VA | n-FFS | VA |
| Used liquid crystal composition | Liquid crystal composition 15 | | Liquid crystal composition 16 | | Liquid crystal composition 17 | |
| Maximum transmittance | 89% | 86% | 87% | 85% | 86% | 84% |
| Contrast ratio | 275 | 261 | 280 | 263 | 291 | 257 |
| Response speed/ms | 7.2 | 12.5 | 6.8 | 12.3 | 6.2 | 10.1 |

The FFS mode display elements (Examples 15 to 17) produced using the liquid crystal compositions 15 to 17 exhibited excellent characteristics in all of the maximum transmittance, the contrast ratio, and the response speed compared with VA mode liquid crystal display elements (Comparative Examples 7 to 9) prepared using the same liquid crystal compositions respectively.

In an FFS mode liquid crystal display element in which liquid crystal molecules are aligned in parallel to the substrate and a fringe electric field is generated, basic liquid crystal characteristics are required which are different from VA mode liquid crystal display elements where the liquid crystal molecules are aligned to be orthogonal to the substrate and an electric field is generated vertically. By the liquid crystal compositions 15 to 17 containing the essential components of the present invention, an improvement in the transmittance which is a key feature of the FFS mode is achieved without impairing the basic characteristics as a liquid crystal display element. On the other hand, due to these differences in the FFS mode, effects such as burn-in and drip marks are hard to predict using conventional knowledge. The liquid crystal display element of the present invention also exhibits good characteristics in these points.

Example 18

Liquid Crystal Composition 18

A liquid crystal composition (liquid crystal composition 18) having the following composition designed to have an equivalent $T_{NI}$, an equivalent $\Delta n$ value, and an equivalent $\Delta \in$ value to those of the liquid crystal compositions 15 to 17 was prepared, and the physical property values thereof were measured. The results are shown in the following table.

TABLE 21

| | |
|---|---|
| 3CyCy2 | 23% |
| 3CyCy4 | 3% |
| 3CyCyPh1 | 4% |
| 3CyPh5O2 | 11% |
| 5CyPh5O2 | 11% |

TABLE 21-continued

| | |
|---|---|
| 3CyCyPh5O2 | 10% |
| 3CyCyPh5O3 | 5% |
| 4CyCyPh5O2 | 10% |
| 2CyPhPh5O2 | 7% |
| 3CyPhPh5O2 | 9% |
| 3PhPh5Ph2 | 3% |
| 4PhPh5Ph2 | 4% |
| $T_{NI}/°$ C. | 85.7 |
| $\Delta n$ | 0.103 |
| $\Delta\varepsilon$ | −4.06 |
| $\eta$/mPa · s | 26.5 |
| $\gamma_1$/mPa · s | 173 |
| $\gamma_1/\Delta n^2 \times 10^{-3}$ | 16.3 |
| $\gamma_1/\Delta n^2/|\Delta\varepsilon|$ | 4.02 |

It is understood that the liquid crystal composition 18 has a practical $T_{NI}$ in terms of a liquid crystal composition for TVs, has a large $\Delta\varepsilon$ absolute value, and has low viscosity $\eta$ and an optimum $\Delta n$. When an FFS mode liquid crystal display element was produced using the liquid crystal composition 18, excellent display characteristics equivalent to those in Examples 15 to 17 were exhibited.

Example 19

Liquid Crystal Composition 19

A liquid crystal composition (liquid crystal composition 19) having the following composition designed to have an equivalent $T_{NI}$, an equivalent $\Delta n$ value, and an equivalent $\Delta\varepsilon$ value to chose of the liquid crystal compositions 15 to 18 was prepared, and the physical property values thereof were measured. The results are shown in the following table.

TABLE 22

| | |
|---|---|
| 3CyCy2 | 25% |
| 3CyCy4 | 7% |
| 3CyPh5O2 | 7% |
| 5CyPh5O2 | 2% |
| 3CyCyPh5O2 | 11% |
| 3CyCyPh5O3 | 10% |
| 4CyCyPh5O2 | 11% |
| 2CyPhPh5O2 | 5% |
| 3CyPhPh5O2 | 7% |
| 3PhPh5O2 | 8% |
| 3PhPh5Ph2 | 3% |
| 4PhPh5Ph2 | 4% |
| $T_{NI}/°$ C. | 86.2 |
| $\Delta n$ | 0.103 |
| $\Delta\varepsilon$ | −3.99 |
| $\eta$/mPa · s | 24.4 |
| $\gamma_1$/mPa · s | 166 |
| $\gamma_1/\Delta n^2 \times 10^{-3}$ | 15.6 |
| $\gamma_1/\Delta n^2/|\Delta\varepsilon|$ | 3.92 |

It is understood that the liquid crystal composition 19 has a practical $T_{NI}$ in terms of a liquid crystal composition for TVs, has a large $\Delta\varepsilon$ absolute value, and has low viscosity $\eta$ and an optimum $\Delta n$. When an FFS mode liquid crystal display element was produced using the liquid crystal composition 19, excellent display characteristics equivalent to those in Examples 15 to 17 were exhibited.

Example 20

Liquid Crystal Composition 20

A liquid crystal composition (liquid crystal composition 20) having the following composition designed to have an equivalent $T_{NI}$, an equivalent $\Delta n$ value, and an equivalent $\Delta\varepsilon$ value to those of the liquid crystal compositions 15 to 19 was prepared, and the physical property values thereof were measured. The results are shown in the following table.

TABLE 23

| | |
|---|---|
| 3CyCy2 | 25% |
| 3CyCy4 | 4% |
| 3CyCyPh1 | 9% |
| 3CyPh5O2 | 8% |
| 5CyPh5O2 | 5% |
| 3CyCyPh5O2 | 8% |
| 3CyCyPh5O3 | 2% |
| 4CyCyPh5O2 | 9% |
| 2CyPhPh5O2 | 10% |
| 3CyPhPh5O2 | 12% |
| 3PhPh5Ph2 | 8% |
| $T_{NI}/°$ C. | 86.2 |
| $\Delta n$ | 0.103 |
| $\Delta\varepsilon$ | −4.00 |
| $\eta$/mPa · s | 22.5 |
| $\gamma_1$/mPa · s | 147 |
| $\gamma_1/\Delta n^2 \times 10^{-3}$ | 13.9 |
| $\gamma_1/\Delta n^2/|\Delta\varepsilon|$ | 3.46 |

It is understood that the liquid crystal composition 20 has a practical $T_{NI}$ in terms of a liquid crystal composition for TVs, has a large $\Delta\varepsilon$ absolute value, and has low viscosity $\eta$ and an optimum $\Delta n$. When an FFS mode liquid crystal display element was produced using the liquid crystal composition 20, excellent display characteristics equivalent to those in Examples 15 to 17 were exhibited.

Example 21

Liquid Crystal Composition 21

A liquid crystal composition (liquid crystal composition 21) having the following composition designed to have an equivalent $T_{NI}$, an equivalent $\Delta n$ value, and an equivalent $\Delta\varepsilon$ value to those of the liquid crystal compositions 15 to 20 was prepared, and the physical property values thereof were measured. The results are shown in the following table. Using the liquid crystal composition 21, an FFS mode liquid crystal display element was produced in the same manner as in Example 1, and the results of evaluations of burn-in, drip mark, process adaptability, and solubility at low temperature are shown in the same table.

TABLE 24

| | |
|---|---|
| 3CyCyV | 17% |
| 3CyCyV1 | 10% |
| 3PhPh1 | 5% |
| 3CyCyPh1 | 2% |
| 3CyPh5O2 | 12% |
| 5CyPh5O2 | 7% |
| 3CyCyPh5O2 | 10% |
| 3CyCyPh5O3 | 9% |
| 4CyCyPh5O2 | 10% |
| 2CyPhPh5O2 | 4% |
| 3CyPhPh5O2 | 6% |
| 3PhPh5Ph2 | 4% |
| 4PhPh5Ph2 | 4% |
| $T_{NI}/°$ C. | 85.7 |
| $\Delta n$ | 0.110 |
| $\Delta\varepsilon$ | −3.87 |
| $\eta$/mPa · s | 23.4 |
| $\gamma_1$/mPa · s | 153 |
| $\gamma1/\Delta n^2 \times 10^{-3}$ | 12.6 |
| $\gamma_1/\Delta n^2/|\Delta\varepsilon|$ | 3.27 |
| Initial voltage holding ratio % | 99.7 |

TABLE 24-continued

| | |
|---|---|
| Voltage holding ratio % after 1 hour at 150° C. | 99.3 |
| Burn in evaluation | A |
| Drip mark evaluation | A |
| Process adaptability evaluation | A |
| Solubility at low temperature evaluation | A |

It is understood that the liquid crystal composition 21 has a practical $T_{NI}$ in terms of a liquid crystal composition for TVs, has a large $\Delta\epsilon$ absolute value, and has low viscosity $\eta$ and an optimum $\Delta n$. An FFS mode liquid crystal display element was produced using the liquid crystal composition 21 in the same manner as Example 1 and evaluated for burn-in, drip marks, process adaptability, and solubility at low temperature using the method described above, and the evaluation results were excellent.

Example 22

Liquid Crystal Composition 22

A liquid crystal composition (liquid crystal composition 22) having the following composition designed to have an equivalent $T_{NI}$, an equivalent $\Delta n$ value, and an equivalent $\Delta\epsilon$ value to those of the liquid crystal compositions 15 to 21 was prepared, and the physical property values thereof were measured. The results are shown in the following table. Using the liquid crystal composition 22, an FFS mode liquid crystal display element was produced in the same manner as in Example 1, and the results of evaluations of burn-in, drip mark, process adaptability, and solubility at low temperature are shown in the same table.

TABLE 25

| | |
|---|---|
| 3CyCyV | 16% |
| 3CyCyv1 | 10% |
| 3PhPh1 | 5% |
| 3CyCyPh1 | 6% |
| 3CyPh5O2 | 10% |
| 5CyPh5O2 | 5% |
| 3CyCyPh5O2 | 11% |
| 3CyCyPh5O3 | 9% |
| 4CyCyPh5O2 | 11% |
| 2CyPhPh5O2 | 2% |
| 3CyPhPh5O2 | 4% |
| 3PhPh5O2 | 5% |
| 3PhPh5Ph2 | 6% |
| $T_{NI}/°$ C. | 86.5 |
| $\Delta n$ | 0.110 |
| $\Delta\epsilon$ | -3.90 |
| $\eta$/mPa · s | 22.0 |
| $\gamma_1$/mPa · s | 144 |
| $\gamma_1/\Delta n^2 \times 10^{-3}$ | 11.9 |
| $\gamma_1/\Delta n^2/|\Delta\epsilon|$ | 3.05 |
| Initial voltage holding ratio % | 99.7 |
| Voltage holding ratio % after 1 hour at 150° C. | 99.4 |
| Burn in evaluation | A |
| Drip mark evaluation | A |
| Process adaptability evaluation | A |
| Solubility at low temperature evaluation | A |

It is understood that the liquid crystal composition 22 has a practical $T_{NI}$ in terms of a liquid crystal composition for TVs, has a large $\Delta\epsilon$ absolute value, and has low viscosity $\eta$ and an optimum $\Delta n$. An FFS mode liquid crystal display element was produced using the liquid crystal composition 22 in the same manner as Example 1 and evaluated for burn-in, drip marks, process adaptability, and solubility at low temperature using the method described above, and the evaluation results were excellent.

Example 23

Liquid Crystal Composition 23

A liquid crystal composition (liquid crystal composition 23) having the following composition designed to have an equivalent $T_{NI}$, an equivalent $\Delta n$ value, and an equivalent $\Delta\epsilon$ value to those of the liquid crystal compositions 15 to 22 was prepared, and the physical property values thereof were measured. The results are shown in the following table.

TABLE 26

| | |
|---|---|
| 3CyCyV | 19% |
| 3CyCyV1 | 10% |
| 3PhPh1 | 5% |
| 3CyCyPh1 | 9% |
| 3CyPh5O2 | 8% |
| 5CyPh5O2 | 3% |
| 3CyCyPh5O2 | 11% |
| 3CyCyPh5O3 | 2% |
| 4CyCyPh5O2 | 9% |
| 2CyPhPh5O2 | 7% |
| 3CyPhPh5O2 | 9% |
| 3PhPh5O2 | 8% |
| $T_{NI}/°$ C. | 86.5 |
| $\Delta n$ | 0.109 |
| $\Delta\epsilon$ | -3.84 |
| $\eta$/mPa · s | 19.5 |
| $\gamma_1$/mPa · s | 126 |
| $\gamma_1/\Delta n^2 \times 10^{-3}$ | 10.6 |
| $\gamma_1/\Delta n^2/|\Delta\epsilon|$ | 2.76 |
| Initial voltage holding ratio % | 99.6 |
| Voltage holding ratio % after 1 hour at 150° C. | 99.2 |
| Burn in evaluation | A |
| Drip mark evaluation | A |
| Process adaptability evaluation | A |
| Solubility at low temperature evaluation | A |

It is understood that the liquid crystal composition 23 has a practical $T_{NI}$ in terms of a liquid crystal composition for TVs, has a large $\Delta\epsilon$ absolute value, and has low viscosity $\eta$ and an optimum $\Delta n$. An FFS mode liquid crystal display element was produced using the liquid crystal composition 23 in the same manner as Example 1 and evaluated for burn-in, drip marks, process adaptability, and solubility at low temperature using the method described above, and the evaluation results were excellent.

Comparative Examples 10 to 12

VA mode liquid crystal display elements were produced using liquid crystal compositions 21 to 23 in the same manner as in Comparative Examples 1 to 3.

The transmissivity, the contrast ratio, and the response speed were compared for the FFS mode liquid crystal display elements produced in Examples 21 to 23 and the VA mode liquid crystal display elements prepared in Comparative Examples 10 to 12, respectively. The results are shown below.

TABLE 27

|  | Example 21 | Comparative Example 10 | Example 22 | Comparative Example 11 | Example 23 | Comparative Example 12 |
|---|---|---|---|---|---|---|
| Display mode | n-FFS | VA | n-FFS | VA | n-FFS | VA |
| Used liquid crystal composition | Liquid crystal composition 21 | | Liquid crystal composition 22 | | Liquid crystal composition 23 | |
| Maximum transmittance % | 88% | 85% | 88% | 86% | 89% | 87% |
| Contrast ratio | 279 | 263 | 286 | 264 | 295 | 259 |
| Response speed/ms | 8.0 | 13.0 | 6.1 | 12.1 | 5.8 | 9.5 |

The FFS mode display elements (Examples 21 to 23) produced using the liquid crystal compositions 21 to 23 exhibited excellent characteristics in all of the maximum transmittance, the contrast ratio, and the response speed compared with VA mode liquid crystal display elements (Comparative Examples 10 to 12) prepared using the same liquid crystal compositions respectively.

Example 24

Liquid Crystal Composition 24

A liquid crystal composition (liquid crystal composition 24) having the following composition designed to have an equivalent $T_{NI}$, an equivalent $\Delta n$ value, and an equivalent $\Delta\varepsilon$ value to those of the liquid crystal compositions 15 to 23 was prepared, and the physical property values thereof were measured. The results are shown in the following table.

TABLE 28

| 3CyCy2 | 18% |
|---|---|
| 3CyCy4 | 3% |
| 3PhPh1 | 5% |
| 3CyCyPh1 | 4% |
| 3CyPh5O2 | 11% |
| 5CyPh5O2 | 9% |
| 3CyCyPh5O2 | 10% |
| 3CyCyPh5O3 | 7% |
| 4CyCyPh5O2 | 10% |
| 2CyPhPh5O2 | 7% |
| 3CyPhPh5O2 | 9% |
| 3PhPh5Ph2 | 3% |
| 4PhPh5Ph2 | 4% |
| $T_{NI}$/° C. | 85.5 |
| $\Delta n$ | 0.111 |
| $\Delta\varepsilon$ | −4.03 |
| $\eta$/mPa · s | 27.6 |
| $\gamma_1$/mPa · s | 188 |
| $\gamma_1/\Delta n^2 \times 10^{-3}$ | 15.3 |
| $\gamma_1/\Delta n^2/|\Delta\varepsilon|$ | 3.79 |

It is understood that the liquid crystal composition 24 has a practical $T_{NI}$ in terms of a liquid crystal composition for TVs, has a large $\Delta\varepsilon$ absolute value, and has low viscosity $\eta$ and an optimum $\Delta n$. An FFS mode liquid crystal display element was produced using the liquid crystal composition 24 and evaluated for burn-in, drip marks, process adaptability, and solubility at low temperature using the method described above, and the evaluation results were excellent.

Example 25

Liquid Crystal Composition 25

A liquid crystal composition having the following composition designed to have an equivalent $T_{NI}$, an equivalent $\Delta n$ value, and an equivalent $\Delta\varepsilon$ value to those of the liquid crystal compositions 15 to 24 was prepared, and the physical property values thereof were measured. The results are shown in the following table.

TABLE 29

| 3CyCy2 | 20% |
|---|---|
| 3CyCy4 | 5% |
| 3PhPh1 | 5% |
| 3CyCyPh1 | 2% |
| 3CyPh5O2 | 7% |
| 5CyPh5O2 | 4% |
| 3CyCyPh5O2 | 11% |
| 3CyCyPh5O3 | 10% |
| 4CyCyPh5O2 | 11% |
| 2CyPhPh5O2 | 5% |
| 3CyPhPh5O2 | 7% |
| 3PhPh5O2 | 6% |
| 3PhPh5Ph2 | 3% |
| 4PhPh5Ph2 | 4% |
| $T_{NI}$/° C. | 85.3 |
| $\Delta n$ | 0.110 |
| $\Delta\varepsilon$ | −3.94 |
| $\eta$/mPa · s | 25.5 |
| $\gamma_1$/mPa · s | 180 |
| $\gamma_1/\Delta n^2 \times 10^{-3}$ | 14.9 |
| $\gamma_1/\Delta n^2/|\Delta\varepsilon|$ | 3.78 |

It is understood that the liquid crystal composition 25 has a practical $T_{NI}$ in terms of a liquid crystal composition for TVs, has a large $\Delta\varepsilon$ absolute value, and has low viscosity $\eta$ and an optimum $\Delta n$. An FFS mode liquid crystal display element was produced using the liquid crystal composition 25 in the same manner as Example 1 and evaluated for burn-in, drip marks, process adaptability, and solubility at low temperature using the method described above, and the evaluation results were excellent.

Example 26

Liquid Crystal Composition 26

A liquid crystal composition (liquid crystal composition 26) having the following composition designed to have an equivalent $T_{NI}$, an equivalent $\Delta n$ value, and an equivalent $\Delta\varepsilon$ value to those of the liquid crystal compositions 15 to 25 was prepared, and the physical property values thereof were measured. The results are shown in the following table.

TABLE 30

| 3CyCy2 | 20% |
|---|---|
| 3CyCy4 | 3% |
| 3PhPh1 | 5% |
| 3CyCyPh1 | 10% |
| 3CyPh5O2 | 8% |
| 5CyPh5O2 | 5% |
| 3CyCyPh5O2 | 8% |
| 3CyCyPh5O3 | 3% |

TABLE 30-continued

| | |
|---|---|
| 4CyCyPh5O2 | 9% |
| 2CyPhPh5O2 | 10% |
| 3CyPhPh5O2 | 12% |
| 3PhPh5O2 | 7% | and the physical property values thereof were measured. The results are shown in the following table. Using the liquid crystal compositions 27 to 35, an FFS mode liquid crystal display element was produced in the same manner as in Example 1, and the results of evaluations of burn-in, drip mark, process adaptability, and solubility at low temperature are shown in the same table.

[Chem. 41]

| | Example 27 | Example 28 | Example 29 | Example 30 | Example 31 | Example 32 | Example 33 | Example 34 | Example 35 |
|---|---|---|---|---|---|---|---|---|---|
| $T_{NI}/°$ C. | 84.4 | 84.4 | 84.3 | 84.2 | 84.1 | 74.3 | 74.9 | 74.9 | 74.1 |
| $\Delta n$ | 0.089 | 0.090 | 0.0892 | 0.0899 | 0.0896 | 0.0908 | 0.0908 | 0.0902 | 0.0895 |
| $\Delta \varepsilon$ | −3.9 | −4.0 | −4 | −4.01 | −3.98 | −3.92 | −3.99 | −3.91 | −3.89 |
| $\gamma 1/mPa \cdot s$ | 122 | 122 | 151 | 123 | 119 | 119 | 115 | 109 | 105 |
| $\eta/mPa \cdot s$ | 16.2 | 15.9 | 19.2 | 16.2 | 15.9 | 16.2 | 15.6 | 15 | 14.8 |
| $\gamma 1/\Delta n^2 \times 10^{-3}$ | 15.3 | 15.2 | 19.0 | 15.2 | 14.8 | 14.4 | 13.9 | 13.4 | 13.1 |
| 3CyCyV | 20 | 30 | 10 | 25 | 37.5 | 11 | 20 | 29 | 39 |
| 3CyCyV1 | 7 | 5.5 | 7 | 6 | | 7 | 7 | 5 | |
| 2CyCyV1 | 14 | 6 | 5 | 8 | | 15 | 13 | 5 | |
| 5CyCyV | | | 21 | | | 7 | | | |
| 3CyCyPh2 | | 1 | | 4 | 4 | 3 | | 4 | 2 |
| VCyPhPh3 | 5 | | 2 | 1.5 | 2 | 3 | 2 | 2 | |
| 1VCyPhPh3 | 3.5 | 5 | 3 | 4 | 4.5 | | 3 | | 4 |
| 3Cy-1O—Ph5O1 | 1 | 3 | 5 | | | 4 | 5 | 4 | 2 |
| 3-Cy-1O—Ph5O2 | 8 | 7.5 | 6 | 9 | 9 | 8 | 9 | 8 | 10 |
| 1VCy-1O—Ph5O1 | 2 | | 3 | 3 | 3 | 4 | 2 | 3 | 3 |
| 1VCy-1O—Ph5O2 | 4 | 4 | | 5 | 5 | 4 | 4 | 5 | 5 |
| 2CyCy-1O—Ph5O2 | 7 | 8 | 7 | 7 | 6 | 6 | 7 | 7 | 8 |
| 3CyCy-1O—Ph5O2 | 10 | 12 | 9 | 10.5 | 12 | 9 | 10 | 10 | 8 |
| VCyCy-1O—Ph5O2 | 5 | 4 | 4 | 4 | 4 | 4 | 4 | 4 | 5 |
| VCyCy-1O—Ph5O3 | 4 | 3 | 4 | 4 | 4 | 4 | 4 | 4 | 4 |
| 1VCyCy-1O—Ph5O1 | 4 | 3 | 4 | 4 | 4 | | | | |
| 1VCyCy-1O—Ph5O2 | 4.5 | 5 | 4 | 4 | 4 | 4 | 4 | 4 | 4 |
| 3PhPh5Ph1 | | | 6 | 1 | 1 | | 2 | 2 | 2 |
| 3PhPh5Ph2 | 1 | 3 | | | | 7 | 4 | 4 | 4 |
| Initial voltage holding ratio | 99.5 | 99.6 | 99 | 99.3 | 99.6 | 99.2 | 99.6 | 99.6 | 99.5 |
| Voltage holding ratio after 1 hour at 150° C. | 99.1 | 99.2 | 97.8 | 99 | 99.2 | 98.1 | 99.1 | 99.2 | 99.1 |
| Burn in evaluation | A | A | B | A | A | B | A | A | A |
| Drip mark | A | A | A | A | A | A | A | A | A |
| Process adaptability | A | A | A | A | A | A | A | A | A |
| Solubility at low temperature evaluation | A | A | C | A | A | C | A | A | A |

TABLE 30-continued

| | |
|---|---|
| $T_{NI}/°$ C. | 85.7 |
| $\Delta n$ | 0.110 |
| $\Delta \varepsilon$ | −3.96 |
| $\eta/mPa \cdot s$ | 23.5 |
| $\gamma_1/mPa \cdot s$ | 160 |
| $\gamma_1/\Delta n^2 \times 10^{-3}$ | 13.2 |
| $\gamma_1/\Delta n^2/|\Delta \varepsilon|$ | 3.34 |

It is understood that the liquid crystal composition 26 has a practical $T_{NI}$ in terms of a liquid crystal composition for TVs, has a large $\Delta \varepsilon$ absolute value, and has low viscosity $\eta$ and an optimum $\Delta n$. An FFS mode liquid crystal display element was produced using the liquid crystal composition 26 and evaluated for burn-in, drip marks, process adaptability, and solubility at low temperature using the method described above, and the evaluation results were excellent.

Examples 27 to 35

Liquid crystal Compositions 27 to 35

Liquid crystal compositions (liquid crystal compositions 27 to 35) having the following compositions were prepared It is understood that the liquid crystal compositions 27 to 35 have a practical $T_{NI}$ in terms of a liquid crystal composition for TVs, have a large $\Delta \varepsilon$ absolute value, and have low viscosity $\eta$ and an optimum $\Delta n$. An FFS mode liquid crystal display element was produced using the liquid crystal compositions 27 to 35 and evaluated for voltage holding ratio, burn-in, drip marks, process adaptability, and solubility at low temperature using the method described above, and the evaluation results were extremely excellent.

Comparative Examples 13 to 21

VA mode liquid crystal display elements were produced using liquid crystal compositions 27 to 35 in the same manner as in Comparative Examples 1 to 3.

The transmissivity, the contrast ratio, and the response speed were, compared for the FFS mode liquid crystal display elements produced in Examples 27 to 35 and the VA mode liquid crystal display elements prepared in Comparative Examples 13 to 21, respectively. The results are shown below.

TABLE 31

|  | Example 27 | Comparative Example 13 | Example 28 | Comparative Example 14 | Example 29 | Comparative Example 15 | Example 30 | Comparative Example 16 | Example 31 | Comparative Example 17 |
|---|---|---|---|---|---|---|---|---|---|---|
| Display mode | n-FFS | VA | n-FFS | VA | n-FFS | VA | n-FFS | VA | n-FFS | VA |
| Used liquid crystal composition | Liquid crystal composition 27 | | Liquid crystal composition 28 | | Liquid crystal composition 29 | | Liquid crystal composition 30 | | Liquid crystal composition 31 | |
| Maximum transmittance % | 92% | 88% | 93% | 89% | 92% | 89% | 92% | 89% | 93% | 88% |
| Contrast ratio | 548 | 483 | 562 | 497 | 596 | 528 | 560 | 495 | 545 | 491 |
| Response speed/ms | 5.3 | 8.5 | 5.2 | 8.4 | 6.2 | 9.8 | 5.3 | 8.6 | 5.2 | 8.5 |

TABLE 32

|  | Example 32 | Comparative Example 18 | Example 33 | Comparative Example 19 | Example 34 | Comparative Example 20 | Example 35 | Comparative Example 21 |
|---|---|---|---|---|---|---|---|---|
| Display mode | n-FFS | VA | n-FFS | VA | n-FFS | VA | n-FFS | VA |
| Used liquid crystal composition | Liquid crystal composition 32 | | Liquid crystal composition 33 | | Liquid crystal composition 34 | | Liquid crystal composition 35 | |
| Maximum transmittance % | 93% | 87% | 93% | 86% | 93% | 88% | 91% | 87% |
| Contrast ratio | 578 | 485 | 567 | 479 | 551 | 473 | 594 | 465 |
| Response speed/ms | 5.3 | 8.6 | 5.2 | 8.4 | 5.1 | 8.1 | 5 | 7.9 |

Examples 36 to 41

Liquid Crystal Compositions 36 to 41

Liquid crystal compositions (liquid crystal compositions 36 to 41) having the following composition designed to have an equivalent $T_{NI}$, an equivalent Δn value, and an equivalent Δ∈ value to those of the liquid crystal compositions 21 to 35 were prepared, and the physical property values thereof were measured. The results are shown in the following table. Using the liquid crystal compositions 36 to 41, an FFS mode liquid crystal display element was produced in the same manner as in Example 1, and the results of evaluations of burn-in, drip mark, process adaptability, and solubility at low temperature are shown in the same table.

TABLE 33

|  | Example 36 | Example 37 | Example 38 | Example 39 | Example 40 | Example 41 |
|---|---|---|---|---|---|---|
| $T_{NI}$/° C. | 84.8 | 85.6 | 75.8 | 74.9 | 75.8 | 75.8 |
| Δn | 0.0898 | 0.0927 | 0.0897 | 0.0893 | 0.0906 | 0.0901 |
| Δε | −4 | −3.92 | −4 | −3.97 | −3.99 | −3.89 |
| γ1/mPa·s | 124 | 122 | 111 | 105 | 127 | 120 |
| η/mPa·s | 14.8 | 15.1 | 14.1 | 13.8 | 15.5 | 15 |
| γ1/Δn² × 10⁻² | 15.4 | 14.2 | 13.8 | 13.2 | 15.5 | 14.8 |
| 3CyCyV | 20.0 | 33.0 | 20.0 | 36.0 | 20.0 | 35 |
| 3CyCyV1 | 8 | 7 | 8 | 6 | 4 | |
| 2CyCyV1 | 15 | | 15 | | 12 | |
| 3CyCyPh2 | 4 | 5 | 3 | 3 | 4 | 5 |
| VCyPhPh3 | 6 | 8 | 6 | 6 | 6 | 6 |
| 3Cy-1O—Ph5O1 | | | 2 | 2 | | |
| 3-Cy-1O—Ph5O2 | 6 | 6 | 6 | 6 | 6 | 6 |
| 1VCy-1O—Ph5O2 | | | 2 | 2 | | |
| 2CyCy-1O—Ph5O2 | 9 | 8 | 8 | 8 | 8 | 8 |
| 3CyCy-1O—Ph5O2 | 14 | 14 | 13 | 13 | 8 | 8 |
| VCyCy-1O—Ph5O2 | 3 | 3 | 2 | 2 | | |
| VCyCy-1O—Ph5O3 | 3 | 3 | | | | |
| 3PhPh5Ph2 | 3 | 2 | 4 | 4 | 3 | 3 |
| 3PhPh5O2 | 3 | 5 | 5 | 6 | 5 | 5 |
| 5PhPh5O2 | 3 | 3 | 3 | 3 | 3 | 3 |
| 3CyPy'Ph5O2 | 3 | 3 | 3 | 3 | 3 | 3 |
| 3Cy-2-Ph5O3 | | | | | 4 | 4 |
| 3Cy-2-Ph5O4 | | | | | 4 | 4 |
| 3CyCy-2-Ph5O3 | | | | | 5 | 5 |
| 3CyCy-2-Ph5O4 | | | | | 5 | 5 |
| Initial voltage holding ratio | 99.2 | 99.1 | 99.4 | 99.3 | 99.5 | 99.4 |
| Voltage holding ratio after 1 hour at 150° C. | 98 | 98.4 | 98.8 | 98.7 | 99.1 | 99.1 |
| Burn in evaluation | A | A | A | A | A | A |
| Drip mark | A | A | A | A | A | A |
| Process adaptability | A | A | A | A | A | A |
| Solubility at low temperature evaluation | B | B | B | B | B | B |

It is understood that the liquid crystal compositions 36 to 41 have a practical in terms of a liquid crystal composition for TVs, has a large $\Delta\varepsilon$ absolute value, and has low viscosity $\eta$ and an optimum $\Delta n$. An FFS mode liquid crystal display element was produced using the liquid crystal compositions 36 to 41 in the same manner as Example 1 and evaluated for voltage holding ratio, burn-in, drip marks, process adaptability, and solubility at low temperature using the method described above, and the evaluation results were practical in terms of a liquid crystal composition for TVs.

Comparative Examples 22 to 27

VA mode liquid crystal display elements were produced using liquid crystal compositions 36 to 41 in the same manner as in Comparative Example 1.

The transmissivity, the contrast ratio, and the response speed were compared for the FFS mode liquid crystal display elements produced in Examples 36 to 41 and the VA mode liquid crystal display elements prepared in Comparative Examples 22 to 27, respectively. The results are shown below.

TABLE 34

|  | Example 36 | Comparative Example 22 | Example 37 | Comparative Example 23 | Example 38 | Comparative Example 24 |
|---|---|---|---|---|---|---|
| Display node | n-FFS | VA | n-FFS | VA | n-FFS | VA |
| Used liquid crystal composition | Liquid crystal composition 36 | | Liquid crystal composition 37 | | Liquid crystal composition 38 | |
| Maximum transmittance(%) | 92% | 87% | 92% | 88% | 93% | 88% |
| Contrast ratio | 562 | 497 | 537 | 485 | 558 | 472 |
| Response speed/ms | 5.4 | 8.6 | 5.3 | 8.5 | 5.1 | 8 |

TABLE 35

|  | Example 39 | Comparative Example 25 | Example 40 | Comparative Example 26 | Example 41 | Comparative Example 27 |
|---|---|---|---|---|---|---|
| Display mode | n-FFS | VA | n-FFS | VA | n-FFS | VA |
| Used liquid crystal composition | Liquid crystal composition 39 | | Liquid crystal composition 40 | | Liquid crystal composition 41 | |
| Maximum transmittance(%) | 91% | 87% | 91% | 88% | 91% | 88% |
| Contrast ratio | 568 | 492 | 581 | 516 | 576 | 497 |
| Response speed/ms | 5.1 | 7.9 | 5.2 | 8.7 | 5.4 | 8.8 |

The FFS mode display elements (Examples 36 to 41) produced using the liquid crystal compositions 36 to 41 exhibited excellent characteristics in all of the maximum transmittance, the contrast ratio, and the response speed compared with VA mode liquid crystal display elements (Comparative Examples 22 to 27) prepared using the same liquid crystal compositions respectively.

Examples 42 to 44

Liquid Crystal Compositions 42 to 44

TABLE 36

| Sample | Example 42 | Example 43 | Example 44 |
|---|---|---|---|
| $T_{NI}/°$ C. | 76 | 74.5 | 85 |
| $\Delta n$ | 0.1081 | 0.1086 | 0.0970 |
| $\Delta\varepsilon$ | −2.80 | −2.80 | −4.20 |

TABLE 36-continued

| Sample | Example 42 | Example 43 | Example 44 |
|---|---|---|---|
| $\gamma_1$/mPa · s | 116 | 96 | 166 |
| 3Cy-Cy-2 | 20 | | 10 |
| 3Cy-Cy-4 | 7 | | 5 |
| 3Cy-Cy-5 | | | 4 |
| 3-Cy-CyO1 | | | |
| 5-Cy-Cy-O1 | | | |
| 3-Cy-Cy-V | | 30 | |
| 3-Cy-Cy-V1 | | 10 | |
| 5-Cy-Ph-3 | | | |
| 3-Cy-Ph-O1 | 6 | | |
| 1-Ph-Ph-2V1 | | | |
| 3-Cy-Cy-Ph-1 | | | 5 |
| V-Cy-Cy-Ph-1 | | | |
| 3-Cy-Ph-Ph-2 | | | |
| 3-Cy-Ph5-O2 | 15 | 15 | 13 |
| 3-Cy-Ph5-O4 | | | 2 |
| 5-Cy-Ph5-O2 | | 5 | 10 |
| 5-Cy-Ph5-O4 | | | |
| 1-Ph-Ph5-O4 | | | 5 |
| 3-Ph-Ph5-O2 | | | |
| 2-Cy-Cy-Ph5-1 | | | |

TABLE 36-continued

| Sample | Example 42 | Example 43 | Example 44 |
|---|---|---|---|
| 3Cy-Cy-Ph5-1 | | | |
| 3Cy-Cy-Ph5-3 | | | 6 |
| 3-Cy-Cy-Ph5-O1 | | | 5 |
| 3-Cy-Cy-Ph5-O2 | | 10 | 6 |
| 3-Cy-Cy-Ph5-O3 | | | 6 |
| 4-Cy-Cy-Ph5-O2 | 10 | | 3 |
| 5-Cy-Cy-Ph5-O2 | 5 | | |
| 2-Cy-Ph-Ph5-O2 | 10 | 5 | 10 |
| 3-Cy-Ph-Ph5-O2 | 10 | 10 | 10 |
| 3-Ph-Ph5-Ph-2 | 8 | 15 | |
| 4-Ph-Ph5-Ph-2 | 9 | | |

The liquid crystal compositions 42 to 44 have a practical $T_{NI}$ as a liquid crystal composition for a TV, have a large $\Delta\varepsilon$ absolute value, a low $\eta$, and an optimum $\Delta n$. An FFS mode liquid crystal display element, which is the same as being in Example 1, was produced using the liquid crystal compositions 42 to 44 and evaluated for voltage holding ratio, burn-in, drip trace, process adaptability, and solubility at low temperature using the method described above, and the practical evaluation results were showed as the liquid crystal composition for a TV.

Example 45

An FFS mode liquid crystal display element having a cell thickness of 3.0 μm, which is common for TVs, and having a TFT electrode layer on a first substrate and a comb-shaped common electrode on a second substrate was produced (the configuration in FIG. 8). In addition, the injection of the liquid crystal compositions 1 to 44 was carried out by a dropping method and observation with the polarizing microscope while driving the liquid crystal cell, and as a result of the observation, it was confirmed that, the alignment unevenness was reduced as compared with the liquid crystal cell in Example 1.

REFERENCE SIGNS LIST 1, 8 POLARIZING PLATE
2 FIRST SUBSTRATE
3 SECOND ELECTRODE LAYER
4 ALIGNMENT FILM
5 LIQUID-CRYSTAL LAYER
6 COLOR FILTER
7 SECOND SUBSTRATE (INCLUDING CASE OF FORMING ELECTRODE ON SURFACE)
10 LIQUID-CRYSTAL DISPLAY ELEMENT
11 GATE ELECTRODE
12 GATE INSULATING FILM
13 SEMICONDUCTOR LAYER
14 INSULATING LAYER
15 OHMIC CONTACT LAYER
16 DRAIN ELECTRODE
17 SOURCE ELECTRODE
18 INSULATING PROTECTIVE LAYER
19 (INSULATING) PROTECTIVE FILM
21 PIXEL ELECTRODE AS ONE EXAMPLE OF FIRST ELECTRODE
22 COMMON ELECTRODE AS ONE EXAMPLE of SECOND ELECTRODE
23 STORAGE CAPACITOR
25 DATA BUS LINE
27 SOURCE BUS LINE
29 COMMON LINE
123 THIRD ELECTRODE
124 PROJECTION
126 RESIN LAYER INCLUDING COLOR FILTER

The invention claimed is:
1. A liquid crystal display element comprising:
a first transparent insulating substrate and a second transparent insulating substrate, which are disposed so as to face each other;
a liquid crystal layer containing a liquid crystal composition, which is interposed between the first substrate and the second substrate;
for each pixel on the first substrate, a first electrode containing a transparent conductive material and a plurality of gate bus lines and data bus lines being disposed in a mesh shape, a thin film transistor provided at an intersection between the gate bus lines and data bus lines, and a second electrode containing a transparent conductive material which is driven by the thin film transistor; and alignment film layers which induce homogeneous alignment between the liquid crystal layer and each of the first and second substrates and whose alignment directions of each alignment film are parallel to each other,
wherein a distance R between the first electrode and the second electrode is smaller than a distance G between the first substrate and the second substrate so that the first electrode and the second electrode form fringe electric fields therebetween, and
the second electrode is disposed closer to the first substrate than the first electrode,
wherein the crystal composition comprises at least one compound represented by the following General Formula (IV):

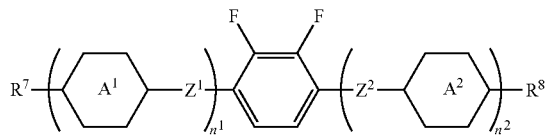

(IV)

wherein $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, a methylene group in the alkyl group, the alkenyl group, the alkoxy group, or the alkenyloxy group may be substituted with an oxygen atom as long as the oxygen atoms are not bonded consecutively, and may be substituted with a carbonyl group as long as the carbonyl groups are not bonded consecutively, $A^1$ and $A^2$ each independently represent a 1,4-cyclohexylene group, a 1,4-phenylene group or a tetrahydropyran-2,5-diyl group; provided that, in a case where $A^1$ or/and $A^2$ represent a 1,4-phenylene group, one or more hydrogen atoms in the 1,4-phenylene group may be substituted with a fluorine atom, $Z^1$ and $Z^2$ each independently represent a single bond, —OCH$_2$—, —OCF$_2$—, —CH$_2$O—, or CF$_2$O—, $n^1$ and $n^2$ each independently represent 0, 1, 2, or 3, provided that $n^1+n^2$ is 1 to 3, and in a case where a plurality of $A^1$, $A^2$, $Z^1$ and/or $Z^2$ are present, plural $A^1$s, $A^2$s, $Z^1$s, and/or $Z^2$s each may be the same as or different from each other, with the proviso that a compound in which $n^1$ is 1 or 2, $n^2$ is 0, at least one of $A^1$'s is a 1,4-cyclohexylene group, and all of $Z^1$'s are single bonds is excluded.

2. The liquid crystal display element according to claim 1, wherein the liquid crystal composition has a nematic phase-isotropic liquid transition temperature of 60° C. or more, and an absolute value of the dielectric anisotropy of 2 or more, and wherein the liquid crystal composition further comprises at least one compound selected from the compound group represented by General Formula (I) and/or at least one compound selected from the compound group represented by the following General Formula (II):

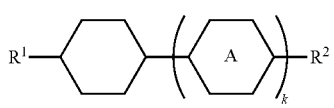

wherein $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, A represents a 1,4-phenylene group or a trans-1,4-cyclohexylene group, k represents 1 or 2, and in a case of k is 2, two A's may be the same as or different from each other:

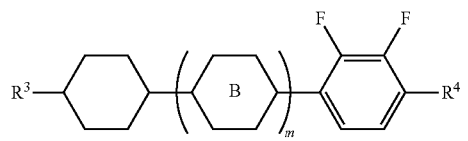

wherein $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^4$ represents an alkyl group having 1 to 8 carbon atoms, an alkenyl group having 4 to 8 carbon atoms, an alkoxy group having 1 to 8 carbon atoms or an alkenyloxy group having 3 to 8 carbon atoms, B represents a 1,4-phenylene group or a trans-1,4-cyclohexylene group, m represents 0, 1, or 2, and in a case where m is 2, two B's may be the same as or different from each other.

\* \* \* \* \*